United States Patent
Yoon et al.

(10) Patent No.: US 11,856,487 B2
(45) Date of Patent: *Dec. 26, 2023

(54) METHOD AND APPARATUS FOR MEASURING LOCATION OF MULTIPLE ELECTRONIC DEVICES BASED ON TIME SCHEDULING INFORMATION IN CONNECTION WITH ULTRA-WIDE BAND COMMUNICATION

(71) Applicant: Samsung Electronics Co., Ltd., Gyeonggi-do (KR)

(72) Inventors: Sejong Yoon, Gyeonggi-do (KR); Doosuk Kang, Gyeonggi-do (KR); Moonseok Kang, Gyeonggi-do (KR); Hyunchul Kim, Gyeonggi-do (KR); Yi Yang, Gyeonggi-do (KR); Jonghoon Jang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 17/749,575

(22) Filed: May 20, 2022

(65) Prior Publication Data
US 2022/0279318 A1   Sep. 1, 2022

Related U.S. Application Data

(63) Continuation of application No. 16/867,255, filed on May 5, 2020, now Pat. No. 11,343,645.

(30) Foreign Application Priority Data

Jun. 5, 2019   (KR) .......................... 10-2019-0066890

(51) Int. Cl.
*H04W 4/029*   (2018.01)
*H04W 8/00*   (2009.01)
(Continued)

(52) U.S. Cl.
CPC ............... *H04W 4/029* (2018.02); *G01S 5/06* (2013.01); *H04B 1/7163* (2013.01)

(58) Field of Classification Search
CPC ..... H04W 4/029; H04W 8/005; H04W 64/00; H04W 72/121; G01S 5/06; G01S 5/12;
(Continued)

(56) References Cited

U.S. PATENT DOCUMENTS 10,171,129 B1   1/2019   Hammerschmidt et al.
10,652,925 B2   5/2020   Naguib et al.
(Continued)

FOREIGN PATENT DOCUMENTS

KR   10-2016-0136131   11/2016
WO   WO 2017/196584   11/2017
(Continued)

OTHER PUBLICATIONS

Cuan Lian Sang et al., "An Analytical Study of Time of Flight Error Estimation in Two-Way Ranging Methods", 2018 International Conference on Indoor Positioning and Indoor Navigation (IPIN), Sep. 24-27, 2018, 8 pages.

(Continued)

*Primary Examiner* — Inder P Mehra
(74) *Attorney, Agent, or Firm* — The Farrell Law Firm, P.C.

(57) ABSTRACT

An electronic device includes an ultra-wide band (UWB) communication module; a memory; and a processor operably connected to the UWB communication module and the memory, wherein the processor is configured to receive, through the UWB communication module, a first message from a first external electronic device at a first time slot; store, in the memory, the first message and a receiving time of the first message; receive, through the UWB communication module, a second message from a second external (Continued)

electronic device at a second time slot; store, in the memory, the second message and a receiving time of the second message; identify a time schedule information for transmitting a third message to the first external electronic device and the second external electronic device, the time schedule information including a transmitting time of the third message; obtain first time information regarding a period of time between the receiving time of the first message and the transmitting time of the third message and second time information regarding a period of time between the receiving time of the second message and the transmitting time of the third message; and transmit, through the UWB communication module, the third message including the first time information and the second time information to the first external electronic device and the second external electronic device at a third time slot.

20 Claims, 17 Drawing Sheets

(51) Int. Cl.
    *H04W 64/00*     (2009.01)
    *H04W 72/12*     (2023.01)
    *H04B 1/7163*     (2011.01)
    *H04L 43/10*     (2022.01)
    *G01S 5/06*     (2006.01)

(58) Field of Classification Search
    CPC ..... G01S 11/02; G01S 13/765; H04B 1/7163; H04B 2201/71634; H04L 43/10
    USPC .................................................. 455/456.1, 10
    See application file for complete search history.

(56) References Cited

U.S. PATENT DOCUMENTS

| | | | |
|---|---|---|---|
| 11,343,645 B2* | 5/2022 | Yoon | H04W 4/029 |
| 2008/0299987 A1 | 12/2008 | Iyer | |
| 2009/0111407 A1* | 4/2009 | Nail | H04B 1/0057 455/168.1 |
| 2017/0135063 A1 | 5/2017 | Bartov et al. | |
| 2018/0249437 A1 | 8/2018 | Lindskog et al. | |
| 2018/0302280 A1 | 10/2018 | Jiang et al. | |
| 2020/0135306 A1* | 4/2020 | Wong | H04L 63/04 |

FOREIGN PATENT DOCUMENTS

| | | |
|---|---|---|
| WO | WO 2018/156862 | 8/2018 |
| WO | WO 2018/190982 | 10/2018 |

OTHER PUBLICATIONS

Francesco Sottile et al., "A Simulation Tool for Hybrid-cooperative Positioning", 2011 International Conference on Localization and GNSS, Jul. 18, 2011, 7 pages.

International Search Report dated Jul. 30, 2020 issued in counterpart application No. PCT/KR2020/005622, 9 pages.

* cited by examiner

Pxy : Ranging Poll Packet from x to y
Rxy : Ranging Response Packet from x to y

Pxy : Ranging Poll Packet from x to y
Rxy : Ranging Response Packet from x to y
Fxy : Ranging Final Packet from x to y

FIG. 7C (740)

| Frame Control | SOUR | TYPE | txTime | DEST | DEST |
|---|---|---|---|---|---|
| | 1 | POLL | 15 | 2 | 3 |

741, 743, 745, 747, 749

(750)

755:
| TYPE | DEST |
|---|---|
| RESP | 1 |

751:
| Frame Control | SOUR | TYPE | txTime | DEST |
|---|---|---|---|---|
| | 2 | POLL | 17 | 3 |

753

(760)

| Frame Control | SOUR | TYPE | DEST | DEST | TYPE | txTime | DEST | rxTime | DEST | rxTime |
|---|---|---|---|---|---|---|---|---|---|---|
| | 1 | RESP | 2 | 3 | FINAL | 23 | 2 | 19 | 3 | 21 |

| Frame Control | SOUR |
|---|---|
|  | 1 |

(793)

| Frame Control | SOUR |
|---|---|
|  | 2 |

(795)

| | | 784 | 785 | 786 | 787 | 788 | 789 |
| Frame Control | SOUR | PollTime | txTime | DEST | rxTime | DEST | rxTime |
|---|---|---|---|---|---|---|---|
|  | 1 | 15 | 23 | 2 | 19 | 3 | 21 |

(720)

| | | 721 | 722 | 723 | 724 | 725 | 726 |
| Frame Control | SOUR | PollTime | txTime | DEST | rxTime | DEST | rxTime |
|---|---|---|---|---|---|---|---|
|  | 2 | 17 | 25 | 1 | 16 | 3 | 18 |

METHOD AND APPARATUS FOR MEASURING LOCATION OF MULTIPLE ELECTRONIC DEVICES BASED ON TIME SCHEDULING INFORMATION IN CONNECTION WITH ULTRA-WIDE BAND COMMUNICATION

CROSS-REFERENCE TO RELATED APPLICATION(S)

This application is a Continuation application of U.S. patent application Ser. No. 16/867,255, filed on May 5, 2020, in the United States Patent and Trademark Office, which is based on and claims priority under 35 U.S.C. § 119 to Korean Patent Application No. 10-2019-0066890, filed on Jun. 5, 2019, in the Korean Intellectual Property Office, the entire disclosure of each of which is incorporated by reference herein in its entirety.

BACKGROUND

1. Field

The disclosure relates generally to a method for measuring the location of multiple electronic devices, based on time scheduling information, in connection with ultra-wide band (UWB) communication.

2. Description of Related Art

Development of digital technology has been followed by widespread use of various types of electronic devices, such as mobile communication terminals, personal digital assistants (PDA), electronic wallets, smartphones, tablet personal computers (PC), or wearable devices. In order to support and enhance the functionality of such electronic devices, the hardware part and/or software part of the electronic devices are continuously being improved.

Meanwhile, during a location (or distance) measurement operation through UWB communication, locations of respective electronic devices are measured according to a two way ranging (TWR) scheme between two electronic devices. The TWR scheme may include a single side (SS)-TWR scheme or a double side (DS)-TWR scheme. According to the SS-TWR scheme, if an electronic device transmits a ranging poll message (or ranging poll data) to an external electronic device (or counterpart electronic device), the external electronic device transmits a ranging response message to the electronic device, and the electronic device thereby identifies the distance from the external electronic device (or location of the external electronic device). According to the DS-TWR scheme, if the external electronic device transmits a ranging poll message, the electronic device transmits a ranging response message to the external electronic device, and the external electronic device transmits a ranging final message to the electronic device, thereby enabling the electronic device to identify the distance from the external electronic device.

Conventional location measurement technologies are solely focused on how the distance is measured between two electronic devices, and do not consider how to efficiently measure the location (or distance) of multiple electronic devices. When measuring distances by using a conventional technology, it may take a long time for an electronic device to measure the distance (or location) from multiple electronic devices, and it may be necessary to exchange data multiple times. For example, when measuring the location of multiple electronic devices according to the DS-TWR scheme, each of N electronic devices may need to exchange data a total of $3*N*(N-1)/2$ times, in order to measure the location of the remaining (N−1) electronic devices other than itself. For example, each of four electronic devices may need to exchange data a total of eighteen times, in order to measure the location of the remaining three electronic devices other than itself. There has recently been an increasing number of fields requiring low latency (for example, augmented reality (AR) gaming and scanning electronic devices on AR screens), thereby necessitating a method wherein multiple electronic devices can efficiently measure the distance between each other quickly.

SUMMARY

According to an aspect of the present disclosure, an electronic device includes a UWB communication module; a memory; and a processor operably connected to the UWB communication module and the memory, wherein the processor is configured to receive, through the UWB communication module, a first message from a first external electronic device at a first time slot; store, in the memory, the first message and a receiving time of the first message; receive, through the UWB communication module, a second message from a second external electronic device at a second time slot; store, in the memory, the second message and a receiving time of the second message; identify a time schedule information for transmitting a third message to the first external electronic device and the second external electronic device, the time schedule information including a transmitting time of the third message; obtain first time information regarding a period of time between the receiving time of the first message and the transmitting time of the third message and second time information regarding a period of time between the receiving time of the second message and the transmitting time of the third message; and transmit, through the UWB communication module, the third message including the first time information and the second time information to the first external electronic device and the second external electronic device at a third time slot.

According to another aspect of the present disclosure, a method for operating an electronic device includes receiving, through a UWB communication module included in the electronic device, a first message from a first external electronic device at a first time slot; storing, in a memory included in the electronic device, the first message and a receiving time of the first message; receiving, through the UWB communication module, a second message from a second external electronic device at a second time slot; storing, in the memory, the second message and a receiving time of the second message; identifying a time schedule information for transmitting a third message to the first external electronic device and the second external electronic device, the time schedule information including a transmitting time of the third message; obtaining first time information regarding a period of time between the receiving time of the first message and the transmitting time of the third message and second time information regarding a period of time between the receiving time of the second message and the transmitting time of the third message; and transmitting, through the UWB communication module, the third message including the first time information and the second time information to the first external electronic device and the second external electronic device at a third time slot.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7C illustrates exemplary information transmitted based on the DS-TWR scheme, according to an embodiment;

FIG. 7E illustrates exemplary information transmitted based on the DS-TWR scheme, according to an embodiment;

DETAILED DESCRIPTION

Figure 1:
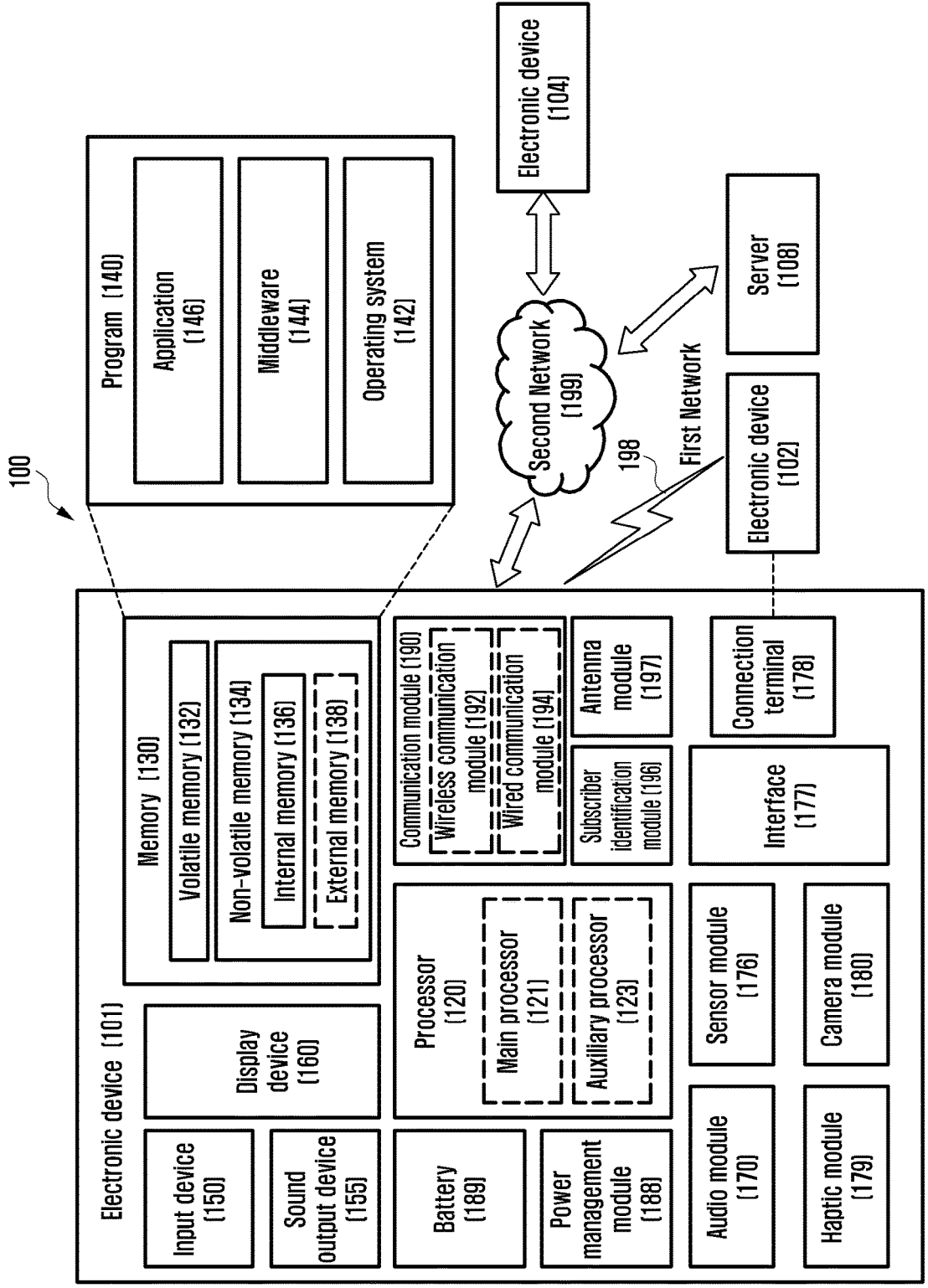
FIG. 1 is a block diagram of an electronic device inside a network environment, according to an embodiment.

Various embodiments disclose a method and apparatus, wherein, when measuring the location of multiple electronic devices through UWB communication, each electronic device can schedule a time to transmit information for location measurement and can transmit the information at the scheduled time, thereby acquiring the location of multiple electronic devices within a short period of time.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
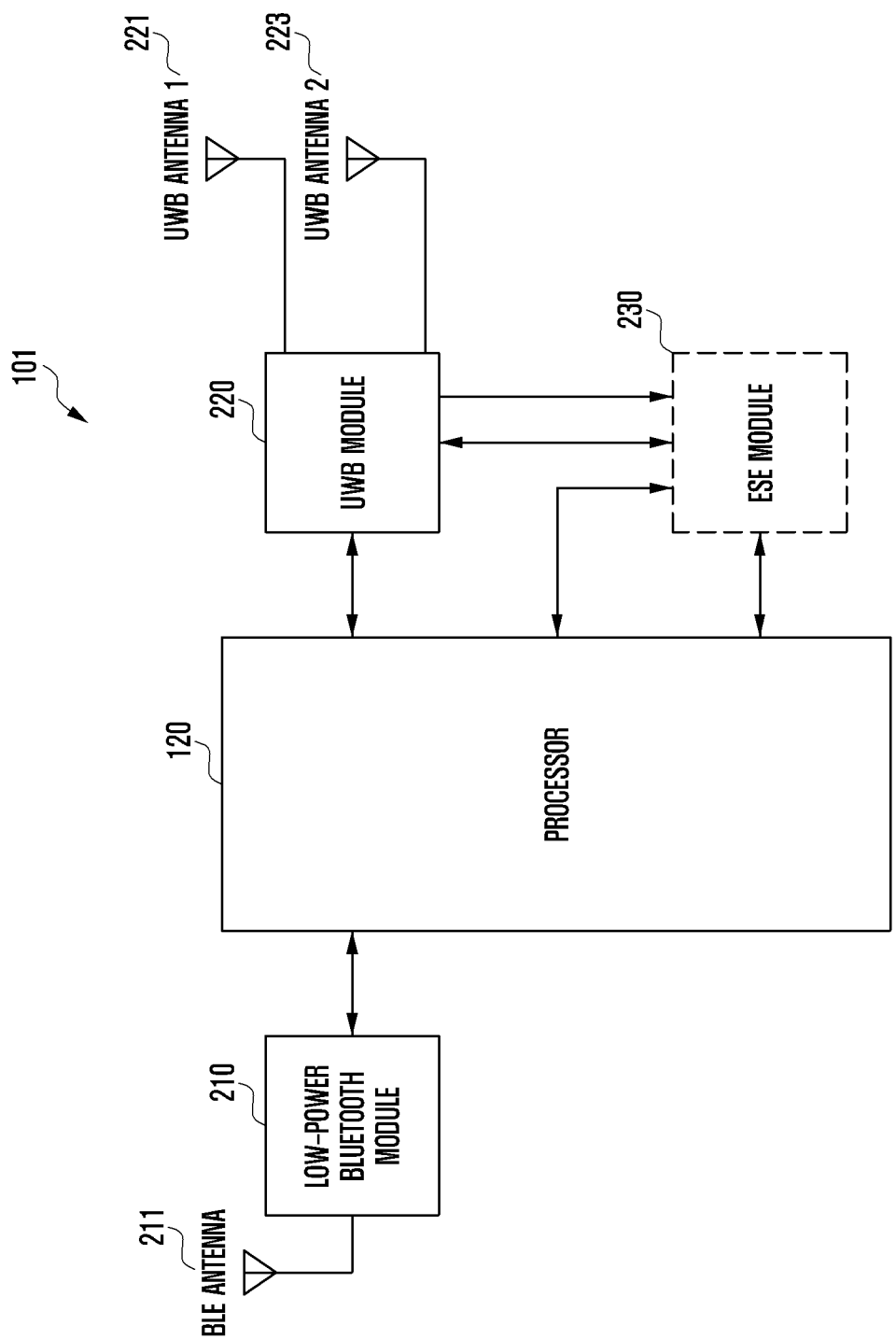
FIG. 2 is a hardware block diagram of an electronic device, according to an embodiment.

FIG. 2 is a hardware block diagram of an electronic device, according to an embodiment.

Referring to FIG. 2, the electronic device includes a processor 120, a low-power Bluetooth module 210, a Bluetooth low energy (BLE) antenna 211, a UWB module 220, a first UWB antenna 221, a second UWB antenna 223, and an embedded secure element (eSE) module 230. At least one of the elements of the electronic device 101 illustrated in FIG. 2 (for example, the second UWB antenna 223) may be omitted, or at least one different element may be added thereto. The low-power Bluetooth module 210 or the UWB module 220 may be included in the communication module 190 in FIG. 1. The low-power Bluetooth module 210 may transmit/receive a low-power Bluetooth signal under the control of the processor 120. The low-power Bluetooth module 210 may transmit/receive the low-power Bluetooth signal through the BLE antenna 211.

The UWB module 220 may include a transmitter (TX) module for transmitting a UWB signal (for example, a poll, a response, or a final signal) for location measurement to an external electronic device, and a receiver (RX) module for receiving a UWB signal. The UWB signal may be transmitted/received through the first UWB antenna 221 or the second UWB antenna 223. The UWB module 220 may operate under the control of the processor 120, and may have a communication path (for example, a serial peripheral interface) formed therein so as to deliver a received UWB signal to the processor 120 or to receive a control signal from the processor 120.

The eSE module 230 may be a module configured to produce credential information according to the situation. The eSE module 230 may deliver the produced credential information to the UWB module 220. The eSE module 230 may be connected to the UWB module 220 by I-squared-C (I2C) communication. The eSE module 230 may be included inside or positioned outside the UWB module 220.

Figure 3:
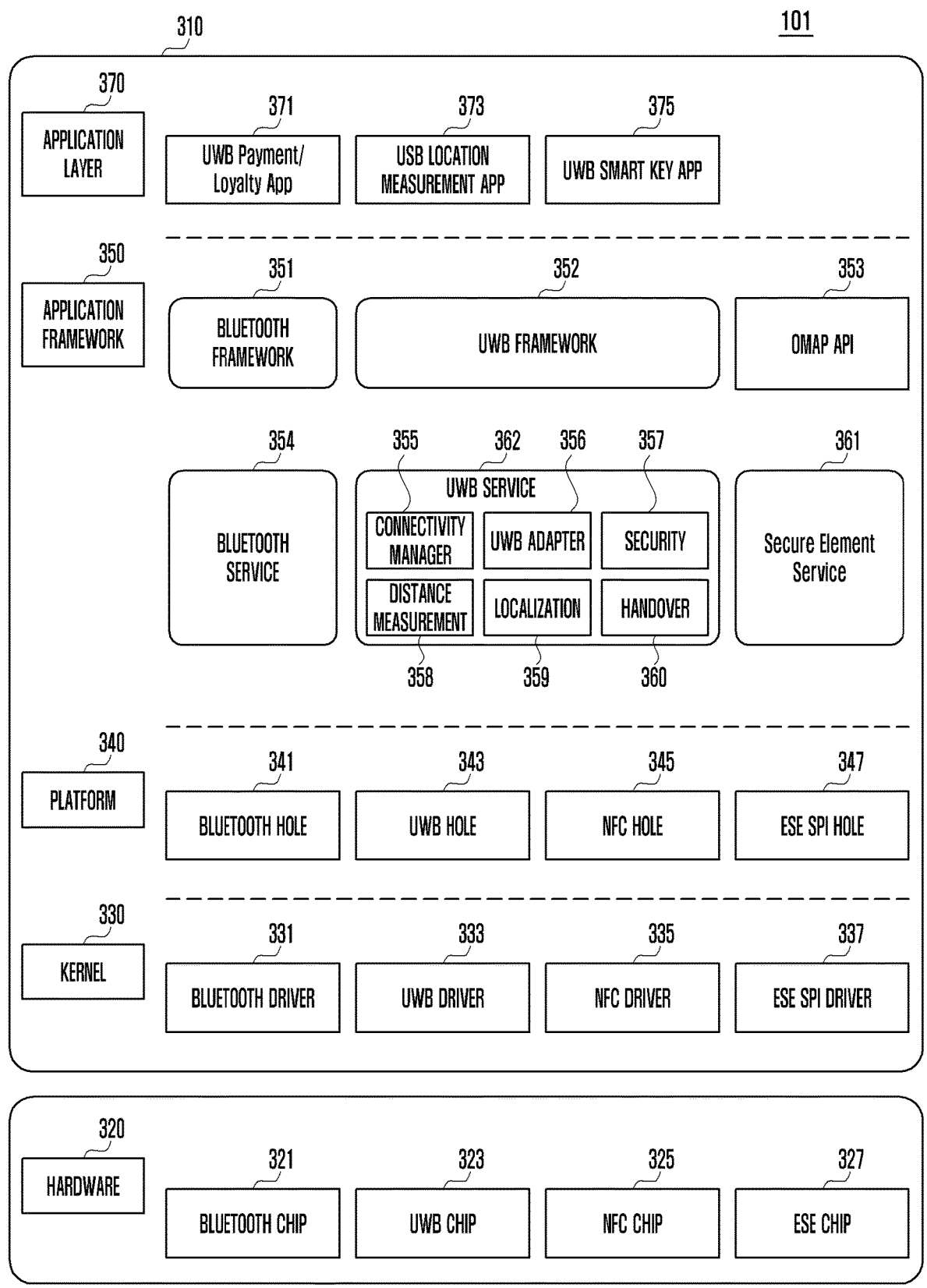
FIG. 3 is a block diagram of a program module of an electronic device supporting a UWB function, according to an embodiment.

FIG. 3 is a block diagram of a program module of an electronic device supporting a UWB function, according to an embodiment.

Referring to FIG. 3, the electronic device 101 includes a program module 310 including an OS configured to control various resources related to the electronic device 101 and/or various applications driven in the OS, and hardware 320. The OS may be, for example, Android, iOS™ Windows™, Symbian™, Tizen™, or Bada™. FIG. 3 may illustrate a program module 310 and hardware 320, which support a UWB function in connection with an Android™ OS-based electronic device 101.

The program module 310 may include a kernel 330, a platform 340, an application framework 350, or an application layer 370. At least a part of the program module 310 may be preloaded into the electronic device 101, or may be downloaded from an external electronic device (for example, an electronic device 102 or 104 or a server 106). The kernel 330 may include a device driver for driving the hardware 320 of the electronic device 101. For example, the device driver may include at least one of a Bluetooth driver 331, a UWB driver 333, an NFC driver 335, or an eSE SPI driver 327. The platform 340 may include, in order to control the device driver of the kernel 330, at least one of a Bluetooth hole 341, a UWB hole 343, an NFC hole 345, or an eSE SPI hole 347.

The application framework 350 may provide a function commonly required by the application layer 370, or may provide various functions to the application layer 370 such that the application layer 370 can efficiently use the limited system resource inside the electronic device 101. For example, the application framework 350 may include a Bluetooth framework 351, a UWB framework 352, an open multimedia applications platform (OMAP) API 353, a Bluetooth service 354, a secure element service 361, and a UWB service 362. The UWB service 362 may include a connectivity manager 355 for supporting a UWB-related API, a UWB adapter 356, security 357, distance measurement 358, localization 359, or handover 360. The electronic device 101 may measure the location of multiple external electronic devices by using the UWB adapter 356, the distance measurement 358, or the localization 359.

The application layer 370 may include a UWB payment/loyalty application 371, a UWB location measurement application 373, or a UWB smart key application 375.

An electronic device 101 may include at least one communication module 190; a memory 130; and a processor 120. The processor 120 may be configured to identify multiple external electronic devices, locations of which are to be measured, by using the at least one communication module 190; determine time schedule information based on the number of the multiple identified external electronic devices or based on a location measurement scheme; transmit the time schedule information to the multiple external electronic devices by using the at least one communication module 190; transmit first information to the multiple external electronic devices at a first time, based on the time schedule information, by using the at least one communication module 190; receive second information from one of the multiple external electronic devices at a second time, by using the at least one communication module 190; and determine a location of (i.e., a distance from) one of the multiple external electronic devices based on the first information or the second information.

The at least one communication module 190 may include an ultra-wide band (UWB) communication module or a communication module different from the UWB communication module.

The processor 120 may be configured to transmit a message for identifying whether or not to participate in a distance measurement to the multiple identified external electronic devices, by using the at least one communication module 190; receive a response message in response to the transmitted message; and determine the number of the multiple identified external electronic devices based on the received response message.

The location measurement scheme may include at least one of an SS-TWR scheme or a DS-TWR scheme.

The location measurement scheme may include an SS-TWR scheme, and the processor 120 may be configured, in the SS-TWR scheme, to receive the second information from a first external electronic device which received the first information at the second time; and determine a distance from the first external electronic device based on the first information or the second information.

The second information may include information regarding a time at which the first external electronic device received the first information or information regarding a time at which the first external electronic device transmitted the second information, and the processor 120 may be configured to obtain information regarding a processing time of the first external electronic device based on the second information; and determine the distance from the first external electronic device based on at least one of the obtained information regarding a processing time, information regarding a time at which the first information was transmitted, or information regarding a time at which the second information was received.

The second information may include information regarding a processing time of the first external electronic device, and the processor 120 may be configured to determine the distance from the first external electronic device based on at least one of information regarding a time at which the first information was transmitted, information regarding a time at which the second information was received, or the information regarding a processing time of the first external electronic device included in the second information.

The processor 120 may be configured to receive third information from a second external electronic device which received the first information at a third time, by using the at least one communication module 190; and determine the distance from the second external electronic device based on the first information or the third information.

The third information may include at least one of information regarding a time at which the second external electronic device received the first information, information regarding a time at which the second external electronic device received the second information, or information regarding a time at which the second external electronic device transmitted the third information, and the processor 120 may be configured to obtain information regarding a processing time of the second external electronic device based on the third information; and determine the distance from the second external electronic device based on the obtained information regarding a processing time, information regarding a time at which the first information was transmitted, or information regarding a time at which the third information was received.

The location measurement scheme may include a DS-TWR scheme, and the processor 120 may be configured, by using the at least one communication module 190 in the DS-TWR scheme, to receive the second information from the first external electronic device at the second time; receive third information from the second external electronic device at a third time; transmit fourth information to the first external electronic device and to the second external electronic device at a fourth time; receive fifth information from the first external electronic device at a fifth time; and determine the distance from the first external electronic device based on at least one of the second information, the fourth information, or the fifth information.

The fifth information may include at least one of information regarding a time at which the first external electronic device transmitted the second information, information regarding a time at which the first external electronic device received the fourth information, or information regarding a time at which the first external electronic device transmitted the fifth information, and the processor 120 may be configured to obtain information regarding a processing time of the first external electronic device based on the fifth information; and determine the distance from the first external electronic device based on at least one of the obtained information regarding a processing time, information regarding a time at which the second information was received, information regarding a time at which the fourth information was transmitted, or information regarding a time at which the fifth information was received.

The processor 120 may be configured to receive sixth information from the second external electronic device at a sixth time; and determine the distance from the second external electronic device based on at least one of the third information, the fourth information, or the sixth information.

An electronic device 101 may include at least one communication module 190; a memory 130; and a processor 120. The processor 120 may be configured to respond to a location measurement request from a first external electronic device by using the at least one communication module 190; receive time schedule information from the first external electronic device by using the at least one communication module 190; receive first information from the first external electronic device at a first time based on the time schedule information, by using the at least one communication module 190; transmit second information to the first external electronic device and to a second external electronic device at a second time by using the at least one communication module 190; receive third information from the second external electronic device at a third time by using the at least one communication module 190; and determine the distance from the second external electronic device based on the second information or the third information.

The third information may include at least one of information regarding a time at which the second external electronic device received the first information, information regarding a time at which the second external electronic device received the second information, or information regarding a time at which the second external electronic device transmitted the third information, and the processor 120 may be configured to obtain information regarding a processing time of the second external electronic device based on the third information in case that a SS-TWR scheme is used as a location measurement scheme; and determine the distance from the second external electronic device based on the obtained information regarding a processing time, information regarding a time at which the second information was transmitted, or information regarding a time at which the third information was received.

The processor 120 may be configured to receive fourth information from the first external electronic device at a fourth time; obtain information regarding a processing time of the first external electronic device based on the fourth information when a SS-TWR scheme is used as a location measurement scheme; and determine the distance from the first external electronic device based on at least one of the obtained information regarding a processing time, information regarding a time at which the second information was transmitted, or information regarding a time at which the fourth information was received.

The processor 120 may be configured to receive fourth information from the first external electronic device at a fourth time; and determine the distance from the first external electronic device based on at least one of the first information, the second information, or the fourth information in case that a DS-TWR scheme is used as a location measurement scheme.

The processor 120 may be configured, by using the at least one communication module 190, to transmit fifth information to the first external electronic device and to the second external electronic device at a fifth time; receive sixth information from the second external electronic device at a sixth time; and determine the distance from the second external electronic device based on at least one of the third information, the fifth information, or the sixth information.

Figure 4A:
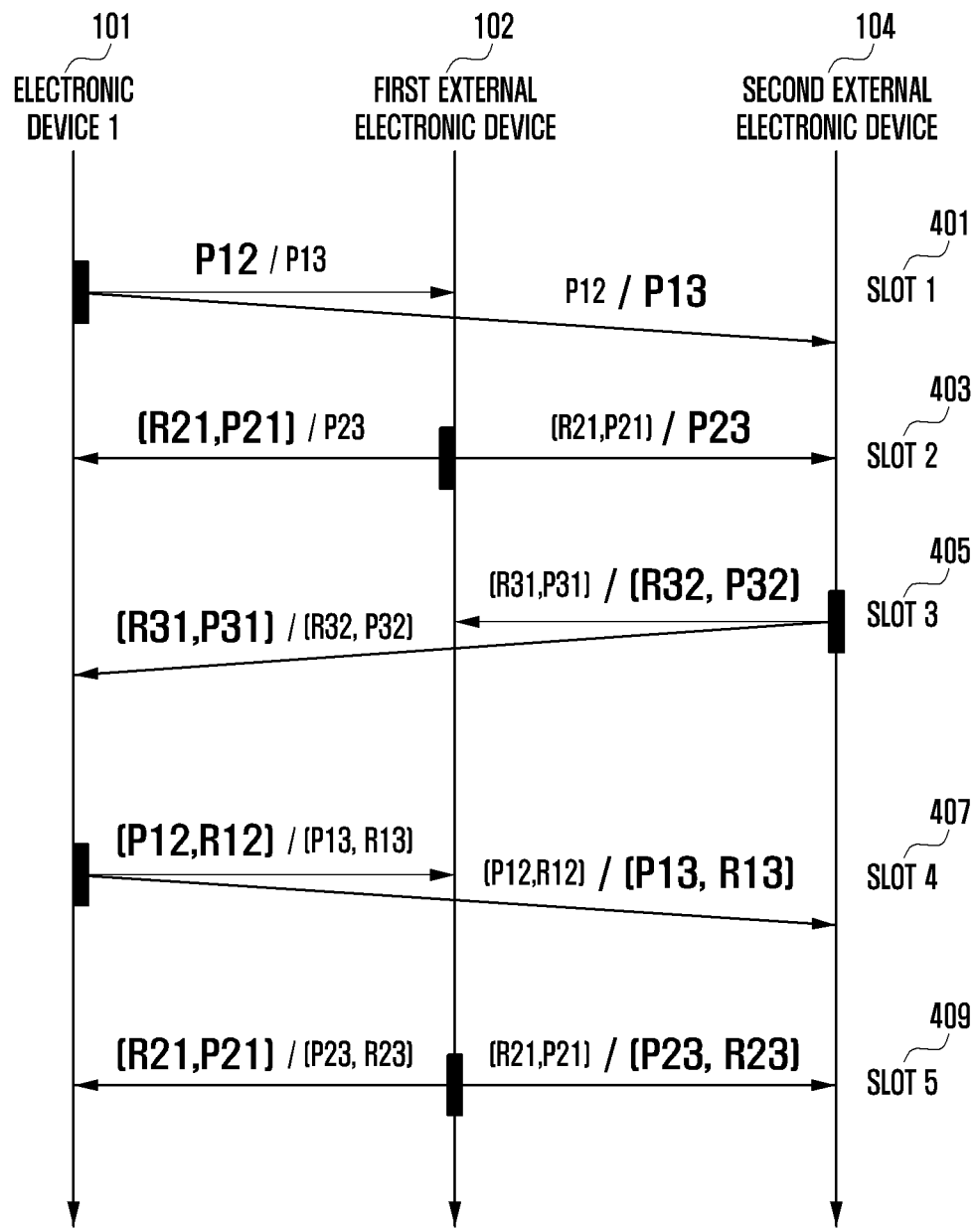
FIG. 4A is a flowchart illustrating a method for measuring the location of multiple electronic devices based on an SS-TWR scheme, according to an embodiment.
Figure 4B:
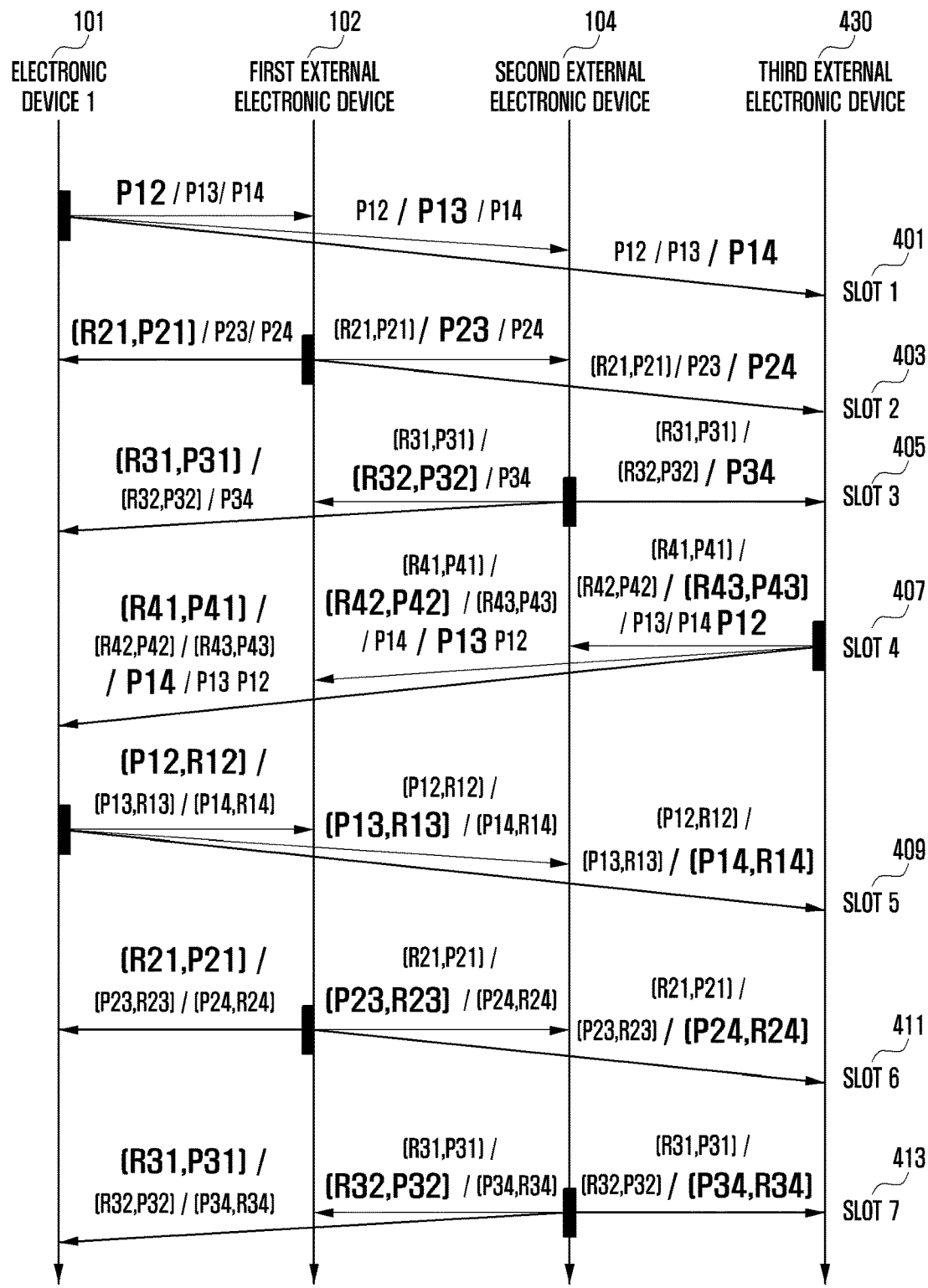
FIG. 4B is a flowchart illustrating a method for measuring the location of multiple electronic devices based on an SS-TWR scheme, according to an embodiment.

FIG. 4A is a flowchart illustrating a method for measuring the location of multiple electronic devices based on an SS-TWR scheme, according to an embodiment. FIG. 4B is a flowchart illustrating a method for measuring the location of multiple electronic devices based on an SS-TWR scheme, according to an embodiment.

FIG. 4A illustrates an example in which an electronic device 101, a first external electronic device 102 and a second external electronic device 104 measure the location (or distance) of each electronic device through UWB communication based on an SS-TWR scheme. According to the SS-TWR scheme, electronic devices may exchange a poll message and a response message with each other, thereby measuring the distance between respective electronic devices. It will be assumed in the following description that receiving or transmitting "information" refers to transmitting or receiving a poll message or a response message, but the information may be transmitted or received in a packet type.

It will be assumed in the following description, in order to help understanding of the disclosure, that the electronic device 101 is a master electronic device (for example, a first node), and the first external electronic device 102 and the second external electronic device 104 are slave electronic devices (for example, a second node and a third node). However, the disclosure is not limited to such an assumption. In addition, the first external electronic device 102 may correspond to a first electronic device, and the second external electronic device 104 may correspond to a second electronic device.

Referring to FIG. 4A, the electronic device 101 may identify an external electronic device positioned nearby through UWB communication or a different type of communication from the UWB (for example, Bluetooth or Wi-Fi) at the request of the user, at the request of a connected server 108, or at the request of the first external electronic device 102 or the second external electronic device 104. Alternatively, the electronic device 101 may identify an external electronic device positioned within a predetermined distance periodically or selectively, without any request. By identifying such an external electronic device, the electronic device 101 may identify a first external electronic device 102 or a second external electronic device 104. The electronic device 101 may determine time scheduling information based on the number of identified external electronic devices (for example, two). The time scheduling information may be used by the electronic device 101 to configure a time to transmit information (or a message) to the first external electronic device 102 and the second external electronic device 104, and a time to receive information from the first external electronic device 102 and the second external electronic device 104. For example, the electronic device 101 may determine the time schedule information based on the time necessary to acquire or transmit information necessary to identify the location of the first external electronic device 102 and the second external electronic device 104 according to the SS-TWR scheme. The electronic device 101 may transmit the determined time schedule information to the first external electronic device 102 and the second external electronic device 104.

For example, the time schedule information may be configured such that the electronic device 101 transmits information at a first time (or time interval) SLOT 1 401 and at a fourth time SLOT 4 407, the first external electronic device 102 transmits information at a second time SLOT 2 403 and at a fifth time SLOT 5 409, and the second external electronic device 104 transmits information at a third time SLOT 3 405. The time schedule information instructs each device to transmit information at a given time such that each electronic device can transmit information only at a time assigned thereto and cannot transmit information at any time other than the assigned time. In addition, each electronic device can identify, based on the time schedule information, which electronic device (for example, a device that corresponds to the source address) transmitted information at each time.

The electronic device 101 (for example, master electronic device) may transmit information to the first external electronic device 102 and the second external electronic device 104, based on the time schedule information, through UWB communication. The electronic device 101 may transmit information to the first external electronic device 102 and the second external electronic device 104 based on the time schedule information, and may receive information from the first external electronic device 102 and the second external electronic device 104. The first external electronic device 102 (for example, slave electronic device) may receive the time schedule information from the electronic device 101, may transmit information to the electronic device 101 and the second external electronic device 104 based on the time schedule information, and may receive information from the electronic device 101 and the second external electronic device 104. The second external electronic device 104 (for example, slave electronic device) may receive the time schedule information from the electronic device 101, may transmit information to the electronic device 101 and the first external electronic device 102 based on the time schedule information, and may receive information from the electronic device 101 and the first external electronic device 102.

The electronic device 101, the first external electronic device 102, and the second external electronic device 104 may or may not specify a destination address (for example, recipient address) to receive information, when transmitting information according to a protocol agreed upon between each other. For example, when information has no specified destination address, each electronic device may analyze (or parse) received information, may read only information necessary therefor, and may store the same in the memory 130. Although it will be assumed that the destination address is specified, this assumption does not limit the scope of the disclosure.

The electronic device 101 may transmit first information P12/P13 to the first external electronic device 102 and the second external electronic device 104 at the first time 401. The first information may include the identifier of the electronic device 101 or information regarding the time at which the electronic device 101 transmits the first information. The electronic device 101 may transmit identical first information to the first external electronic device 102 and the second external electronic device 104, and the first external electronic device 102 and the second external electronic device 104 may read information only corresponding to the first external electronic device 102 and the second external electronic device 104 among the first information, and may ignore information not corresponding to the first external electronic device 102 and the second external electronic device 104.

Hereinafter, numerals (for example, 12, 13, 21, and 23) following English letters (for example, P and R) may refer to a source address used to transmit information and a destination address used to receive information. The electronic device 101 may correspond to numeral "1", the first external electronic device 102 may correspond to numeral "2", and the second external electronic device 104 may correspond to numeral "3". For example, P12 may correspond to a poll message, which refers to the first message transmitted from electronic device 101 (for example, a device that corresponds to the source address numeral "1") to the first external electronic device 102 (for example, a device that corresponds to the destination address numeral "2"). P13 may correspond to a poll message, which refers to the first message transmitted from electronic device 101 to the second external electronic device 104 (for example, a device that corresponds to the destination address numeral "3"). The first information transmitted by the electronic device 101 may be configured as a single piece, P12 among the first information may correspond to the first external electronic device 102, and P13 may correspond to the second external electronic device 104. For example, the first external electronic device 102 may receive first information including P12/P13, may read information corresponding to P12 among the first information, and may store the same in the memory 130. In addition, the first external electronic device 102 may store information regarding the time at which the first information was received in the memory 130. The second external electronic device 104 may receive first information including P12/P13, may read information corresponding to P13 among the first information, and may store the same in the memory 130. In addition, the second external electronic device 104 may store information regarding the time at which the first information was received in the memory 130.

The first external electronic device 102 may transmit second information (for example, (R21,P21)/P23) to the electronic device 101 or the second external electronic device 104 at a second time SLOT 2 403. R21 may refer to a response message transmitted by the first external electronic device 102 in response to a poll message (for example, P12) received from the electronic device 101. P21 may refer to a poll message, which corresponds to a first message transmitted by the first external electronic device 102 (for example, a device that corresponds to the source address numeral "2") to the electronic device 101 (for example, a device that corresponds to the destination address numeral "1"). "(R21,P21)" may refer to both a first message (for example, P21) sent by the first external electronic device 102 to the electronic device 101 and a response message (for example, R21). P23 may refer to a poll message, which corresponds to a first message transmitted by the first external electronic device 102 (for example, a device that corresponds to the source address numeral "2") to the second external electronic device 104 (for example, a device that corresponds to the destination address numeral "3").

The second information may include information regarding the time at which the first external electronic device 102 received the first information, or information regarding the time at which the first external electronic device 102 transmitted the second information. The second information may include information regarding the processing time of the first external electronic device 102. The information regarding the processing time of the first external electronic device 102 may be for the electronic device 101 (for example, (R21, P21)). The information regarding the processing time of the first external electronic device 102 may correspond to a period of time between when the first external electronic device 102 received the first information and when the same transmitted the second information. Whether the second information will include information regarding the time at which each piece of information was received or transmitted or will include information regarding the processing time may vary according to the protocol agreed upon between the electronic device 101, the first external electronic device 102, and the second external electronic device 104.

At the second time 403, the electronic device 101 may receive the second information, may read information only corresponding to the electronic device 101 (for example, (R21, P21)) among the received second information, and may store the read information in the memory 130. The electronic device 101 may store information regarding the time at which the second information was received in the memory 130. The electronic device 101 may measure the distance from the first external electronic device 102 based on the first information or the second information. For example, when the second information includes information regarding the time at which the first information was received or information regarding the time at which the second information was transmitted, the electronic device 101 may obtain information regarding the processing time of the first external electronic device 102 based on the second information, and may measure the distance from the first external electronic device 102 based on at least one of the obtained processing time information, the information regarding the time at which the first information was transmitted, or the information regarding the time at which the second information was received. When the second information includes information regarding the processing time of the first external electronic device 102, the electronic device 101 may measure the distance from the first external electronic device 102 based on at least one of the processing time information included in the second information, the information regarding the time at which the first information was transmitted, or the information regarding the time at which the second information was received.

When receiving the second information from the first external electronic device 102, the electronic device 101 may acquire angle of arrival (AOA) information through multiple antennas (for example, antenna module 197, or UWB antenna 1 221 and UWB antenna 2 223), and may identify the relative location of the first external electronic device 102 based on the acquired AOA information and the distance from the first external electronic device 102.

At the second time 403, the second external electronic device 104 may receive the second information, may read information only corresponding to the second external electronic device 104 (for example, P23) among the received second information, and may store the read information in the memory 130. P23 may be information needed by the second external electronic device 104 to measure the distance from the first external electronic device 102. For example, the second external electronic device 104 may store information regarding the time at which the first external electronic device 102 transmitted the second information or information regarding the time at which the second information was received, in the memory 130.

The second external electronic device 104 may transmit third information (for example, (R31,P31)/(R32,P32)) to the electronic device 101 and the first external electronic device 102 at a third time SLOT 3 405. P31 may refer to a poll message, which corresponds to a first message transmitted by the second external electronic device 104 (for example, a device that corresponds to the source address numeral "3") to the electronic device 101 (for example, a device that corresponds to the destination address numeral "1"). R31 may refer to a response message transmitted by the second external electronic device 104 in response to a poll message P13 received from the electronic device 101. "(R31,P31)" may refer to both a poll message P31 sent by the second external electronic device 104 to the electronic device 101 and a response message R31.

The third information may include at least one of information regarding the time at which the second external electronic device 104 received the first information, information regarding the time at which the second external electronic device 104 received the second information, or information regarding the time at which the second external electronic device 104 transmitted the third information. Additionally or alternatively, the third information may include information regarding the processing time of the second external electronic device 104. The information regarding the processing time of the second external electronic device 104 may include information regarding a period of time (for example, first processing time information) between when the second external electronic device 104 received the first information and when the second external electronic device 104 transmitted the third information, and information regarding a period of time (for example, second processing time information) between when the second external electronic device 104 received the second information and when the second external electronic device 104 transmitted the third information. The information regarding the processing time of the second external electronic device 104 may include first processing time information corresponding to the electronic device 101 and second processing time information corresponding to the first external electronic device 102.

At the third time 405, the electronic device 101 may receive the third information, may read information only corresponding to the electronic device 101 (for example, (R31,P31)) among the received third information, and may store the read information in the memory 130. The electronic device 101 may measure the distance from the second external electronic device 104 based on at least one of the first information transmitted at the first time 401 or the third information received at the third time 405. For example, when the third information includes time information, the electronic device 101 may obtain information regarding the processing time of the second external electronic device 104 based on the third information, and may measure the distance from the second external electronic device 104 based on at least one of the obtained processing time information, information regarding the time at which the first information was transmitted, or information regarding the time at which the third information was received. Additionally or alternatively, when the third information includes processing time information (for example, first processing time information), the electronic device 101 may measure the distance from the second external electronic device 104 based on at least one of the first processing time information, information regarding the time at which the first information was transmitted, or information regarding the time at which the third information was received.

When receiving the third information from the second external electronic device 104, the electronic device 101 may acquire AOA information through the antenna module 197, and may identify the relative location of the second external electronic device 104 based on the acquired AOA information and the distance from the second external electronic device 104.

At the third time 405, the first external electronic device 102 may receive third information (for example, (R31,P31)/(R32,P32)) from the second external electronic device 104. The first external electronic device 102 may read information only corresponding to the first external electronic device 102 (for example, (R32,P32)) among the received third information, and may store the read information in the memory 130. "(R32,P32)" may refer to both a first message (for example, P32) transmitted by the second external electronic device 104 (for example, a device that corresponds to the source address numeral "3") to the first external electronic device 102 (for example, a device that corresponds to the destination address numeral "2") and a response message (for example, R32). At the third time 405, the first external electronic device 102 may measure the distance from the second external electronic device 104 based on at least one of the second information transmitted at the second time 403 or the third information received at the third time 405.

When the third information includes time information, the first external electronic device 102 may obtain information regarding the processing time of the second external electronic device 104 based on the third information, and may measure the distance from the second external electronic device 104 based on at least one of the obtained processing time information, information regarding the time at which the second information was transmitted, or information regarding the time at which the third information was received. Additionally or alternatively, when the third information includes processing time information (for example, second processing time information), the first external electronic device 102 may measure the distance from the second external electronic device 104 based on at least one of the second processing time information, information regarding the time at which the second information was transmitted, or information regarding the time at which the third information was received.

When receiving the third information from the second external electronic device 104, the first external electronic device 102 may acquire AOA information through the antenna module 197, and may identify the relative location of the second external electronic device 104 based on the acquired AOA information and the distance from the second external electronic device 104.

The electronic device 101 may transmit fourth information (for example, (P12,R12)/(P13,R13)) to the first external electronic device 102 and the second external electronic device 104 at a fourth time SLOT 4 407. "(P12,R12)" may refer to a poll message (for example, P12) transmitted by the electronic device 101 (for example, a device that corresponds to the source address numeral "1") to the first external electronic device 102 (for example, a device that corresponds to the destination address numeral "2") and a response message (for example, R12) transmitted by the electronic device 101 in response to a message (for example, (R21,P21)) received from the first external electronic device 102. "(P13,R13)" may refer to a poll message (for example, P13) transmitted by the electronic device 101 (for example, a device that corresponds to the source address numeral "1") to the second external electronic device 104 (for example, a device that corresponds to the destination address numeral "3") and a response message (for example, R13) transmitted by the electronic device 101 in response to a message (for example, (R31,P31)) received from the second external electronic device 104.

The fourth information may include at least one of information regarding the time at which the electronic device 101 received the second information, information regarding the time at which the electronic device 101 received the third information, or information regarding the time at which the electronic device 101 transmitted the fourth information. Additionally or alternatively, the fourth information may include information regarding the processing time of the electronic device 101. The information regarding the processing time of the electronic device 101 may include information regarding a period of time (for example, first processing time information) between when the electronic device 101 received the second information and when the same transmitted the fourth information, and information regarding a period of time (for example, second processing time information) between when the electronic device 101 received the third information and when the electronic device 101 transmitted the fourth information. The information regarding the first processing time of the electronic device 101 may correspond to the first external electronic device 102, and the information regarding the second processing time of the electronic device 101 may correspond to the second external electronic device 104.

At the fourth time 407, the first external electronic device 102 may read information only corresponding to the first external electronic device 102 (for example, (P12,R12)) among the received fourth information, and may store the read information in the memory 130. The first external electronic device 102 may measure the distance from the electronic device 101 based on at least one of the second information transmitted at the second time 403 or the fourth information received at the fourth time 407. For example, when the fourth information includes time information, the first external electronic device 102 may obtain processing time information based on the fourth information, and may measure the distance from the electronic device 101 based on at least one of the obtained processing time information, information regarding the time at which the second information was transmitted, or information regarding the time at which the fourth information was received.

Additionally or alternatively, when the fourth information includes processing time information (for example, first processing time information), the first external electronic device 102 may measure the distance from the electronic device 101 based on at least one of the first processing time information, information regarding the time at which the second information was transmitted, or information regarding the time at which the fourth information was received. When receiving the fourth information from the electronic device 101, the first external electronic device 102 may acquire AOA information through multiple antennas, and may identify the relative location of the electronic device 101 based on the acquired AOA information and the distance from the electronic device 101.

At the fourth time 407, the second external electronic device 104 may receive fourth information (for example, (P12,R12)/(P13,R13)) from the electronic device 101, may read information only corresponding to the second external electronic device 104 (for example, (P13,R13)) among the received fourth information, and may store the read information in the memory 130. At the fourth time 407, the second external electronic device 104 may measure the distance from the electronic device 101 based on at least one of the third information transmitted at the third time 405 or the fourth information received at the fourth time 407. When the fourth information includes time information, the second external electronic device 104 may obtain processing time information based on the fourth information, and may measure the distance from the electronic device 101 based on at least one of the obtained processing time information, information regarding the time at which the third information was transmitted, or information regarding the time at which the fourth information was received.

Additionally or alternatively, when the fourth information includes processing time information (for example, second processing time information), the second external electronic device 104 may measure the distance from the electronic device 101 based on at least one of the second processing time information, information regarding the time at which the third information was transmitted, or information regarding the time at which the fourth information was received. When receiving the fourth information from the electronic device 101, the second external electronic device 104 may acquire AOA information through multiple antennas, and may identify the relative location of the electronic device 101 based on the acquired AOA information and the distance from the electronic device 101.

The first external electronic device 102 may transmit fifth information (for example, (R21,P21)/(P23,R23)) to the electronic device 101 or the second external electronic device 104 at a fifth time SLOT 5 409. "(R21,P21)" may refer to both a response message (for example, R21) transmitted by the first external electronic device 102 in response to a message (for example, (P12,R12)) received from the electronic device 101 and a poll message (for example, P21) transmitted by the first external electronic device 102 (for example, source address numeral "2") to the electronic device 101 (for example, a device that corresponds to the destination address numeral "1").

The fifth information may include at least one of information regarding the time at which the first external electronic device 102 received the third information, information regarding the time at which the first external electronic device 102 received the fourth information, or information regarding the time at which the first external electronic device 102 transmitted the fifth information. Additionally or alternatively, the fifth information may include information regarding the processing time of the first external electronic device 102. The information regarding the processing time of the first external electronic device 102 may include information regarding a period of time between when the first external electronic device 102 received the third information and when the first external electronic device 102 transmitted the fifth information. Alternatively, the fifth information may further include information regarding a period of time between when the first external electronic device 102 received the fourth information and when the first external electronic device 102 transmitted the fifth information.

At the fifth time 409, the second external electronic device 104 may receive fifth information (for example, (R21,P21)/(P23,R23)) from the first external electronic device 102, may read information only corresponding to the second external electronic device 104 (for example, (P23,R23)) among the received fifth information, and may store the read information in the memory 130. At the fifth time 409, the second external electronic device 104 may measure the distance from the first external electronic device 102 based on at least one of the third information transmitted at the third time 405 or the fifth information received at the fifth time 409. For example, when the fifth information includes time information, the second external electronic device 104 may obtain processing time information based on the fifth information, and may measure the distance from the first external electronic device 102 based on the obtained processing time information, information regarding the time at which the third information was transmitted, or information regarding the time at which the fifth information was received.

Additionally or alternatively, when the fifth information includes processing time information, the second external electronic device 104 may measure the distance from the first external electronic device 102 based on at least one of the processing time information included in the fifth information, information regarding the time at which the third information was transmitted, or information regarding the time at which the fifth information was received. When receiving the fifth information from the first external electronic device 102, the second external electronic device 104 may acquire AOA information through multiple antennas, and may identify the relative location of the first external electronic device 102 based on the acquired AOA information and the distance from the first external electronic device 102.

FIG. 4B illustrates an example in which an electronic device 101 measures the location of each electronic device through UWB communication according to an SS-TWR scheme with three external electronic devices that include the first external electronic device 102, the second external electronic device 104 and the third external electronic device 430. FIG. 4B is different from FIG. 4A in that there are three external electronic devices, and the remaining operations are identical to those in FIG. 4A. Repeated descriptions will be shortened in the following description with reference to FIG. 4B.

Referring to FIG. 4B, the electronic device 101 may identify an external electronic device positioned nearby through UWB communication or a different type of communication from the UWB (for example, Bluetooth or Wi-Fi) at the request of the user, at the request of a connected server 108, or at the request of the first external electronic device 102, the second external electronic device 104, or the third external electronic device 430. The electronic device 101 may determine time scheduling information based on the number of identified external electronic devices (for example, three). For example, the electronic device 101 may determine the time schedule information based on the time necessary to acquire or transmit information necessary to identify the location of the three electronic devices (for example, the first external electronic device 102, the second external electronic device 104, and the third external electronic device 430) according to the SS-TWR scheme. The electronic device 101 may transmit the determined time schedule information to the first external electronic device 102, the second external electronic device 104, and the third external electronic device 430.

The electronic device 101 (for example, master electronic device) may transmit information to the first external electronic device 102, the second external electronic device 104, and the third external electronic device 430 based on the time schedule information, and may receive information from the first external electronic device 102, the second external electronic device 104, and the third external electronic device 430 based on the time schedule information. The first time 401 to the third time 405 are identical or similar to those described with reference to FIG. 4A, and detailed descriptions thereof will be omitted herein with reference to FIG. 4B. Hereinafter, numerals (for example, 12, 13, 14, 21, 23, and 24) following English letters (for example, P, and R) may refer to a source address used to transmit information and a destination address used to receive information. The electronic device 101 may correspond to numeral "1", the first external electronic device 102 may correspond to numeral "2", the second external electronic device 104 may correspond to numeral "3", and the third external electronic device 430 may correspond to numeral "4".

At the fourth time 407, the third external electronic device 430 may transmit fourth information (for example, (R41, P41)/(R42,P42)/(R43,P43)) to the electronic device 101, the first external electronic device 102, or the second external electronic device 104. "(R41,P41)" may refer to both a poll message (for example, P41) transmitted by the third external electronic device 430 (for example, a device that corresponds to the source address numeral "4") to the electronic device 101 (for example, a device that corresponds to the destination address numeral "1") and a response message (for example, R41). "(R42,P42)" may refer to both a poll message (for example, P42) transmitted by the third external electronic device 430 (for example, source address numeral "4") to the first external electronic device 102 (for example, a device that corresponds to the destination address numeral "2") and a response message (for example, R42). "(R43, P43)" may refer to both a poll message (for example, P43) transmitted by the third external electronic device 430 (for example, a device that corresponds to the source address numeral "4") to the second external electronic device 104 (for example, a device that corresponds to the destination address numeral "3") and a response message (for example, R43).

For example, the fourth information may include at least one of information regarding the time at which the third external electronic device 430 received the first information, information regarding the time at which the third external electronic device 430 received the second information, information regarding the time at which the third external electronic device 430 received the third information, or information regarding the time at which the third external electronic device 430 transmitted the fourth information. Additionally or alternatively, the fourth information may include information regarding the processing time of the third external electronic device 430. The information regarding the processing time of the third external electronic device 430 may include first processing time information corresponding to a period of time between when the third external electronic device 430 received the first information and when the third external electronic device 430 transmitted the fourth information; second processing time information corresponding to a period of time between when the third external electronic device 430 received the second information and when the third external electronic device 430 transmitted the fourth information; and third processing time information corresponding to a period of time between when the third external electronic device 430 received the third information and when the same transmitted the fourth information. The first processing time information may be needed by the electronic device 101 to measure the distance from the third external electronic device 430. The second processing time information may be needed by the first external electronic device 102 to measure the distance from the third external electronic device 430. The third processing time information may be needed by the second external electronic device 104 to measure the distance from the third external electronic device 430.

Whether the fourth information will include information regarding the time at which each piece of information was received or transmitted or will include information regarding the processing time may vary according to the protocol agreed upon between the electronic device 101, the first external electronic device 102, the second external electronic device 104, and the third external electronic device 430.

At the fourth time 407, the electronic device 101 may receive fourth information (for example, (R41,P41)/(R42, P42)/(R43,P43)) from the third external electronic device 430, may read information only corresponding to the electronic device 101 (for example, (R41,P41)) among the received fourth information, and may store the read information in the memory 130. At the fourth time 407, the electronic device 101 may measure the distance from the third external electronic device 430 based on at least one of the first information transmitted at the first time 401 or the fourth information received at the fourth time 407. For example, when the fourth information includes time information, the electronic device 101 may obtain information regarding the processing time of the third external electronic device 430 based on the fourth information, and may measure the distance from the third external electronic device 430 based on at least one of the obtained processing time information, the information regarding the time at which the first information was transmitted, or the information regarding the time at which the fourth information was received. Alternatively, when the fourth information includes information regarding the processing time of the third external electronic device 430, the electronic device 101 may measure the distance from the first external electronic device 102 based on at least one of the processing time information included in the fourth information, the information regarding the time at which the first information was transmitted, or the information regarding the time at which the fourth information was received.

When receiving the fourth information from the third external electronic device 430, the electronic device 101 may acquire AOA information through multiple antennas (for example, antenna module 197, or UWB antenna 1 221 and UWB antenna 2 223), and may identify the relative location of the third external electronic device 430 based on the acquired AOA information and the distance from the third external electronic device 430.

At the fourth time 407, the first external electronic device 102 may receive fourth information (for example, (R41, P41)/(R42,P42)/(R43,P43)) from the third external electronic device 430, may read information only corresponding to the first external electronic device 102 (for example, (R42,P42)), among the received fourth information, and may store the same in the memory 130. At the fourth time 407, the first external electronic device 102 may measure the distance from the third external electronic device 430 based on at least one of the second information transmitted at the second time 403 or the fourth information received at the fourth time 407. For example, when the fourth information includes time information, the first external electronic device 102 may obtain information regarding the processing time of the third external electronic device 430 based on the fourth information, and may measure the distance from the third external electronic device 430 based on at least one of the obtained processing time information, the information regarding the time at which the second information was transmitted, or the information regarding the time at which the fourth information was received. Alternatively, when the fourth information includes information regarding the processing time of the third external electronic device 430, the first external electronic device 102 may measure the distance from the third external electronic device 430 based on at least one of the processing time information included in the fourth information, the information regarding the time at which the second information was transmitted, or the information regarding the time at which the fourth information was received.

When receiving the fourth information from the third external electronic device 430, the first external electronic device 102 may acquire AOA information through multiple antennas (for example, antenna module 197, or UWB antenna 1 221 and UWB antenna 2 223), and may identify the relative location of the third external electronic device 430 based on the acquired AOA information and the distance from the third external electronic device 430.

At the fourth time 407, the second external electronic device 104 may receive fourth information (for example, (R41,P41)/(R42,P42)/(R43,P43)) from the third external electronic device 430, may read information only corresponding to the second external electronic device 104 (for example, (R43,P43)) among the received fourth information, and may store the same in the memory 130. At the fourth time 407, the second external electronic device 104 may measure the distance from the third external electronic device 430 based on at least one of the third information transmitted at the third time 405 or the fourth information received at the fourth time 407. For example, when the fourth information includes time information, the second external electronic device 104 may obtain information regarding the processing time of the third external electronic device 430 based on the fourth information, and may measure the distance from the third external electronic device 430 based on at least one of the obtained processing time information, the information regarding the time at which the third information was transmitted, or the information regarding the time at which the fourth information was received. Alternatively, when the fourth information includes information regarding the processing time of the third external electronic device 430, the second external electronic device 104 may measure the distance from the third external electronic device 430 based on at least one of the processing time information included in the fourth information, the information regarding the time at which the third information was transmitted, or the information regarding the time at which the fourth information was received.

When receiving the fourth information from the third external electronic device 430, the second external electronic device 104 may acquire AOA information through multiple antennas (for example, antenna module 197, or UWB antenna 1 221 and UWB antenna 2 223), and may identify the relative location of the third external electronic device 430 based on the acquired AOA information and the distance from the third external electronic device 430.

At the fifth time 409, the electronic device 101 may transmit fifth information (for example, (P12,R12)/(P13,R13)/(P14,R14)) to the first external electronic device 102 and to the third external electronic device 430. "(P12,R12)" may refer to both a poll message (for example, P12) transmitted by the electronic device 101 (for example, a device corresponding to the source address numeral "1") to the first external electronic device 102 (for example, a device corresponding to the destination address numeral "2") and a response message (for example, R12). "(P13,R13)" may refer to both a poll message (for example, P13) transmitted by the electronic device 101 (for example, a device corresponding to the source address numeral "1") to the second external electronic device 104 (for example, a device corresponding to the destination address numeral "3") and a response message (for example, R13). "(P14,R14)" may refer to both a poll message (for example, P14) transmitted by the electronic device 101 (for example, a device corresponding to the source address numeral "1") to the third external electronic device 430 (for example, a device corresponding to the destination address numeral "4") and a response message (for example, R14). The fifth information may include at least one of information regarding the time at which the electronic device 101 received the second information, information regarding the time at which the electronic device 101 received the third information, information regarding the time at which the electronic device 101 received the fourth information, or information regarding the time at which the electronic device 101 transmitted the fifth information.

Additionally or alternatively, the fifth information may include information regarding the processing time of the electronic device 101. The information regarding the processing time of the electronic device 101 may include first processing time information corresponding to a period of time between when the electronic device 101 received the second information and when the same transmitted the fifth information, second processing time information corresponding to a period of time between when the electronic device 101 received the third information and when the electronic device 101 transmitted the fifth information, and third processing time information corresponding to a period of time between when the electronic device 101 received the fourth information and when the electronic device 101 transmitted the fifth information. The first processing time information may be needed by the first external electronic device 102 to measure the distance from the electronic device 101. The second processing time information may be needed by the second external electronic device 104 to measure the distance from the electronic device 101. The third processing time information may be needed by the third external electronic device 430 to measure the distance from the electronic device 101.

At the fifth time 409, the first external electronic device 102 may receive the fifth information (for example, (P12, R12)/(P13,R13)/(P14,R14)) from the electronic device 101, may read information only corresponding to the first external electronic device 102 (for example, (P12,R12)) among the received fifth information, and may store the read information in the memory 130. At the fifth time 409, the first external electronic device 102 may measure the distance from the electronic device 101 based on at least one of the second information transmitted at the second time 403 or the fifth information received at the fifth time 409.

When the fifth information includes time information, the first external electronic device 102 may obtain information regarding the processing time of the electronic device 101 based on the fifth information, and may measure the distance from the electronic device 101 based on at least one of the obtained processing time information, the information regarding the time at which the second information was transmitted, or the information regarding the time at which the fifth information was received. Alternatively, when the fifth information includes information regarding the processing time of the electronic device 101, the first external electronic device 102 may measure the distance from the electronic device 101 based on at least one of the processing time information included in the fifth information, the information regarding the time at which the second information was transmitted, or the information regarding the time at which the fifth information was received.

When receiving the fifth information from the electronic device 101, the first external electronic device 102 may acquire AOA information through multiple antennas and may identify the relative location of the electronic device 101 based on the acquired AOA information and the distance from the electronic device 101.

At the fifth time 409, the second external electronic device 104 may receive the fifth information (for example, (P12, R12)/(P13,R13)/(P14,R14)) from the electronic device 101, may read information only corresponding to the second external electronic device 104 (for example, (P13,R13)) among the received fifth information, and may store the read information in the memory 130. At the fifth time 409, the second external electronic device 104 may measure the distance from the electronic device 101 based on at least one of the third information transmitted at the third time 405 or the fifth information received at the fifth time 409. For example, when the fifth information includes time information, the second external electronic device 104 may obtain information regarding the processing time of the electronic device 101 based on the fifth information, and may measure the distance from the electronic device 101 based on at least one of the obtained processing time information, the information regarding the time at which the third information was transmitted, or the information regarding the time at which the fifth information was received. Alternatively, when the fifth information includes information regarding the processing time of the electronic device 101, the second external electronic device 104 may measure the distance from the electronic device 101 based on at least one of the processing time information included in the fifth information, the information regarding the time at which the third information was transmitted, or the information regarding the time at which the fifth information was received.

When receiving the fifth information from the electronic device 101, the second external electronic device 104 may acquire AOA information through multiple antennas and may identify the relative location of the electronic device 101 based on the acquired AOA information and the distance from the electronic device 101.

At the fifth time 409, the third external electronic device 430 may receive the fifth information (for example, (P12, R12)/(P13,R13)/(P14,R14)) from the electronic device 101, may read information only corresponding to the third external electronic device 430 (for example, (P14,R14)) among the received fifth information, and may store the read information in the memory 130. At the fifth time 409, the third external electronic device 430 may measure the distance from the electronic device 101 based on at least one of the fourth information transmitted at the fourth time 407 or the fifth information received at the fifth time 409. For example, when the fifth information includes time information, the third external electronic device 430 may obtain information regarding the processing time of the electronic device 101 based on the fifth information, and may measure the distance from the electronic device 101 based on at least one of the obtained processing time information, the information regarding the time at which the fourth information was transmitted, or the information regarding the time at which the fifth information was received. Alternatively, when the fifth information includes information regarding the processing time of the electronic device 101, the third external electronic device 430 may measure the distance from the electronic device 101 based on at least one of the processing time information included in the fifth information, the information regarding the time at which the fourth information was transmitted, or the information regarding the time at which the fifth information was received.

When receiving the fifth information from the electronic device 101, the third external electronic device 430 may acquire AOA information through multiple antennas and may identify the relative location of the electronic device 101 based on the acquired AOA information and the distance from the electronic device 101.

At the sixth time 411, the first external electronic device 102 may transmit sixth information (for example, (R21, P21)/(P23,R23)/(P24,R24) to the electronic device 101, the second external electronic device 104, and the third external electronic device 430. "(R21,P21)" may refer to both a poll message (for example, P21) transmitted by the first external electronic device 102 (for example, a device that corresponds to source address numeral "2") to the electronic device 101 (for example, a device that corresponds to destination address numeral "1") and a response message (for example, R21). "(P23,R23)" may refer to both a poll message (for example, P23) transmitted by the first external electronic device 102 (for example, a device that corresponds to source address numeral "2") to the second external electronic device 104 (for example, a device that corresponds to destination address numeral "3") and a response message (for example, R23). "(P24,R24)" may refer to both a poll message (for example, P24) transmitted by the first external electronic device 102 (for example, a device that corresponds to source address numeral "2") to the third external electronic device 430 (for example, a device that corresponds to destination address numeral "4") and a response message (for example, R24).

The sixth information may include at least one of information regarding the time at which the first external electronic device 102 received the third information, information regarding the time at which the first external electronic device 102 received the fourth information, information regarding the time at which the first external electronic device 102 received the fifth information, or information regarding the time at which the first external electronic device 102 transmitted the sixth information. Additionally or alternatively, the sixth information may include information regarding the processing time of the first external electronic device 102. The information regarding the processing time of the first external electronic device 102 may include at least one of first processing time information corresponding to a period of time between when the first external electronic device 102 received the third information and when the first external electronic device 102 transmitted the sixth information, or second processing time information corresponding to a period of time between when the first external electronic device 102 received the fourth information and when the first external electronic device 102 transmitted the sixth information. In addition, the information regarding the processing time of the first external electronic device 102 may further include third processing time information corresponding to a period of time between when the first external electronic device 102 received the fifth information and when the first external electronic device 102 transmitted the sixth information.

The first processing time information may be needed by the second external electronic device 104 to measure the distance from the first external electronic device 102. The second processing time information may be needed by the third external electronic device 430 to measure the distance from the first external electronic device 102. The third processing time information may be needed by the electronic device 101 to measure the distance from the first external electronic device 102.

At the sixth time 411, the second external electronic device 104 may receive the sixth information (for example, (R21,P21)/(P23,R23)/(P24,R24)) from the first external electronic device 102, may read information only corresponding to the second external electronic device 104 (for example, (P23,R23)) among the received sixth information, and may store the same in the memory 130. At the sixth time 411, the second external electronic device 104 may measure the distance from the first external electronic device 102 based on at least one of the third information transmitted at the third time 405 or the sixth information received at the sixth time 411. For example, when the sixth information includes time information, the second external electronic device 104 may obtain information regarding the processing time of the first external electronic device 102 based on the sixth information, and may measure the distance from the first external electronic device 102 based on at least one of the obtained processing time information, the information regarding the time at which the third information was transmitted, or the information regarding the time at which the sixth information was received. Alternatively, when the sixth information includes information regarding the processing time of the first external electronic device 102, the second external electronic device 104 may measure the distance from the first external electronic device 102 based on at least one of the processing time information included in the sixth information, the information regarding the time at which the third information was transmitted, or the information regarding the time at which the sixth information was received.

When receiving the sixth information from the first external electronic device 102, the second external electronic device 104 may acquire AOA information through multiple antennas and may identify the relative location of the first external electronic device 102 based on the acquired AOA information and the distance from the first external electronic device 102.

At the sixth time 411, the third external electronic device 430 may receive the sixth information (for example, (R21, P21)/(P23,R23)/(P24,R24)) from the first external electronic device 102, may read information only corresponding to the third external electronic device 430 (for example, (P24, R24)) among the received sixth information, and may store the read information in the memory 130. At the sixth time 411, the third external electronic device 430 may measure the distance from the first external electronic device 102 based on at least one of the fourth information transmitted at the fourth time 407 or the sixth information received at the sixth time 411. For example, when the sixth information includes time information, the third external electronic device 430 may obtain information regarding the processing time of the first external electronic device 102 based on the sixth information, and may measure the distance from the first external electronic device 102 based on at least one of the obtained processing time information, the information regarding the time at which the fourth information was transmitted, or the information regarding the time at which the sixth information was received. Alternatively, when the sixth information includes information regarding the processing time of the first external electronic device 102, the third external electronic device 430 may measure the distance from the first external electronic device 102 based on at least one of the processing time information included in the sixth information, the information regarding the time at which the fourth information was transmitted, or the information regarding the time at which the sixth information was received.

When receiving the sixth information from the first external electronic device 102, the third external electronic device 430 may acquire AOA information through multiple antennas and may identify the relative location of the first external electronic device 102 based on the acquired AOA information and the distance from the first external electronic device 102.

At the seventh time 413, the second external electronic device 104 may transmit seventh information (for example, (R31,P31)/(R32,P32)/(P34,R34)) to the electronic device 101, the first external electronic device 102, and the third external electronic device 430. "(R31,P31)" may refer to both a poll message (for example, P31) transmitted by the second external electronic device 104 (for example, a device that corresponds to the source address numeral "3") to the electronic device 101 (for example, a device that corresponds to the destination address numeral "1") and a response message (for example, R31). "(R32,P32)" may refer to both a poll message (for example, P32) transmitted by the second external electronic device 104 (for example, a device that corresponds to the source address numeral "3") to the first external electronic device 102 (for example, a device that corresponds to the destination address numeral "2") and a response message (for example, R32). "(P34, R34)" may refer to both a poll message (for example, P34) transmitted by the second external electronic device 104 (for example, a device that corresponds to the source address numeral "3") to the third external electronic device 430 (for example, a device that corresponds to the destination address numeral "4") and a response message (for example, R34).

The seventh information may include at least one of information regarding the time at which the second external electronic device 104 received the fourth information, information regarding the time at which the second external electronic device 104 received the fifth information, information regarding the time at which the second external electronic device 104 received the sixth information, or information regarding the time at which the second external electronic device 104 transmitted the seventh information. Additionally or alternatively, the seventh information may include information regarding the processing time of the second external electronic device 104. The information regarding the processing time of the second external electronic device 104 may include information regarding a period of time between when the second external electronic device 104 received the fourth information and when the same transmitted the seventh information. The information regarding the processing time of the second external electronic device 104 may be needed by the third external electronic device 430 to measure the distance from the second external electronic device 104. The information regarding the processing time of the second external electronic device 104 may further include information regarding a period of time between when the second external electronic device 104 received the fifth information and when the same transmitted the seventh information, or information regarding a period of time between when the second external electronic device 104 received the sixth information and when the same transmitted the seventh information.

At the seventh time 413, the third external electronic device 430 may receive the seventh information (for example, (R31,P31)/(R32,P32)/(P34,R34)) from the second external electronic device 104, may read information only corresponding to the third external electronic device 430 (for example, (P34,R34)) among the received seventh information, and may store the read information in the memory 130. At the seventh time 413, the third external electronic device 430 may measure the distance from the second external electronic device 104 based on at least one of the fourth information transmitted at the fourth time 407 or the seventh information received at the seventh time 413. For example, when the seventh information includes time information, the third external electronic device 430 may obtain information regarding the processing time of the second external electronic device 104 based on the seventh information, and may measure the distance from the second external electronic device 104 based on at least one of the obtained processing time information, the information regarding the time at which the fourth information was transmitted, or the information regarding the time at which the seventh information was received. Alternatively, when the seventh information includes information regarding the processing time of the second external electronic device 104, the third external electronic device 430 may measure the distance from the second external electronic device 104 based on at least one of the processing time information included in the seventh information, the information regarding the time at which the fourth information was transmitted, or the information regarding the time at which the seventh information was received.

When receiving the seventh information from the second external electronic device 104, the third external electronic device 430 may acquire AOA information through multiple antennas and may identify the relative location of the second external electronic device 104 based on the acquired AOA information and the distance from the second external electronic device 104.

Different types of packets may be used according to whether the SS-TWR scheme or the DS-TWR scheme is employed. Hereinafter, FIG. 4C and FIG. 4D illustrate packets according to the SS-TWR scheme, and FIG. 7C, FIG. 7D, and FIG. 7E illustrate packets according to the DS-TWR scheme.

Figure 4C:
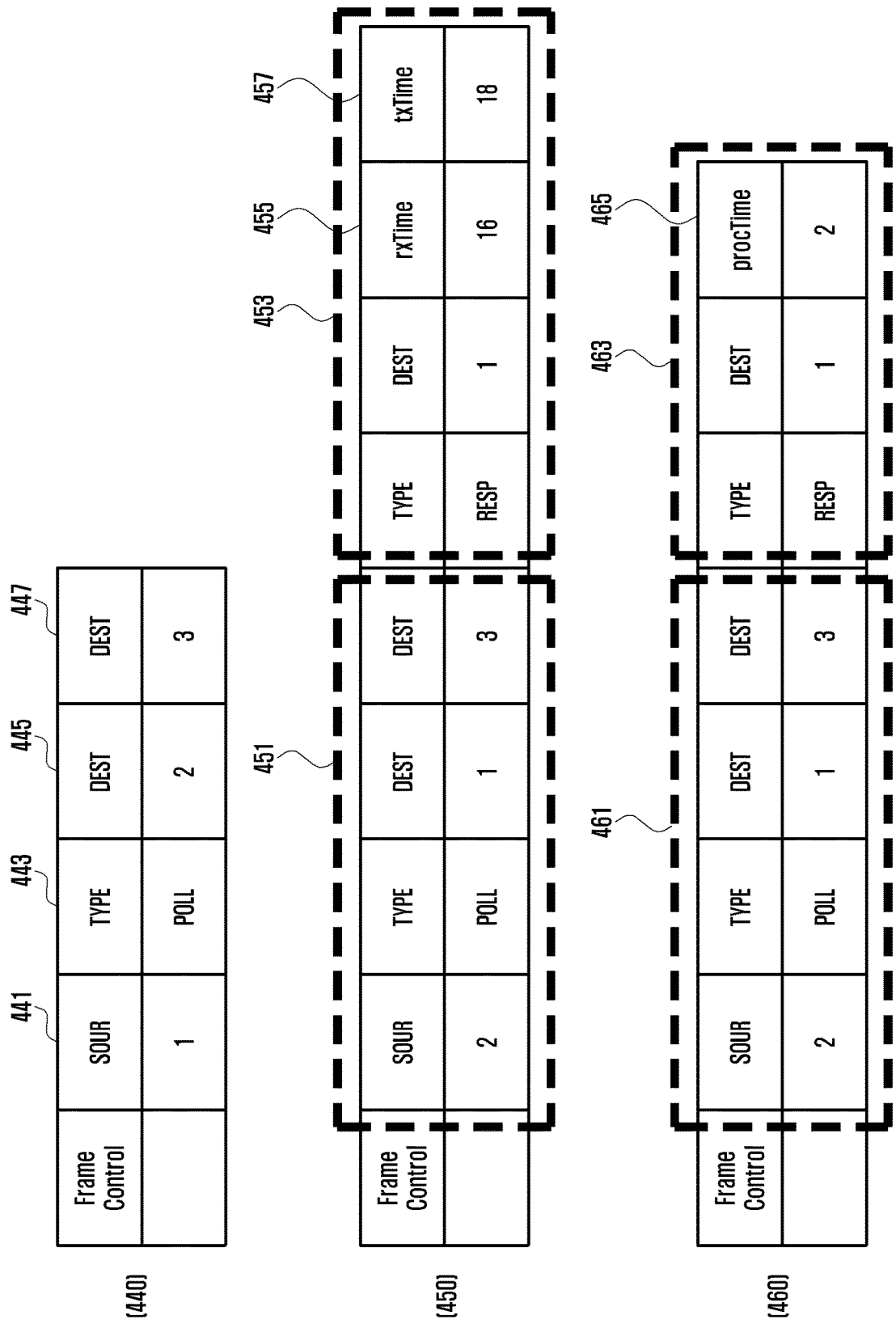
FIG. 4C is a diagram illustrating packets transmitted based on the SS-TWR scheme, according to an embodiment.
Figure 4D:
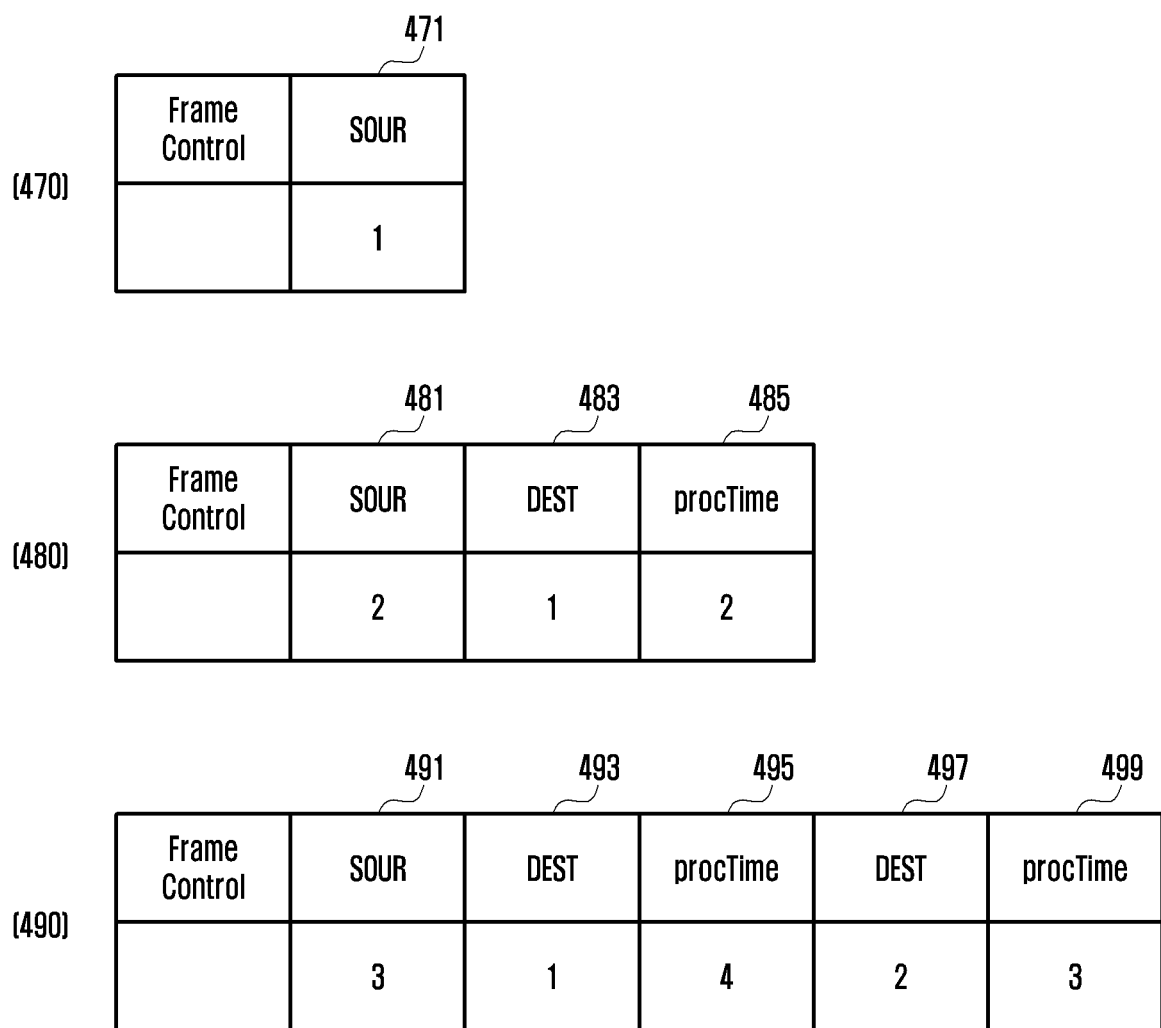
FIG. 4D is a diagram illustrating packets transmitted based on the SS-TWR scheme, according to an embodiment.

FIG. 4C is a diagram illustrating packets transmitted based on the SS-TWR scheme according to various embodiments, and FIG. 4D is a diagram illustrating packets transmitted based on to the SS-TWR scheme according to various embodiments.

FIG. 4C illustrates packets including time information or processing time information, according to an embodiment.

Referring to FIG. 4C, when the electronic device 101 or the first external electronic device 102 follows the MAC frame format of 802.15.4, the source address and the source personal account number (PAN) identification (ID) may be implemented in the MAC header (MHR). The following description may be directed to specifying payload fields of packets. Respective pieces of information included in the payload fields (for example, source address 441, message type 443, first destination address 445, or second destination address 447) may include data having a small size of less than 1-4 bytes.

First information 440 transmitted by the electronic device 101 at the first time 401 in FIG. 4A may include at least one of a source address 441, a message type 443, a first destination address 445, or a second destination address 447. The source address 441 may be an identifier assigned to the electronic device 101 that transmitted the first information 440, and may be "1", for example. The message type 443 refers to a message type to which the first information corresponds and, since a poll message and a response message are exchanged according to the SS-TWR scheme, the message type 443 may be one of a poll message or a response message. The message type 443 of the first information 440 is initially sent by the electronic device 101 and thus may correspond to a poll message. The first destination address 445 is an identifier assigned to the first external electronic device 102 that receives the first information 440 and may be "2", for example. The second destination address 447 is an identifier assigned to the second external electronic device 104 that receives the first information 440 and may be "3", for example.

At the first time 401, the first external electronic device 102 may receive the first information 440 and may identify, based on the source address 441, that the first information 440 was transmitted from the electronic device 101, may identify that the message type 443 corresponds to a poll message, and may identify, based on the first destination address 445, that the first information 440 was sent to the first external electronic device 102. The first external electronic device 102 may store information regarding the time at which the first information 440 was received in the memory 130. In addition, at the first time 401, the second external electronic device 104 may receive the first information 440 and may identify, based on the source address 441, that the first information 440 was transmitted from the electronic device 101, may identify that the message type 443 corresponds to a poll message, and may identify, based on the second destination address 447, that the first information 440 was sent to the second external electronic device 104. The second external electronic device 104 may store information regarding the time at which the first information 440 was received in the memory 130.

At the second time 403, the first external electronic device 102 may transmit second information 450. The second information 450 may include information 451 corresponding to a poll message and information 453 corresponding to a response message. The information 451 corresponding to a poll message may indicate that the second information 450 was sent by the first external electronic device 102 (for example, SOUR is "2"), that the message type corresponds to a poll message (for example, TYPE is "poll"), and that the second information 450 was transmitted to the electronic device 101 (for example, DEST is "1") or to the second external electronic device 104 (for example, DEST is "3"). The information 453 corresponding to a response message may indicate that the device to receive the response message is the electronic device 101 (for example, DEST is "1"), and may include information regarding the time at which the first information 440 was received (rxTime) 455, or information regarding the time at which the second information 450 was transmitted (txTime) 457.

Upon receiving the second information 450 at the second time 403, the electronic device 101 may read the information 451 corresponding to a poll message and may store the information regarding the time at which the second information 450 was received in the memory 130. The electronic device 101 may read the information 453 corresponding to a response message and may obtain information regarding the processing time of the first external electronic device 102 based on the rxTime 455 and the txTime 457 included in the second information 450. The electronic device 101 may measure the distance from the first external electronic device 102 based on at least one of the obtained processing time information, the information regarding the time at which the first information 440 was transmitted, or the information regarding the time at which second information 450 was received. The electronic device 101 may measure the distance from the first external electronic device 102 by using Equation (1) below:

$$\text{Distance} = ((\text{time at which second information was received} - \text{time at which first information was transmitted}) - \text{processing time})/2 * \text{speed of light} \quad \text{Equation (1)}$$

Upon receiving the second information 450 at the second time 403, the second external electronic device 104 may read the information 451 corresponding to a poll message and may store the information regarding the time at which the second information 450 was received in the memory 130.

Additionally or alternatively, at the second time 403, the first external electronic device 102 may transmit second information 460. The second information 460 may include information 461 corresponding to a poll message and information 463 corresponding to a response message. The information 461 corresponding to a poll message may indicate that the second information 460 was sent by the first external electronic device 102 (for example, SOUR is "2"), the message type corresponds to a poll message (for example, TYPE is "poll"), and the second information 460 was transmitted to the electronic device 101 (for example, DEST is "1") or to the second external electronic device 104 (for example, DEST is "3"). The information 451 corresponding to a poll message of the second information 450 may be identical to the information 461 corresponding to a poll message of the second information 460. The information 463 corresponding to a response message may indicate that the device to receive the response message is the electronic device 101 (for example, DEST is "1"), and may include information regarding the processing time of the first external electronic device (procTime) 465.

Upon receiving the second information 460 at the second time 403, the electronic device 101 may read the information 461 corresponding to a poll message and may store the information regarding the time at which the second information 460 was received in the memory 130. The electronic device 101 may read the information 463 corresponding to a response message and may measure the distance from the first external electronic device 102 based on at least one of the processing time information 465 included in the second information 460, the information regarding the time at which the first information 440 was transmitted, or the information regarding the time at which second information 460 was received.

The second information 460 is similar to the second information 450, but unlike the second information 450, the processing time information has already been obtained and recorded in the second information 460, and the electronic device 101 may accordingly use the processing time information 465 included in the second information 460, when measuring the distance from the first external electronic device 102, instead of obtaining the processing time information. Upon receiving the second information 460 at the second time 403, the second external electronic device 104 may read the information 461 corresponding to a poll message and may store the information regarding the time at which the second information 460 was received in the memory 130.

FIG. 4D illustrates packets including processing time information, according to an embodiment.

Referring to FIG. 4D, prior to transmitting information according to the SS-TWR scheme, the electronic device 101 (for example, master electronic device) may transmit time schedule information to a first external electronic device 102 and a second external electronic device 104 (for example, slave electronic devices). The time schedule information may configure a device to transmit information at each time such that each electronic device can transmit information only at a time assigned thereto and cannot transmit information outside the time assigned thereto. In addition, since each electronic device transmits or receives information based on the time schedule information, each electronic device can be aware of which electronic device (for example, source address) transmitted information at each time, which electronic device (for example, destination address) is to receive information, and what type of message is to be received. Therefore, each electronic device may have a broadcast-type packet configuration.

At the first time 401, the electronic device 101 may transmit first information 470. The electronic device 101 may transmit the first information 470 as a type of packet having no payload field. The first information 470 may include a source address 471. Upon receiving the first information 470 at the first time 401, the first external electronic device 102 may store information regarding the time at which the first information 470 was received in the memory 130. Upon receiving the first information 470 at the first time 401, the second external electronic device 104 may store information regarding the time at which the first information 470 was received in the memory 130.

At the second time 403, the first external electronic device 102 may transmit second information 480. The second information 480 may include a source address 481, a destination address 483, or processing time information 485. The source address 481 may mean that the second information 480 was sent by the first external electronic device 102 (for example, SOUR is "2"). The destination address 483 may indicate the electronic device 101 which is supposed to read the processing time information 485 included in the second information 480 (for example, DEST is "1"). The processing time information 485 may refer to information regarding the period of time between when the first external electronic device 102 received the first information 470 and when the first external electronic device 102 transmitted the second information 480. Upon receiving the second information 480 at the second time 403, the electronic device 101 may store information regarding the time at which the second information 480 was received in the memory 130.

In addition, the electronic device 101 may measure the distance from the first external electronic device 102 based on at least one of the processing time information 485 included in the second information 480, the information regarding the time at which the first information 470 was transmitted, or the information regarding the time at which the second information 480 was received. At the second time 403, the second external electronic device 104 may receive the second information 480 and may store information regarding the time at which the second information 480 was received in the memory 130. For example, the second external electronic device 104 may record only information regarding the time at which the second information 480 was received, because the second information 480 has no other information corresponding to itself (for example, DEST is "2").

At the third time 405, the second external electronic device 104 may transmit third information 490. The third information 490 may include at least one of a source address 491, a first destination address 493, first processing time information 495, a second destination address 497, or second processing time information 499. The source address 491 may indicate that the third information 490 was sent by the second external electronic device 104 (for example, SOUR is "3"). The first destination address 493 may indicate the electronic device 101 which is supposed to read the first processing time information 495 included in the third information 490 (for example, DEST is "1"). The first processing time information 495 may refer to information regarding the period of time between when the second external electronic device 104 received the first information 470 and when the second external electronic device 104 transmitted the third information 490. The second destination address 497 may indicate the first external electronic device 102 which is supposed to read the second processing time information 499 included in the third information 490 (for example, DEST is "2"). The second processing time information 499 may refer to information regarding the period of time between when the second external electronic device 104 received the second information 480 and when the second external electronic device 104 transmitted the third information 490.

At the third time 405, the electronic device 101 may receive the third information 490 and may store information regarding the time at which the third information 490 was received in the memory 130. In addition, the electronic device 101 may measure the distance from the second external electronic device 104 based on at least one of the first processing time information 495 included in the third information 490, the information regarding the time at which the first information 470 was transmitted, or the information regarding the time at which the third information 490 was received.

At the third time 405, the first external electronic device 102 may receive the third information 490 and may store information regarding the time at which the third information 490 was received in the memory 130. In addition, the first external electronic device 102 may measure the distance from the second external electronic device 104 based on at least one of the second processing time information 499 included in the third information 490, the information regarding the time at which the second information 480 was transmitted, or the information regarding the time at which the third information 490 was received.

Figure 5:
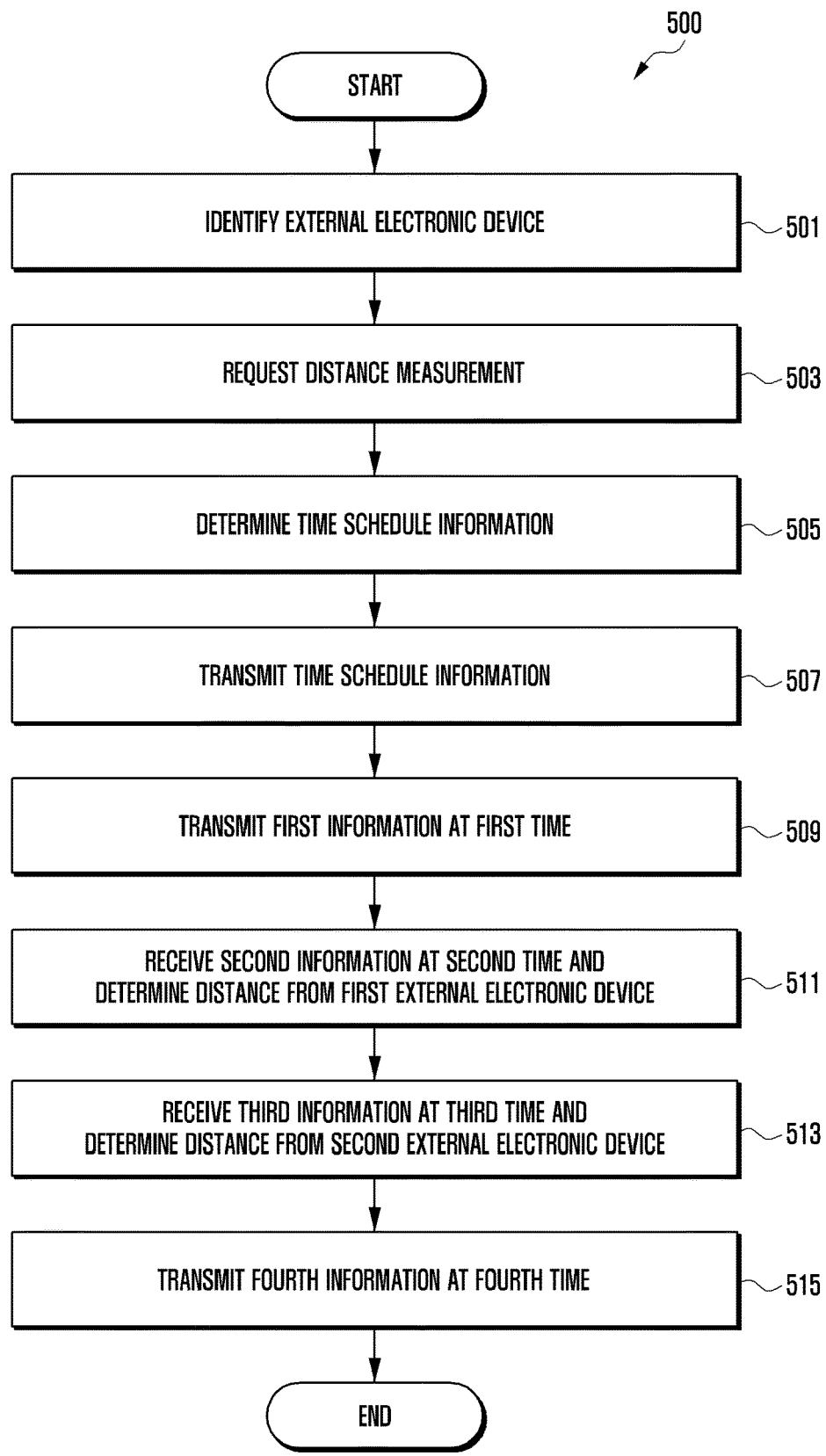
FIG. 5 is a flowchart illustrating a method for operating a master electronic device based on the SS-TWR scheme, according to an embodiment.

FIG. 5 is a flowchart 500 illustrating a method for operating a master electronic device based on the SS-TWR scheme, according to an embodiment.

The electronic device 101 described in FIG. 5 may operate as a master electronic device. It may be assumed, to help understanding of the disclosure, that when the electronic device 101 operates as a master electronic device, a first external electronic device 102 and a second external electronic device 104 operate as slave electronic devices.

Referring to FIG. 5, in step 501, the processor 120 of the electronic device 101 identifies an external electronic device through a communication module 190. It may be assumed in the following description that there are at least two external electronic devices. For convenience of description, "an external electronic device" will be used interchangeably with "external electronic devices". The processor 120 may identify external electronic devices by using a first type of communication (for example, UWB) or a second type of communication (for example, Bluetooth™ or Wi-Fi). Alternatively, the processor 120 may identify external electronic devices through a server 108 to which the electronic device 101 is currently connected. Additionally or alternatively, the processor 120 may identify external electronic devices if a designated condition is satisfied. For example, the processor 120 may identify external electronic devices positioned within a predetermined distance if a specific event is detected (for example, entering a game group configuration window) while a game application is being executed.

The processor 120 may identify external electronic devices positioned within a short distance by using a topology such as Bluetooth™, Wi-Fi, or neighbor awareness networking (NAN) communication. Alternatively, if the electronic device 101 is connected to an access point, the processor 120 may identify external electronic devices connected to the same access point. For example, the processor 120 may identify external electronic devices forming a topology through a first communication type (for example, UWB) or may identify external electronic devices forming a topology through a second communication type (for example, a communication type other than UWB). For example, when connected to external electronic devices through Bluetooth™, the processor 120 may have a peer-to-peer connection to the external electronic devices. Alternatively, when connected to external electronic devices through Wi-Fi, the processor 120 may be connected to the same access point and thus connected to the external electronic devices through a star topology or a peer-to-peer connection (for example, Wi-Fi direct) between the electronic devices.

The processor 120 may identify external electronic devices that satisfy a designated condition through a server 108 (for example, game server) or a web page, or through application execution. For example, if the electronic device 101 is not connected to external electronic devices through the first type of communication and the second type of communication, and if the same support virtual group formation or a state of a virtual connection between electronic devices (for example, a state in which communication is possible between the electronic devices by an instant messenger application) is used, the processor 120 may identify external electronic devices connected to a virtual group or external electronic devices in a state of virtual connection.

In step 503, the processor 120 receives a distance (or location) measurement request. For example, the processor 120 may transmit a message (or data) to the identified external electronic devices through the communication module 190 so as to identify whether or not they will participate in distance measurement, and may identify (or determine) that the distance measurement request has been made if a response message is received in response to the transmitted message. Additionally or alternatively, the processor 120 may transmit the distance measurement participation identification message periodically or selectively (for example, at the user's request) through the communication module 190. Additionally or alternatively, the processor 120 may receive a request for measuring the distance from the external electronic devices from the user through an input device input device 150. Additionally or alternatively, the processor 120 may identify that there is a distance measurement request if an application (for example, a game application) that uses the distance from external electronic devices is executed.

In step 505, the processor 120 determines time schedule information. The time schedule information may be used to configure a time at which the electronic device 101 transmits information (or a message) to the external electronic devices or a time at which the electronic device 101 receives information from the external electronic devices. The processor 120 may determine the time schedule information based on a location measurement scheme or the number of external electronic devices that transmitted response messages in response to the distance measurement request. It may be assumed in the description of FIG. 5 that the electronic device 101 and two electronic devices (for example, the first external electronic device 102 and the second external electronic device 104) measure locations according to the SS-TWR scheme as in FIG. 4A. The processor 120 may determine a master electronic device as the device to which information is to be transmitted first, and may determine the external electronic devices as devices to which information is to be transmitted at the remaining times.

According to the SS-TWR scheme, it is only after a response message is received in connection with a poll message that the distance from a different electronic device can be measured. For example, the processor 120 may assign a first time and a fourth time to the electronic device 101, may assign a second time and a fifth time to the first external electronic device 102, and may assign a third time to the second external electronic device 104. For example, the electronic device 101 and the external electronic devices may transmit information only at times assigned thereto, and may receive information at other times that are not assigned thereto.

The processor 120 may determine times (for example, slots) to be assigned to external electronic devices based on response messages (or response data) received from the external electronic devices. The processor 120 may assign a preliminary time for external electronic devices that are not identified. For example, when determining the time schedule information, the processor 120 may assign a preliminary time when there will be external electronic devices that can, but do not already, participate in communication, in addition to providing the times for external electronic devices currently participating in the communication. The processor 120 may publicize (for example, broadcast) a preliminary time every time the time schedule information is determined. External electronic devices wanting to later participate in the communication may inform the electronic device 101 of the intent to participate during the preliminary time. In addition, the processor 120 may use, instead of the time, a method that allows contention between media, such as a contention access period (CAP), the specification of which is currently publicized, as in Institute of Electrical and Electronics Engineers (IEEE) 802.15.4 or 802.15.8. The processor 120 may implement an operation of determining time schedule information according to the CAP publicized in 802.15.4 or 802.15.8, or may use a user-specific time assignment scheme if necessary.

The processor 120 may receive the time schedule information from the server 108, or may receive the time schedule information from another external electronic device functionally connected to the electronic device 101. The electronic device 101 that determines the time schedule information may be referred to as a "master electronic device", and the electronic device that receives the time schedule information may be referred to as a "slave electronic device". The electronic device 101 or the server 108 may determine the master electronic device based on various conditions. The electronic device 101 and the external electronic devices may be classified as a master electronic device and slave electronic devices, and an operation of configuring the master electronic device and the slave electronic devices may be further included. For example, the electronic device 101 or the server 108 may determine, as the master electronic device, at least one of an electronic device that generated a group in connection with a game application, an electronic device that requested a distance measurement, and an electronic device having a good performance, among the electronic device 101 and the external electronic devices, and may determine the remaining devices as the slave electronic devices.

In step 507, the processor 120 transmits the determined time schedule information to the external electronic devices. The processor 120 may transmit the determined time schedule information through the communication module 190 in a broadcast type communication, or may transmit the determined time schedule information to external electronic devices that responded to the distance measurement request. The processor 120 may transmit the determined time schedule information to the external electronic devices through the first type of communication or the second type of communication. The processor 120 may transmit the determined time schedule information to the external electronic devices through the server 108.

For example, when using a contention free period (CFP) interval based on 802.15.4 for time assignment, the processor 120 may transmit the determined time schedule information to the external electronic devices through a beacon message based on 802.15.4. Alternatively, when using a CFP interval based on 802.15.8, the processor 120 may transmit the determined time schedule information to the external electronic devices by using a sync period according to the 802.15.8 standard. The processor 120 may transmit the time schedule information according to a protocol agreed upon in advance between the electronic device 101 and the external electronic devices.

In step 509, the processor 120 transmits first information (or signal/data) through the communication module 190 at a first time (for example, SLOT 1 401 in FIG. 4A). The processor 120 may identify (or confirm) the time when information can be transmitted, based on the time schedule information, and may transmit the first information at the first time through the communication module 190. The first information (for example, P12/P13 in FIG. 4A) may include the identifier of the electronic device 101 (for example, source address "1") or information regarding the time at which the electronic device 101 transmitted the first information. The first information may be transmitted in a broadcast type of communication or transmitted while the destination address (for example, destination addresses "2" and "3") is configured therein. The first information may be transmitted to the first external electronic device 102 and the second external electronic device 104. The processor 120 may store information regarding the time at which the first information was transmitted in the memory 130. After receiving the first information, the first external electronic device 102 and the second external electronic device 104 may store information regarding the time at which the first information was received.

In step 511, the processor 120 receives second information (for example, (R21,P21)/P23 in FIG. 4A) at a second time (for example, SLOT 2 403 in FIG. 4A) from the first external electronic device 102 through the communication module 190, and may determine (or identify/measure) the distance from the first external electronic device 102. The processor 120 may read information only corresponding to the electronic device 101 (for example, (R21,P21)), among the received second information, and store the read information in the memory 130. The processor 120 may store information regarding the time at which the second information was received in the memory 130, or may read time information or processing time information included in the second information and may store the same in the memory 130. The processor 120 may multiply the signal arrival time (for example, information regarding the time at which the first information was transmitted, or information regarding the time at which the second information was received) by the speed of light, thereby obtaining the distance from the first external electronic device 102.

The second information may include information regarding the time at which the first external electronic device 102 received the first information, or information regarding the time at which the first external electronic device 102 transmitted the second information. Additionally or alternatively, the second information may include information regarding the processing time of the first external electronic device 102. The information regarding the processing time of the first external electronic device 102 is for the electronic device 101, and may correspond to a period of time between when the first external electronic device 102 received the first information and when the first external electronic device 102 transmitted the second information. Whether the second information will include information regarding the time at which each piece of information was received or transmitted or will include information regarding the processing time may vary according to the protocol agreed upon between the electronic device 101, the first external electronic device 102, and the second external electronic device 104. After receiving the second information, the second external electronic device 104 may store information regarding the time at which the second information was received.

The processor 120 may determine the distance from the first external electronic device 102 based on the first information or the second information. When the second information includes information regarding the time at which the first information was received, or information regarding the time at which the second information was transmitted, the processor 120 may obtain information regarding the processing time of the first external electronic device 102 based on the second information, and may calculate the distance from the first external electronic device 102 based on at least one of the obtained processing time information, information regarding the time at which the first information was transmitted, or the information regarding the time at which the second information was received. Additionally or alternatively, when the second information includes information regarding the processing time of the first external electronic device 102, the processor 120 may measure the distance from the first external electronic device 102 based on at least one of the processing time information included in the second information, the information regarding the time at which the first information was transmitted, or the information regarding the time at which the second information was received.

When receiving the second information from the first external electronic device 102, the processor 120 may acquire AOA information through multiple antennas (for example, antenna module 197, or UWB antenna 1 221 and UWB antenna 2 223), and may identify the relative location of the first external electronic device 102 based on the acquired AOA information and the distance from the first external electronic device 102.

In step 513, the processor 120 receives third information at a third time (for example, SLOT 3 405 in FIG. 4A), and may determine (or identify/measure) the distance from the second external electronic device 104. The third information (for example, (R31,P31)/(R32,P32) in FIG. 4A) may include at least one of information regarding the time at which the second external electronic device 104 received the first information, information regarding the time at which the second external electronic device 104 received the second information, or information regarding the time at which the second external electronic device 104 transmitted the third information.

Additionally or alternatively, the third information may include information regarding the processing time of the second external electronic device 104. The information regarding the processing time of the second external electronic device 104 may include information regarding a period of time (for example, first processing time information) between when the second external electronic device 104 received the first information and when the second external electronic device 104 transmitted the third information, and information regarding a period of time (for example, second processing time information) between when the second external electronic device 104 received the second information and when the second external electronic device 104 transmitted the third information. The information regarding the processing time of the second external electronic device 104 may include first processing time information corresponding to the electronic device 101 and second processing time information corresponding to the first external electronic device 102.

The processor 120 may measure the distance from the second external electronic device 104 based on at least one of the first information transmitted at the first time 401 or the third information received at the third time 405. For example, when the third information includes time information, the processor 120 may obtain information regarding the processing time of the second external electronic device 104 based on the third information, and may measure the distance from the second external electronic device 104 based on at least one of the obtained processing time information, information regarding the time at which the first information was transmitted, or information regarding the time at which the third information was received. Additionally or alternatively, when the third information includes processing time information (for example, first processing time information), the processor 120 may measure the distance from the second external electronic device 104 based on at least one of the first processing time information, information regarding the time at which the first information was transmitted, or information regarding the time at which the third information was received.

When receiving the third information from the second external electronic device 104, the processor 120 may acquire AOA information through the antenna module 197, and may identify the relative location of the second external electronic device 104 based on the acquired AOA information and the distance from the second external electronic device 104.

Upon receiving the third information (for example, (R31, P31)/(R32,P32) in FIG. 4A) at the third time 405, the first external electronic device 102 may store information regarding the time at which the third information was received. At the third time 405, the first external electronic device 102 may receive the third information and may determine the distance from the second external electronic device 104. The first external electronic device 102 may determine the distance from the second external electronic device 104 based on at least one of the second information or the third information. For example, when the third information includes time information, the first external electronic device 102 may obtain information regarding the processing time of the second external electronic device 104 based on the third information, and may measure the distance from the second external electronic device 104 based on at least one of the obtained processing time information, information regarding the time at which the second information was transmitted, or information regarding the time at which the third information was received.

Additionally or alternatively, when the third information includes processing time information (for example, second processing time information), the first external electronic device 102 may measure the distance from the second external electronic device 104 based on at least one of the second processing time information, information regarding the time at which the second information was transmitted, or information regarding the time at which the third information was received.

In step 515, the processor 120 transmits fourth information at a fourth time (for example, SLOT 4 407 in FIG. 4A). The fourth information (for example, (P12,R12)/(P13,R13) in FIG. 4A) may be transmitted to the first external electronic device 102 and the second external electronic device 104. The fourth information may include at least one of information regarding the time at which the electronic device 101 received the second information, information regarding the time at which the electronic device 101 received the third information, or information regarding the time at which the electronic device 101 transmitted the fourth information.

Additionally or alternatively, the fourth information may include information regarding the processing time of the electronic device 101. The information regarding the processing time of the electronic device 101 may include information regarding a period of time (for example, first processing time information) between when the electronic device 101 received the second information and when the electronic device 101 transmitted the fourth information, and information regarding a period of time (for example, second processing time information) between when the electronic device 101 received the third information and when the electronic device 101 transmitted the fourth information. The information regarding the first processing time of the electronic device 101 may correspond to the first external electronic device 102, and the information regarding the second processing time of the electronic device 101 may correspond to the second external electronic device 104.

Additionally or alternatively, upon receiving the fourth information at the fourth time, the first external electronic device 102 may store information regarding the time at which the fourth information was received. At the fourth time, the first external electronic device 102 may receive the fourth information (for example, P12,R12)/(P13,R13) in FIG. 4A) and may determine the distance from the electronic device 101. The first external electronic device 102 may measure the distance from the electronic device 101 based on at least one of the second information transmitted at the second time 403 or the fourth information received at the fourth time 407.

For example, when the fourth information includes time information, the first external electronic device 102 may obtain processing time information based on the fourth information, and may measure the distance from the electronic device 101 based on at least one of the obtained processing time information, information regarding the time at which the second information was transmitted, or information regarding the time at which the fourth information was received. Additionally or alternatively, when the fourth information includes processing time information (for example, first processing time information), the first external electronic device 102 may measure the distance from the electronic device 101 based on at least one of the first processing time information, information regarding the time at which the second information was transmitted, or information regarding the time at which the fourth information was received.

Additionally or alternatively, when the electronic device 101, the first external electronic device 102, and the second external electronic device 104 identified the distance between each other or the location of each electronic device, the electronic device 101 may identify (or determine) the relative location between the electronic devices.

Figure 6:
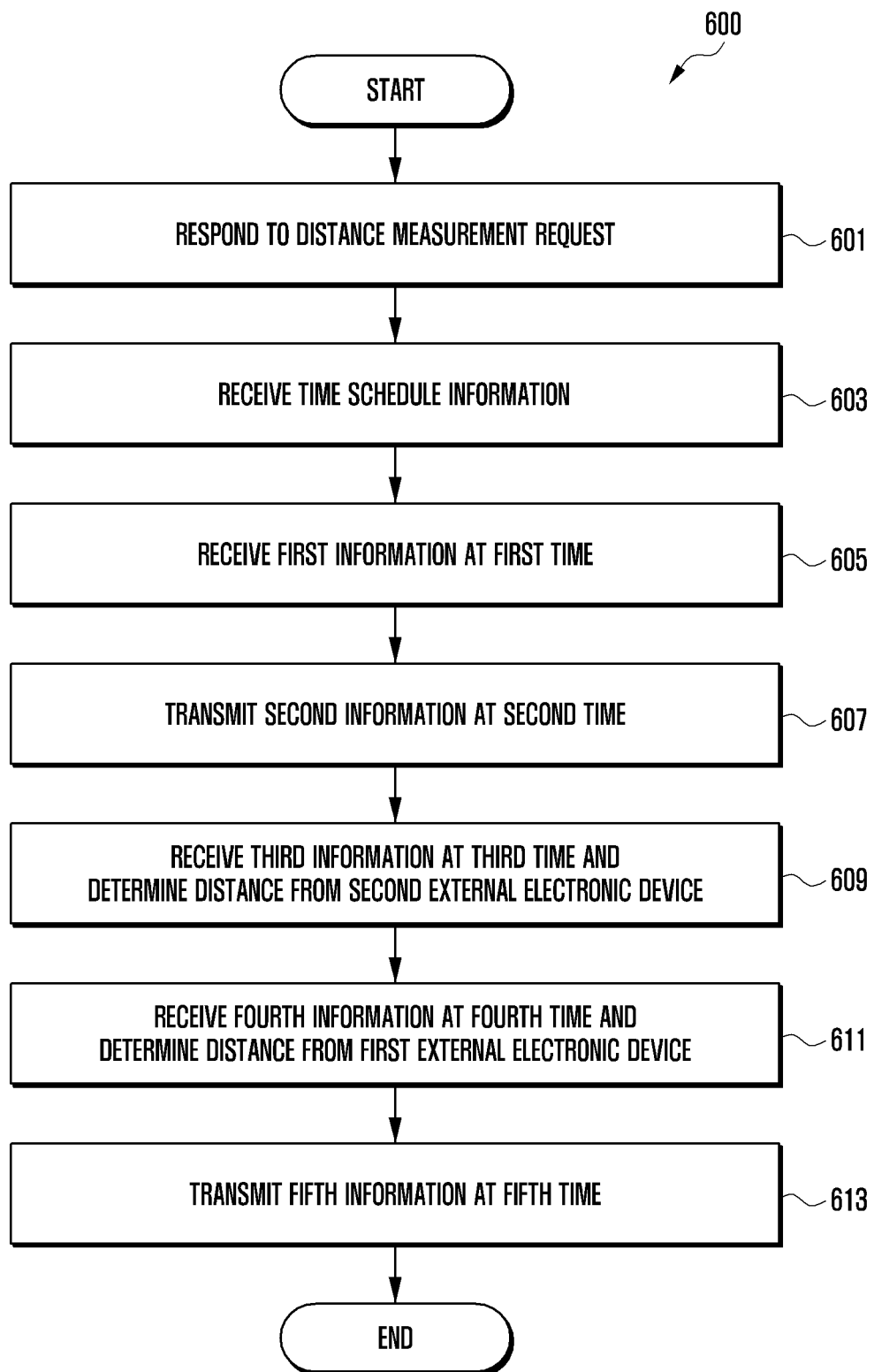
FIG. 6 is a flowchart illustrating a method for operating a slave electronic device based on the SS-TWR scheme, according to an embodiment.

FIG. 6 is a flowchart 600 illustrating a method for operating a slave electronic device based on the SS-TWR scheme, according to an embodiment.

FIG. 6 describes a method wherein an electronic device 101 operates as a slave electronic device. It may be assumed that when the electronic device 101 operates as a slave electronic device, a first external electronic device 102 operates as a master electronic device.

Referring to FIG. 6, in step 601, the processor 120 of the electronic device 101 responds to a distance measurement request by using UWB communication. For example, the processor 120 may receive a distance measurement request from the first external electronic device 102 or the server 108 if a request for measuring the distance from other external electronic devices is received from the user through an input device 150, or if an application (for example, game application) that uses the distance from external electronic devices is executed.

In step 603, the processor 120 receives time schedule information from the first external electronic device 102. The time schedule information may include a time at which the electronic device 101 transmits information (or a message) to the external electronic devices, or a time at which the electronic device 101 receives information from the external electronic devices.

The processor 120 may receive time schedule information determined by the first external electronic device 102 or the server 108, and may store the time schedule information in the memory 130.

In step 605, the processor 120 receives first information at a first time (for example, SLOT 1 401 in FIG. 4A). The first information (for example, P12/P13 in FIG. 4A) may include the identifier of the first external electronic device 102 or information regarding the time at which the first external electronic device 102 transmitted the first information. The first information may be transmitted to the electronic device 101 or the second external electronic device 104. The processor 120 may receive the first information and may read information only corresponding to the electronic device 101 (for example, P12). In addition, the processor 120 may store information regarding the time at which the first information was received in the memory 130.

In step 607, the processor 120 transmits second information at a second time (for example, SLOT 2 403 in FIG. 4A). The second information (for example, ((R21,P21)/P23 in FIG. 4A) may include information regarding the time at which the electronic device 101 received the first information, or information regarding the time at which the electronic device 101 transmitted the second information. Additionally or alternatively, the second information may include information regarding the processing time of the electronic device 101. The processing time information may correspond to a period of time between when the electronic device 101 received the first information and when the same transmitted the second information. The processor 120 may store information regarding the time at which the second information was transmitted in the memory 130.

Upon receiving the second information at the second time, the first external electronic device 102 may determine the location of the electronic device 101 based on the first information or the second information. When the second information includes information regarding the time at which the first information was received or information regarding the time at which the second information was transmitted, the first external electronic device 102 may obtain information regarding the processing time of the electronic device 101 based on the second information, and may measure the distance from the electronic device 101 based on at least one of the obtained processing time information, information regarding the time at which the first information was transmitted, or information regarding the time at which the second information was received. Additionally or alternatively, when the second information includes information regarding the processing time of the electronic device 101, the first external electronic device 102 may measure the distance from the electronic device 101 based on at least one of the processing time information included in the second information, information regarding the time at which the first information was transmitted, or information regarding the time at which the second information was received.

In step 609, the processor 120 receives third information at a third time (for example, SLOT 3 405 in FIG. 4A) and may determine the distance from the second external electronic device 104. The third information (for example, (R31,P31)/(R32,P32) in FIG. 4A) may include at least one of information regarding the time at which the second external electronic device 104 received the first information, information regarding the time at which the second external electronic device 104 received the second information, or information regarding the time at which the second external electronic device 104 transmitted the third information.

Additionally or alternatively, the third information may include information regarding the processing time of the second external electronic device 104. The information regarding the processing time of the second external electronic device 104 may include information regarding a period of time (for example, first processing time information) between when the second external electronic device 104 received the first information and when the second external electronic device 104 transmitted the third information, and information regarding a period of time (for example, second processing time information) between when the second external electronic device 104 received the second information and when the second external electronic device 104 transmitted the third information. The information regarding the processing time of the second external electronic device 104 may include first processing time information corresponding to the first external electronic device 102 and second processing time information corresponding to the electronic device 101.

At the third time 405, the processor 120 may receive the third information, may read information only corresponding to the electronic device 101 (for example, (R32,P32)), among the received third information, and may store the read information in the memory 130. The processor 120 may determine the distance from the second external electronic device 104 based on at least one of the second information or the third information stored in the memory 130. For example, when the third information includes time information, the processor 120 may obtain information regarding the processing time of the second external electronic device 104 based on the third information, and may measure the distance from the second external electronic device 104 based on at least one of the obtained processing time information, information regarding the time at which the second information was transmitted, or information regarding the time at which the third information was received.

Additionally or alternatively, when the third information includes processing time information (for example, first processing time information), the processor 120 may measure the distance from the second external electronic device 104 based on at least one of the first processing time information, information regarding the time at which the second information was transmitted, or information regarding the time at which the third information was received.

Upon receiving the third information from the second external electronic device 104, the processor 120 may acquire AOA information through multiple antennas, and may identify the relative location of the second external electronic device 104 based on the acquired AOA information and the distance from the second external electronic device 104.

Upon receiving the third information at the third time, the first external electronic device 102 may store information regarding the time at which the third information was received. At the third time, the first external electronic device 102 may receive the third information for example, ((R31,P31)/(R32,P32) in FIG. 4A) and may determine the distance from the second external electronic device 104. For example, when the third information includes time information, the first external electronic device 102 may obtain information regarding the processing time of the second external electronic device 104 based on the third information, and may measure the distance from the second external electronic device 104 based on at least one of the obtained processing time information, information regarding the time at which the first information was transmitted, or information regarding the time at which the third information was received.

Additionally or alternatively, when the third information includes processing time information (for example, first processing time information), the first external electronic device 102 may measure the distance from the second external electronic device 104 based on at least one of the first processing time information, information regarding the time at which the first information was transmitted, or information regarding the time at which the third information was received.

In step 611, the processor 120 receives fourth information at a fourth time (for example, SLOT 4 407 in FIG. 4A) and may determine the distance from the first external electronic device 102. The fourth information (for example, (P12, R12)/(P13,R13) in FIG. 4A) may be received from the first external electronic device 102. The fourth information may include at least one of information regarding the time at which the first external electronic device 102 received the second information, information regarding the time at which first external electronic device 102 received the third information, or information regarding the time at which first external electronic device 102 transmitted the fourth information. Additionally or alternatively, the fourth information may include information regarding the processing time of the first external electronic device 102. The information regarding the processing time of the first external electronic device 102 may include information regarding a period of time (for example, first processing time information) between when the first external electronic device 102 received the second information and when the same transmitted the fourth information, and information regarding a period of time (for example, second processing time information) between when the electronic device 101 received the third information and when the same transmitted the fourth information. The information regarding the first processing time of the first external electronic device 102 may correspond to the electronic device 101, and the information regarding the second processing time of the first external electronic device 102 may correspond to the second external electronic device 104.

The processor 120 may read information only corresponding to the electronic device 101 (for example, (P12,R12)), and may store the read information in the memory 130. The processor 120 may measure the distance from the first external electronic device 102 based on at least one of the second information transmitted at the second time 403 or the fourth information received at the fourth time 407. For example, when the fourth information includes time information, the processor 120 may obtain processing time information based on the fourth information, and may measure the distance from the first external electronic device 102 based on at least one of the obtained processing time information, information regarding the time at which the second information was transmitted, or information regarding the time at which the fourth information was received. Additionally or alternatively, when the fourth information includes processing time information (for example, first processing time information), the processor 120 may measure the distance from the first external electronic device 102 based on at least one of the first processing time information, information regarding the time at which the second information was transmitted, or information regarding the time at which the fourth information was received.

Upon receiving the fourth information from the first external electronic device 102, the processor 120 may acquire AOA information through multiple antennas, and may identify the relative location of the first external electronic device 102 based on the acquired AOA information and the distance from the first external electronic device 102.

At the fourth time 407, the second external electronic device 104 may receive fourth information (for example, (P12,R12)/(P13,R13)) from the first external electronic device 102, may read information only corresponding to the second external electronic device 104 (P13,R13), among the received fourth information, and may store the read information in the memory 130. At the fourth time 407, the second external electronic device 104 may measure the distance from the first external electronic device 102 based on at least one of the third information transmitted at the third time 405 or the fourth information received at the fourth time 407. For example, when the fourth information includes time information, the second external electronic device 104 may obtain processing time information based on the fourth information, and may measure the distance from the first external electronic device 102 based on at least one of the obtained processing time information, information regarding the time at which the third information was transmitted, or information regarding the time at which the fourth information was received.

Additionally or alternatively, when the fourth information includes processing time information (for example, second processing time information), the second external electronic device 104 may measure the distance from the first external electronic device 102 based on at least one of the second processing time information, information regarding the time at which the third information was transmitted, or information regarding the time at which the fourth information was received. When receiving the fourth information from the first external electronic device 102, the second external electronic device 104 may acquire AOA information through multiple antennas, and may identify the relative location of the electronic device 101 based on the acquired AOA information and the distance from the electronic device 101.

In step 613, the processor 120 transmits fifth information at a fifth time (for example, SLOT 5 409 in FIG. 4A). The fifth information (for example, (R21,P21)/(P23,R23) in FIG. 4A) may be transmitted to the first external electronic device 102 and the second external electronic device 104. The fifth information may include at least one of information regarding the time at which the electronic device 101 received the third information, information regarding the time at which the electronic device 101 received the fourth information, or information regarding the time at which the electronic device 101 transmitted the fifth information. In addition, the fifth information may include information regarding the processing time of the electronic device 101. The information regarding the processing time of the electronic device 101 may include time information regarding a period of time between when the electronic device 101 received the third information and when the same transmitted the fifth information. Alternatively, the fifth information may further include information regarding a period of time between when the electronic device 101 received the fourth information and when the same transmitted the fifth information.

Upon receiving the fifth information from the electronic device 101 at the fifth time 409, the second external electronic device 104 may read information only corresponding to the second external electronic device 104 (P23,R23), among the received fifth information, and may store the read information in the memory 130. The second external electronic device 104 may measure the distance from the first external electronic device 102 based on at least one of the third information transmitted at the third time 405 or the fifth information received at the fifth time 409. For example, when the fifth information includes time information, the second external electronic device 104 may obtain processing time information based on the fifth information, and may measure the distance from the first external electronic device 102 based on the obtained processing time information, information regarding the time at which the third information was transmitted, or information regarding the time at which the fifth information was received.

Additionally or alternatively, when the fifth information includes processing time information, the second external electronic device 104 may measure the distance from the first external electronic device 102 based on at least one of the processing time information included in the fifth information, information regarding the time at which the third information was transmitted, or information regarding the time at which the fifth information was received. When receiving the fifth information from the first external electronic device 102, the second external electronic device 104 may acquire AOA information through multiple antennas, and may identify the relative location of the first external electronic device 102 based on the acquired AOA information and the distance from the first external electronic device 102.

Figure 7A:
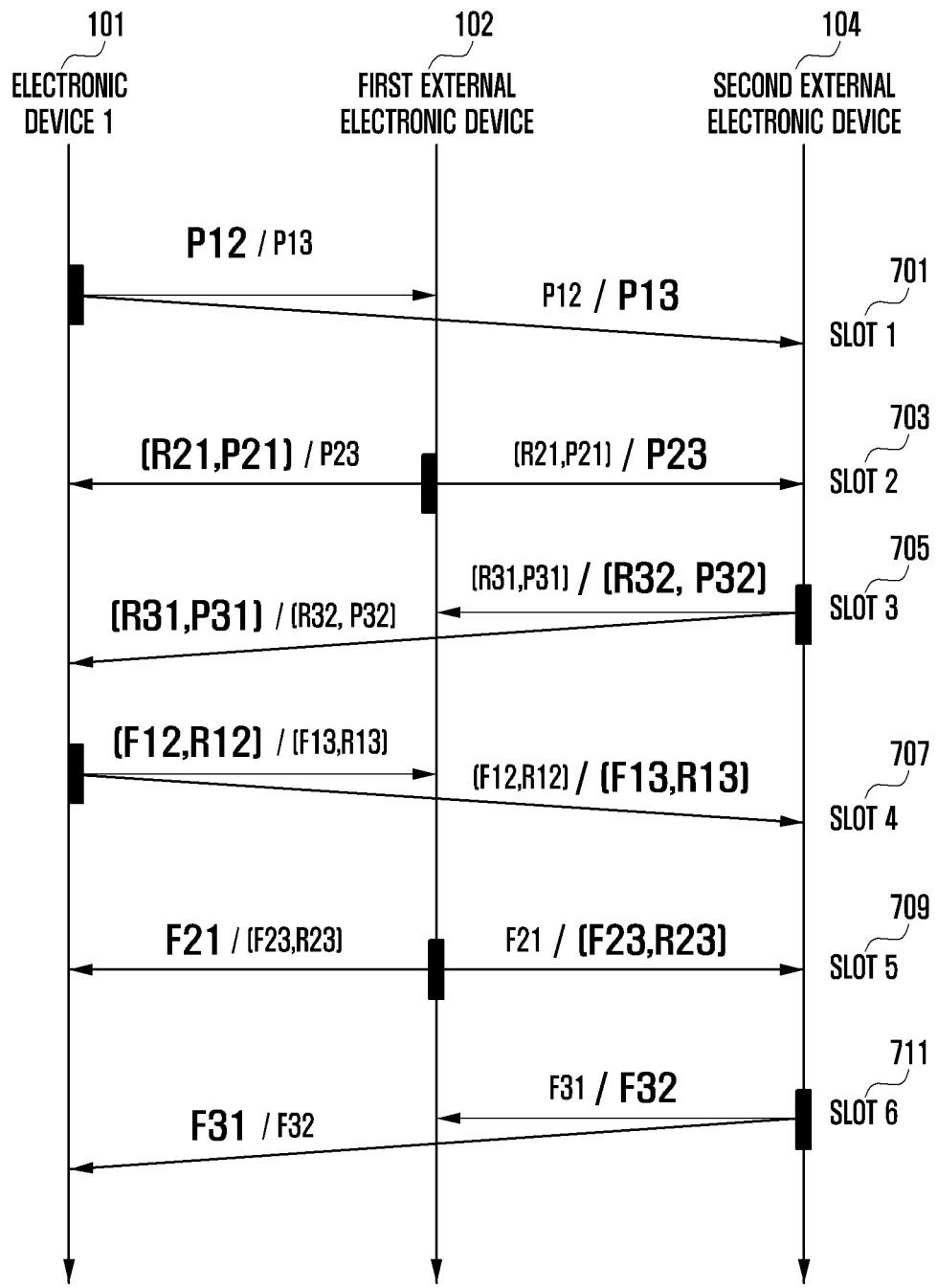
FIG. 7A is a flowchart illustrating a method for measuring the location of multiple electronic devices based on a DS-TWR scheme, according to an embodiment.
Figure 7B:
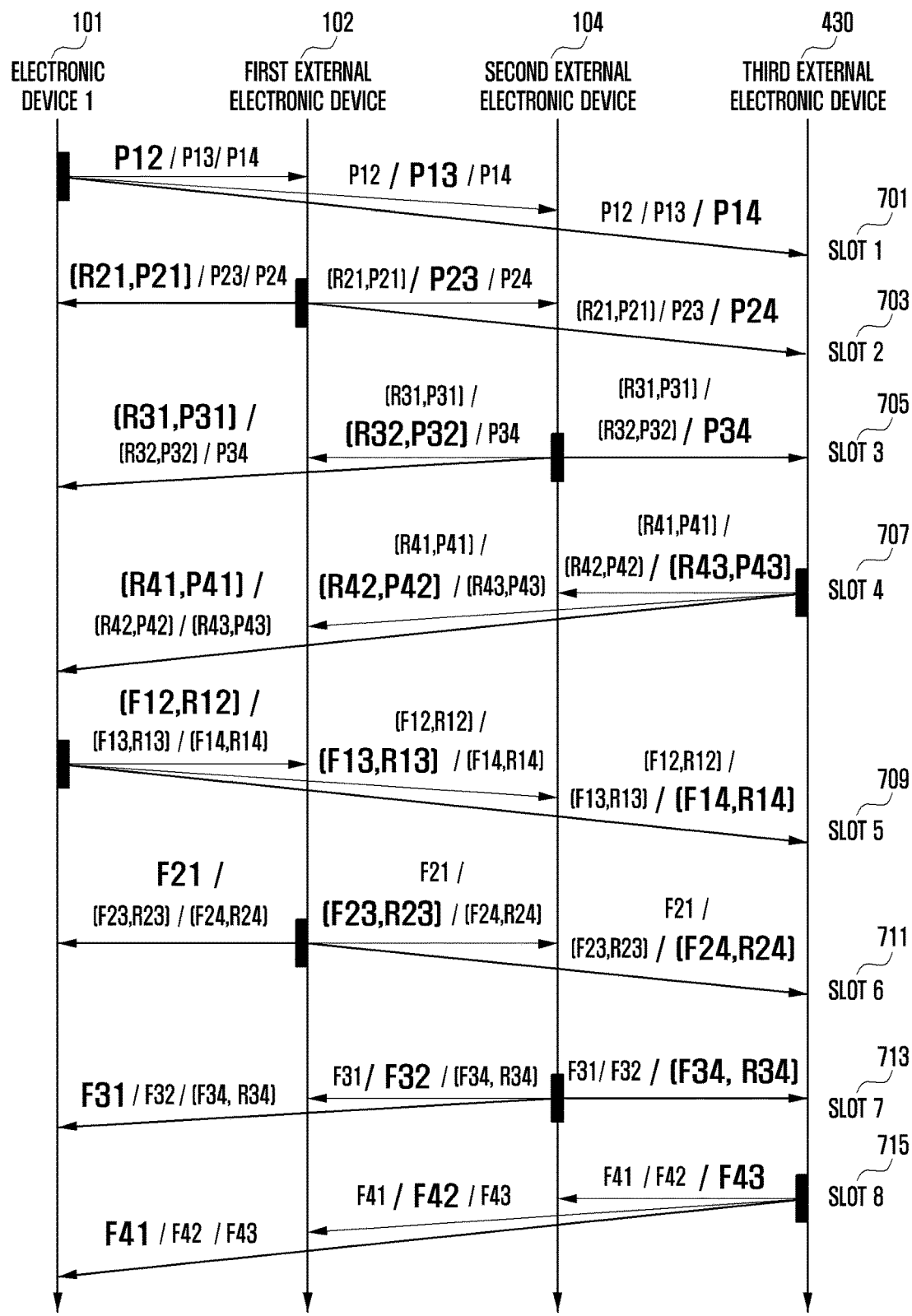
FIG. 7B is a flowchart illustrating a method for measuring the location of multiple electronic devices based on the DS-TWR scheme, according to an embodiment.
Figure 7D:
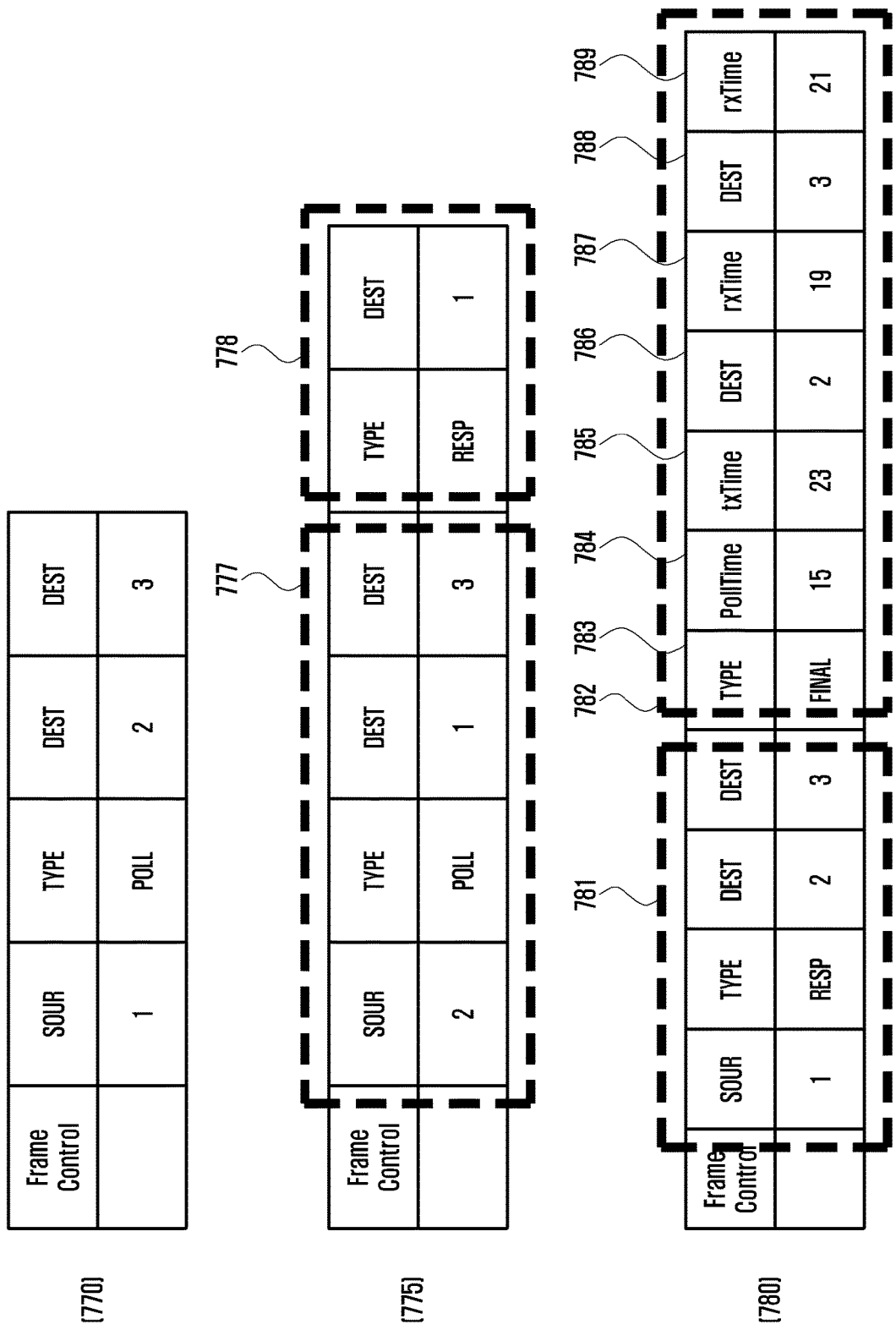
FIG. 7D illustrates exemplary information transmitted based on the DS-TWR scheme, according to an embodiment.

FIG. 7A is a flowchart illustrating a method for measuring the location of multiple electronic devices based on a DS-TWR scheme, according to an embodiment. FIG. 7B is a flowchart illustrating a method for measuring the location of multiple electronic devices based on the DS-TWR scheme, according to an embodiment.

FIG. 7A illustrates an example in which an electronic device 101, the first external electronic device 102 and the second external electronic device 104 measure the location of each electronic device through UWB communication according to a DS-TWR scheme. According to the DS-TWR scheme, electronic devices may exchange a poll message, a response message, and a final message with each other, thereby measuring the distance from each electronic device. Information may be received or transmitted when a poll message, a response message, and a final message are transmitted or received. The information may be transmitted or received in a packet type. Operations of the electronic device 101 identifying external electronic devices or receiving a location measurement request are identical or similar to those in FIG. 4A, and repeated descriptions thereof will be omitted with reference to FIG. 7A. Numerals (for example, 12, 13, 21, 23) following English letters (for example, P, R, F) may refer to a source address used to transmit information and a destination address used to receive information. The electronic device 101 may correspond to numeral "1", the first external electronic device 102 may correspond to numeral "2", and the second external electronic device 104 may correspond to numeral "3".

Referring to FIG. 7A, the electronic device 101 may identify an external electronic device positioned nearby through UWB communication or a different type of communication from the UWB (for example, Bluetooth™ or Wi-Fi) at the request of the user, at the request of a connected server 108, or at the request of the first external electronic device 102 or the second external electronic device 104. Alternatively, the electronic device 101 may identify an external electronic device positioned within a predetermined distance periodically or selectively, without any request. The electronic device 101 may determine time scheduling information based on the number of identified external electronic devices (for example, two) or the location measurement scheme (for example, DS-TWR scheme). The electronic device 101 may transmit the determined time schedule information to the first external electronic device 102 and the second external electronic device 104.

The electronic device 101 (for example, master electronic device) may transmit information to the first external electronic device 102 and the second external electronic device 104 based on the time schedule information, and may receive information from the first external electronic device 102 and the second external electronic device 104 based on the time schedule information. The first external electronic device 102 (for example, slave electronic device) may receive the time schedule information from the electronic device 101, may transmit information to the electronic device 101 and the second external electronic device 104 based on the time schedule information, and may receive information from the electronic device 101 and the second external electronic device 104 based on the time schedule information.

The second external electronic device 104 (for example, slave electronic device) may receive the time schedule information from the electronic device 101, may transmit information to the electronic device 101 and the first external electronic device 102 based on the time schedule information, and may receive information from the electronic device 101 and the first external electronic device 102 based on the time schedule information. The first time (for example, SLOT 1 701), the second time (for example, SLOT 2 703), and the third time (for example, SLOT 3 705) are identical or similar to those described with reference to FIG. 4A with reference to FIG. 7A.

In FIG. 7A, according to the DS-TWR scheme, the first information transmitted by the electronic device 101 at the first time 701 may include information regarding the time at which the electronic device 101 transmitted the first information. The second information transmitted by the first external electronic device 102 at the second time 703 may include information regarding the time at which the first external electronic device 102 transmitted the second information. The third information transmitted by the second external electronic device 104 at the third time 705 may include information regarding the time at which the second external electronic device 104 transmitted the third information. When a poll message or a response message is sent according to the DS-TWR scheme, which is different from the SS-TWR scheme, the poll message or response message may include only information regarding the time at which information (for example, first information, second information or third information) of the subject who sends information (for example, the electronic device 101 or the second external electronic device 104) is sent. According to the DS-TWR scheme, when first information to third information is transmitted (for example, when a poll message or a response message is transmitted), time information received from a different device may not be included, and when fourth information to sixth information is sent (for example, when a final message is transmitted), time information received from a different device may be included.

The electronic device 101 may transmit fourth information (for example, (F12,R12)/(F13,R13)) to the first external electronic device 102 and the second external electronic device 104 at a fourth time (for example, SLOT 4 707). "(F12,R12)" may refer to both a final message (for example, F12) transmitted by the electronic device 101 (for example, source address numeral "1") to the first external electronic device 102 (for example, destination address numeral "2") and a response message (for example, R12) transmitted by the electronic device 101 in response to a message (for example, (R21,P21)) received from the first external electronic device 102. "(F13,R13)" may refer to both a final message (for example, F13) transmitted by the electronic device 101 (for example, source address numeral "1") to the second external electronic device 104 (for example, destination address numeral "3") and a response message (for example, R13) transmitted by the electronic device 101 in response to a message (for example, (R31,P31)) received from the second external electronic device 104. The fourth information may include at least one of information regarding the time at which the electronic device 101 transmitted the first information, information regarding the time at which the electronic device 101 received the second information, information regarding the time at which the electronic device 101 received the third information, or information regarding the time at which the electronic device 101 transmitted the fourth information.

When information is transmitted according to the DS-TWR scheme, which is different from the SS-TWR scheme, no processing time information may be included, and information regarding the time at which each piece of information was transmitted or received may be included. The purpose of packet efficiency may be the fact that information includes time information but does not processing time information.

After receiving the fourth information at the fourth time 707, the first external electronic device 102 may read information only corresponding to the first external electronic device 102 (for example, (F12,R12)) among the received fourth information, may store the read information in the memory 130, and may store information regarding the time at which the fourth information was received. The first external electronic device 102 may measure the distance from the electronic device 101 based on at least one of the first information received at the first time 701, the second information transmitted at the second time 703, or the fourth information received at the fourth time 707. For example, first external electronic device 102 may obtain processing time information based on the fourth information, and may measure the distance from the electronic device 101 based on at least one of the obtained processing time information, information regarding the time at which the first information was received, information regarding the time at which the second information was transmitted, or information regarding the time at which the fourth information was received. Upon receiving the fourth information from the electronic device 101, the first external electronic device 102 may acquire AOA information through multiple antennas and may identify the relative location of the electronic device 101 based on the acquired AOA information and the distance from the electronic device 101.

At the fourth time 707, the second external electronic device 104 may read information only corresponding to the second external electronic device 104 (for example, (F13, R13)) among received the fourth information, may store the read information in the memory 130, and may store information regarding the time at which the fourth information was received. The second external electronic device 104 may measure the distance from the electronic device 101 based on at least one of the first information received at the first time 701, the third information transmitted at the third time 705, or the fourth information received at the fourth time 707.

The second external electronic device 104 may obtain processing time information based on the fourth information, and may measure the distance from the electronic device 101 based on at least one of the obtained processing time information, information regarding the time at which the first information was received, information regarding the time at which the third information was transmitted, or information regarding the time at which the fourth information was received. Upon receiving the fourth information from the electronic device 101, the second external electronic device 104 may acquire AOA information through multiple antennas and may identify the relative location of the electronic device 101 based on the acquired AOA information and the distance from the electronic device 101.

At a fifth time (for example, SLOT 5 709), the first external electronic device 102 may transmit fifth information (for example, F21/(F23,R23)) to the electronic device 101 or the second external electronic device 104. F21 may refer to a final message transmitted by the first external electronic device 102 (for example, source address numeral "2") in response to a message (for example, (F12,R12)) that from the electronic device 101 (for example, destination address numeral "1"). "(F23,R23)" may refer to both a final message (for example, F23) transmitted by the first external electronic device 102 (for example, source address numeral "2") to the second external electronic device 104 (for example, destination address numeral "3") and a response message (for example, R23) transmitted by the first external electronic device 102 in response to a message (for example, (R32,P32)) received from the second external electronic device 104. The fifth information may include at least one of information regarding the time at which the first external electronic device 102 received the third information, information regarding the time at which the first external electronic device 102 received the fourth information, or information regarding the time at which the first external electronic device 102 transmitted the fifth information.

At the fifth time 709, the electronic device 101 may receive fifth information (for example, F21/(F23,R23)) from the first external electronic device 102, may read information only corresponding to the electronic device 101 (for example, F21) among the received fifth information, and may store the read information in the memory 130. The electronic device 101 may measure the distance from the first external electronic device 102 based on at least one of the second information received at the second time 703, the fourth information transmitted at the fourth time 707, or the fifth information received at the fifth time 709. For example, the electronic device 101 may obtain processing time information based on the fifth information, and may measure the distance from the first external electronic device 102 based on at least one of the obtained processing time information, information regarding the time at which the second information was received, information regarding the time at which the fourth information was transmitted, or information regarding the time at which the fifth information was received.

Upon receiving the fifth information from the first external electronic device 102, the electronic device 101 may acquire AOA information through multiple antennas and may identify the relative location of the first external electronic device 102 based on the acquired AOA information and the distance from the first external electronic device 102.

At the fifth time 709, the second external electronic device 104 may receive fifth information (for example, F21/(F23, R23)) from the first external electronic device 102, may read information only corresponding to the second external electronic device 104 (for example, (F23,R23)) among the received fifth information, and may store the read information in the memory 130. The second external electronic device 104 may measure the distance from the first external electronic device 102 based on at least one of the second information received at the second time 703, the third information transmitted at the third time 705 or the fifth information received at the fifth time 709. For example, the second external electronic device 104 may obtain processing time information based on the fifth information, and may measure the distance from the first external electronic device 102 based on at least one of the obtained processing time information, information regarding the time at which the second information was received, information regarding the time at which the third information was transmitted, or information regarding the time at which the fifth information was received.

Upon receiving the fifth information from the first external electronic device 102, the second external electronic device 104 may acquire AOA information through multiple antennas and may identify the relative location of the first external electronic device 102 based on the acquired AOA information and the distance from the first external electronic device 102.

At a sixth time (for example, SLOT 6 711), the second external electronic device 104 may transmit sixth information (for example, F31/F32)) to the electronic device 101 or the first external electronic device 102. F31 may refer to a final message sent by the second external electronic device 104 (for example, source address numeral "3") in response to a message (for example, (F13,R13)) received from the electronic device 101 (for example, destination address numeral "1"). F32 may refer to a final message sent by the second external electronic device 104 (for example, source address numeral "3") in response to a message (for example, (F23,R23)) received from the first external electronic device 102 (for example, destination address numeral "2"). The sixth information may include at least one of information regarding the time at which the second external electronic device 104 received the fourth information, information regarding the time at which the second external electronic device 104 received the fifth information, or information regarding the time at which the second external electronic device 104 transmitted the sixth information.

At the sixth time 711, the electronic device 101 may receive sixth information (for example, F31/F32)) from the second external electronic device 104, may read information only corresponding to the electronic device 101 (for example, F31), among the received sixth information, and may store the read information in the memory 130. The electronic device 101 may measure the distance from the second external electronic device 104 based on at least one of the third information received at the third time 705, the fourth information transmitted at the fourth time 707, or the sixth information received at the sixth time 711. For example, the electronic device 101 may obtain processing time information based on the sixth information, and may measure the distance from the second external electronic device 104 based on at least one of the obtained processing time information, information regarding the time at which the third information was received, information regarding the time at which the fourth information was transmitted, or information regarding the time at which the sixth information was received.

Upon receiving the sixth information from the second external electronic device 104, the electronic device 101 may acquire AOA information through multiple antennas and may identify the relative location of the second external electronic device 104 based on the acquired AOA information and the distance from the second external electronic device 104.

At the sixth time 711, the first external electronic device 102 may receive sixth information (for example, F31/F32) from the second external electronic device 104, may read information only corresponding to the first external electronic device 102 (for example, F32) among the received sixth information, and may store the read information in the memory 130. The first external electronic device 102 may measure the distance from the second external electronic device 104 based on at least one of the third information received at the third time 705, the fifth information transmitted at the fifth time 709, or the sixth information received at the sixth time 711. For example, the first external electronic device 102 may obtain processing time information based on the sixth information, and may measure the distance from the second external electronic device 104 based on at least one of the obtained processing time information, information regarding the time at which the third information was received, information regarding the time at which the fifth information was transmitted, or information regarding the time at which the sixth information was received.

Upon receiving the sixth information from the second external electronic device 104, the first external electronic device 102 may acquire AOA information through multiple antennas and may identify the relative location of the second external electronic device 104 based on the acquired AOA information and the distance from the second external electronic device 104.

The electronic device 101 may store information regarding the time at which $(N+1)^{th}$ information was transmitted at an $(N+1)^{th}$ time. The $(N+1)^{th}$ information may include information regarding the time at which respective pieces of last information previously transmitted by other external electronic devices were received. Additionally or alternatively, the last information may include processing time information corresponding to the time at which previous information (i.e., last information) was processed by other external electronic devices. If the second external electronic device 104 transmits a signal through an assigned time interval, the remaining electronic devices receive the same. The remaining electronic devices may identify the distance from the second external electronic device 104 and the relative angle thereof by using the signal sent by the second external electronic device 104, and this information enables each electronic device to identify the relative location with the second external electronic device 104.

The total number of pieces of ranging information to be exchanged may vary depending on the location measurement scheme (for example, SS-TWR or DS-TWR). For example, a comparison between FIG. 4A, in which three electronic devices measure locations according to the SS-TWR scheme, and FIG. 7A, in which three electronic devices measure locations according to the DS-TWR scheme, shows that the DS-TWR scheme uses one more slot than the SS-TWR scheme. In addition, according to the DS-TWR measurement scheme, if N (for example, if N is 3 in FIG. 7A) electronic devices participate in time scheduling, and if ranging information is exchanged through 2*N slots (for example, 6 slots in FIG. 7A), then the distance and direction (for example, AOA) between respective electronic devices may be identified from the exchanged ranging information. N electronic devices may all identify the relative locations with regard to each other.

FIG. 7B illustrates an example in which an electronic device 101, the first external electronic device 102, the second external electronic device 104, and the third external electronic device 430, measure the location of each electronic device through UWB communication according to the DS-TWR scheme. FIG. 7B is different from FIG. 7A in that there are three external electronic devices, and the remaining operations are identical to those in FIG. 7A. Repeated descriptions will be shortened when referring to FIG. 7B.

Referring to FIG. 7B, the electronic device 101 may identify an external electronic device positioned nearby through UWB communication or a different type of communication from the UWB (for example, Bluetooth™ or Wi-Fi) at the request of the user, at the request of a connected server 108, the first external electronic device 102, the second external electronic device 104, or the third external electronic device 430. The electronic device 101 may determine time scheduling information based on the number of identified external electronic devices (for example, three) or the location measurement scheme (for example, DS-TWR scheme). The electronic device 101 may transmit the determined time schedule information to the first external electronic device 102, the second external electronic device 104, and the third external electronic device 430. The first time 701, the second time 703, and the third time 705 are identical or similar to those described with reference to FIG. 7A, and detailed descriptions thereof will be omitted with reference to FIG. 7B. Numerals (for example, 12, 13, 14, 21, 23, 24) following English letters (for example, P, R, F) may refer to a source address used to transmit information and a destination address used to receive information. The electronic device 101 may correspond to numeral "1", the first external electronic device 102 may correspond to numeral "2", the second external electronic device 104 may correspond to numeral "3", and the third external electronic device 430 may correspond to numeral "4".

In FIG. 7B, according to the DS-TWR scheme, first information transmitted by the electronic device 101 at the first time 701 may include information regarding the time at which the electronic device 101 transmitted the first information. Second information transmitted by the first external electronic device 102 at the second time 703 may include information regarding the time at which the first external electronic device 102 transmitted the second information. Third information transmitted by the second external electronic device 104 at the third time 705 may include information regarding the time at which the second external electronic device 104 transmitted the third information. Fourth information transmitted by the third external electronic device 430 at the fourth time 707 may include information regarding the time at which the third external electronic device 430 transmitted the fourth information. When a poll message or a response message is sent according to the DS-TWR scheme, which is different from the SS-TWR scheme, the poll message or the response message may include only information regarding the time at which information (for example, first information, second information, third information, or fourth information) of the subject who sends information (for example, the electronic device 101, the first external electronic device 102, the second external electronic device 104, or the third external electronic device 430) is sent. According to the DS-TWR scheme, when first information to fourth information is transmitted (for example, when a poll message or a response message is transmitted), time information received from a different device may not be included, and when fifth information to eighth information is sent (for example, when a final message is transmitted), time information received from a different device may be included.

At the fourth time 707, the third external electronic device 430 may transmit fifth information (for example, (R41,P41)/(R42,P42)/(R43,P43)) to the electronic device 101, the first external electronic device 102, or the second external electronic device 104. "(R41,P41)" may refer to both a poll message (for example, P41) transmitted by the third external electronic device 430 (for example, source address numeral "4") to the electronic device 101 (for example, destination address numeral "1") and a response message (for example, R41). "(R42,P42)" may refer to both a poll message (for example, P42) transmitted by the third external electronic device 430 (for example, source address numeral "4") to the first external electronic device 102 (for example, destination address numeral "2") and a response message (for example, R42). "(R43,P43)" may refer to both a poll message (for example, P43) transmitted by the third external electronic device 430 (for example, source address numeral "4") to the second external electronic device 104 (for example, destination address numeral "3") and a response message (for example, R43).

The fourth information may include information regarding the time at which the third external electronic device 430 transmitted the fourth information.

At the fourth time 707, the electronic device 101 may receive fourth information (for example, (R41,P41)/(R42,P42)/(R43,P43)) from the third external electronic device 430, may read information only corresponding to the electronic device 101 (for example, (R41,P41)), among the received fourth information, and may store the read information in the memory 130. The electronic device 101 may store information regarding the time at which the fourth information was received in the memory 130. At the fourth time 707, the first external electronic device 102 may receive fourth information (for example, (R41,P41)/(R42,P42)/(R43,P43)) from the third external electronic device 430, may read information only corresponding to the first external electronic device 102 (for example, (R42,P42)), among the received fourth information, and may store the read information in the memory 130. The first external electronic device 102 may store information regarding the time at which the fourth information was received in the memory 130. At the fourth time 707, the second external electronic device 104 may receive fourth information (for example, (R41,P41)/(R42,P42)/(R43,P43)) from the third external electronic device 430, may read information only corresponding to the second external electronic device 104 (for example, (R43,P43)), among the received fourth information, and may store the read information in the memory 130. The second external electronic device 104 may store information regarding the time at which the fourth information was received in the memory 130.

At the fifth time 709, the electronic device 101 may transmit fifth information (for example, (F12,R12)/(F13,R13)/(F14,R14)) to the first external electronic device 102, to the second external electronic device 104, or to the third external electronic device 430. "(F12,R12)" may refer to both a final message (for example, F12) transmitted by the electronic device 101 (for example, source address numeral "1") to the first external electronic device 102 (for example, destination address numeral "2") and a response message (for example, R12). "(F13,R13)" may refer to both a final message (for example, F13) transmitted by the electronic device 101 (for example, source address numeral "1") to the second external electronic device 104 (for example, destination address numeral "3") and a response message (for example, R13). "(F14,R14)" may refer to both a final message (for example, F14) transmitted by the electronic device 101 (for example, source address numeral "1") to the third external electronic device 430 (for example, destination address numeral "4") and a response message (for example, R14).

The fifth information may include at least one of information regarding the time at which the electronic device 101 transmitted the first information, information regarding the time at which the electronic device 101 received the second information, information regarding the time at which the electronic device 101 received the third information, information regarding the time at which the electronic device 101 received the fourth information, or information regarding the time at which the electronic device 101 transmitted the fifth information.

At the fifth time 709, the first external electronic device 102 may receive fifth information (for example, (F12,R12)/(F13,R13)/(F14,R14)) from the electronic device 101, may read information only corresponding to the first external electronic device 102 (for example, (F12,R12)) among the received fifth information, and may store the read information in the memory 130. At the fifth time 709, the first external electronic device 102 may measure the distance from the electronic device 101 based on at least one of the first information received at the first time 701, the second information transmitted at the second time 703, or the fifth information received at the fifth time 709. For example, the first external electronic device 102 may obtain information regarding the processing time of the electronic device 101 based on the fifth information, and may measure the distance from the electronic device 101 based on at least one of the obtained processing time information, information regarding the time at which the first information was received, information regarding the time at which the second information was transmitted, or information regarding the time at which the fifth information was received. Upon receiving the fifth information from the electronic device 101, the first external electronic device 102 may acquire AOA information through multiple antennas and may identify the relative location of the electronic device 101 based on the acquired AOA information and the distance from the electronic device 101.

At the fifth time 709, the second external electronic device 104 may receive fifth information (for example, (F12,R12)/(F13,R13)/(F14,R14)) from the electronic device 101, may read information only corresponding to the second external electronic device 104 (for example, (F13,R13)) among the received fifth information, and may store the read information in the memory 130. At the fifth time 709, the second external electronic device 104 may measure the distance from the electronic device 101 based on at least one of the first information received at the first time 701, the third information transmitted at the third time 705, or the fifth information received at the fifth time 709. For example, the second external electronic device 104 may obtain information regarding the processing time of the electronic device 101 based on the fifth information, and may measure the distance from the electronic device 101 based on at least one of the obtained processing time information, information regarding the time at which the first information was received, information regarding the time at which the third information was transmitted, or information regarding the time at which the fifth information was received. Upon receiving the fifth information from the electronic device 101, the second external electronic device 104 may acquire AOA information through multiple antennas and may identify the relative location of the electronic device 101 based on the acquired AOA information and the distance from the electronic device 101.

At the fifth time 709, the third external electronic device 430 may receive fifth information (for example, (F12,R12)/(F13,R13)/(F14,R14)) from the electronic device 101, may read information only corresponding to the third external electronic device 430 (for example, (F14,R14)) among the received fifth information, and may store the read information in the memory 130. At the fifth time 709, the third external electronic device 430 may measure the distance from the electronic device 101 based on at least one of the first information received at the first time 701, the fourth information transmitted at the fourth time 707, or the fifth information received at the fifth time 709. For example, the third external electronic device 430 may obtain information regarding the processing time of the electronic device 101 based on the fifth information, and may measure the distance from the electronic device 101 based on at least one of the obtained processing time information, information regarding the time at which the first information was received, information regarding the time at which the fourth information was transmitted, or information regarding the time at which the fifth information was received. Upon receiving the fifth information from the electronic device 101, the third external electronic device 430 may acquire AOA information through multiple antennas and may identify the relative location of the electronic device 101 based on the acquired AOA information and the distance from the electronic device 101.

At the sixth time 711, the first external electronic device 102 may transmit sixth information (for example, F21/(F23, R23)/(F24,R24)) to the electronic device 101, the second external electronic device 104, and the third external electronic device 430. F21 may refer to a final message transmitted by the first external electronic device 102 (for example, source address numeral "2") to the electronic device 101 (for example, destination address numeral "1"). (F23,R23) may refer to both a final message (for example, F23) transmitted by the first external electronic device 102 (for example, source address numeral "2") to the second external electronic device 104 (for example, destination address numeral "3") and a response message (for example, R23). (F24,R24) may refer to both a final message (for example, F24) transmitted by the first external electronic device 102 (for example, source address numeral "2") to the third external electronic device 430 (for example, destination address numeral "4") and a response message (for example, R24).

The sixth information may include at least one of information regarding the time at which the first external electronic device 102 transmitted the second information, information regarding the time at which the first external electronic device 102 received the third information, information regarding the time at which the first external electronic device 102 received the fourth information, information regarding the time at which the first external electronic device 102 received the fifth information, or information regarding the time at which the first external electronic device 102 transmitted the sixth information.

At the sixth time 711, the electronic device 101 may receive sixth information (for example, F21/(F23,R23)/(F24,R24)) from the first external electronic device 102, may read information only corresponding to the electronic device 101 (for example, F21) among the received sixth information, and may store the read information in the memory 130. At the sixth time 711, the electronic device 101 may measure the distance from the first external electronic device 102 based on at least one of the second information received at the second time 703, the fifth information transmitted at the fifth time 709, or the sixth information received at the sixth time 711. For example, the electronic device 101 may obtain information regarding the processing time of the first external electronic device 102 based on the sixth information, and may measure the distance from the first external electronic device 102 based on at least one of the obtained processing time information, information regarding the time at which the second information was received, information regarding the time at which the fifth information was transmitted, or information regarding the time at which the sixth information was received.

Upon receiving the sixth information from the first external electronic device 102, the electronic device 101 may acquire AOA information through multiple antennas and may identify the relative location of the first external electronic device 102 based on the acquired AOA information and the distance from the first external electronic device 102.

At the sixth time 711, the second external electronic device 104 may receive sixth information (for example, F21/(F23,R23)/(F24,R24))) from the first external electronic device 102, may read information only corresponding to the second external electronic device 104 (for example, (F23, R23)) among the received sixth information, and may store the read information in the memory 130. At the sixth time 711, the second external electronic device 104 may measure the distance from the first external electronic device 102 based on at least one of the second information received at the second time 703, the third information transmitted at the third time 705, or the sixth information received at the sixth time 711. For example, the second external electronic device 104 may obtain information regarding the processing time of the first external electronic device 102 based on the sixth information, and may measure the distance from the first external electronic device 102 based on at least one of the obtained processing time information, information regarding the time at which the second information was received, information regarding the time at which the third information was transmitted, or information regarding the time at which the sixth information was received.

Upon receiving the sixth information from the first external electronic device 102, the second external electronic device 104 may acquire AOA information through multiple antennas and may identify the relative location of the first external electronic device 102 based on the acquired AOA information and the distance from the first external electronic device 102.

At the sixth time 711, the third external electronic device 430 may receive sixth information (for example, F21/(F23, R23)/(F24,R24)) from the first external electronic device 102, may read information only corresponding to the third external electronic device 430 (for example, (F24,R24)) among the received sixth information, and may store the read information in the memory 130. At the sixth time 711, the third external electronic device 430 may measure the distance from the first external electronic device 102 based on at least one of the second information received at the second time 703, the fourth information transmitted at the fourth time 707, or the sixth information received at the sixth time 711. For example, the third external electronic device 430 may obtain information regarding the processing time of the first external electronic device 102 based on the sixth information, and may measure the distance from the first external electronic device 102 based on at least one of the obtained processing time information, information regarding the time at which the second information was received, information regarding the time at which the fourth information was transmitted, or information regarding the time at which the sixth information was received.

Upon receiving the sixth information from the first external electronic device 102, the third external electronic device 430 may acquire AOA information through multiple antennas and may identify the relative location of the first external electronic device 102 based on the acquired AOA information and the distance from the first external electronic device 102.

At the seventh time 713, the second external electronic device 104 may transmit seventh information (for example, F31/F32/(F34,R34)) to the electronic device 101, the first external electronic device 102, and the third external electronic device 430. F31 may refer to a final message transmitted by the second external electronic device 104 (for example, source address numeral "3") to the electronic device 101 (for example, destination address numeral "1"). F32 may refer to a final message transmitted by the second external electronic device 104 (for example, source address numeral "3") to the first external electronic device 102 (for example, destination address numeral "2"). (F34,R34) may refer to both a final message (for example, F34) transmitted by the second external electronic device 104 (for example, source address numeral "3") to the third external electronic device 430 (for example, destination address numeral "4") and a response message (for example, R34)

For example, the seventh information may include at least one of information regarding the time at which the second external electronic device 104 transmitted the third information, information regarding the time at which the second external electronic device 104 received the fourth information, information regarding the time at which the second external electronic device 104 received the fifth information, information regarding the time at which the second external electronic device 104 received the sixth information, or information regarding the time at which the second external electronic device 104 transmitted the seventh information.

At the seventh time 713, the electronic device 101 may receive seventh information (for example, F31/F32/(F34, R34)) from the second external electronic device 104, may read information only corresponding to the electronic device 101 (for example, F31) among the received seventh information, and may store the read information in the memory 130. At the seventh time 713, the electronic device 101 may measure the distance from the second external electronic device 104 based on at least one of the third information received at the third time 705, the fifth information transmitted at the fifth time 709, or the seventh information received at the seventh time 713. For example, the electronic device 101 may obtain information regarding the processing time of the second external electronic device 104 based on the seventh information, and may measure the distance from the second external electronic device 104 based on at least one of the obtained processing time information, information regarding the time at which the third information was received, information regarding the time at which the fifth information was transmitted, or information regarding the time at which the seventh information was received.

Upon receiving the seventh information from the second external electronic device 104, the electronic device 101 may acquire AOA information through multiple antennas and may identify the relative location of the second external electronic device 104 based on the acquired AOA information and the distance from the second external electronic device 104.

At the seventh time 713, the first external electronic device 102 may receive seventh information (for example, F31/F32/(F34,R34)) from the second external electronic device 104, may read information only corresponding to the first external electronic device 102 (for example, F32) among the received seventh information, and may store the read information in the memory 130. At the seventh time 713, the first external electronic device 102 may measure the distance from the second external electronic device 104 based on at least one of the third information received at the third time 705, the sixth information transmitted at the sixth time 711, or the seventh information received at the seventh time 713. For example, the first external electronic device 102 may obtain information regarding the processing time of the second external electronic device 104 based on the seventh information, and may measure the distance from the second external electronic device 104 based on at least one of the obtained processing time information, information regarding the time at which the third information was received, information regarding the time at which the sixth information was transmitted, or information regarding the time at which the seventh information was received.

Upon receiving the seventh information from the second external electronic device 104, the first external electronic device 102 may acquire AOA information through multiple antennas and may identify the relative location of the second external electronic device 104 based on the acquired AOA information and the distance from the second external electronic device 104.

At the seventh time 713, the third external electronic device 430 may receive seventh information (for example, F31/F32/(F34,R34)) from the second external electronic device 104, may read information only corresponding to the third external electronic device 430 (for example, (F34, R34)) among the received seventh information, and may store the read information in the memory 130. At the seventh time 713, the third external electronic device 430 may measure the distance from the second external electronic device 104 based on at least one of the third information received at the third time 705, the fourth information transmitted at the fourth time 707, or the seventh information received at the seventh time 713. For example, the third external electronic device 430 may obtain information regarding the processing time of the second external electronic device 104 based on the seventh information, and may measure the distance from the second external electronic device 104 based on at least one of the obtained processing time information, information regarding the time at which the third information was received, information regarding the time at which the fourth information was transmitted, or information regarding the time at which the seventh information was received.

Upon receiving the seventh information from the second external electronic device 104, the third external electronic device 430 may acquire AOA information through multiple antennas and may identify the relative location of the second external electronic device 104 based on the acquired AOA information and the distance from the second external electronic device 104.

At the eighth time 715, the third external electronic device 430 may transmit eighth information (for example, F41/F42/F43) to the electronic device 101, the first external electronic device 102, and the second external electronic device 104. F41 may refer to a final message transmitted by the third external electronic device 430 (for example, source address numeral "4") to the electronic device 101 (for example, destination address numeral "1"). F42 may refer to a final message transmitted by the third external electronic device 430 (for example, source address numeral "4") to the first external electronic device 102 (for example, destination address numeral "2"). F43 may refer to a final message transmitted by the third external electronic device 430 (for example, source address numeral "4") to the second external electronic device 104 (for example, destination address numeral "3").

For example, the eighth information may include at least one of information regarding the time at which the third external electronic device 430 transmitted the fourth information, information regarding the time at which the third external electronic device 430 received the fifth information, information regarding the time at which the third external electronic device 430 received the sixth information, information regarding the time at which the third external electronic device 430 received the seventh information, or information regarding the time at which the third external electronic device 430 transmitted the eighth information.

At the eighth time 715, the electronic device 101 may receive eighth information (for example, F41/F42/F43) from the third external electronic device 430, may read information only corresponding to the electronic device 101 (for example, F41), among the received eighth information, and may store the read information in the memory 130. At the eighth time 715, the electronic device 101 may measure the distance from the third external electronic device 430 based on at least one of the fourth information received at the fourth time 707, the fifth information transmitted at the fifth time 709, or the eighth information received at the eighth time 715. For example, the electronic device 101 may obtain information regarding the processing time of the third external electronic device 430 based on the eighth information, and may measure the distance from the third external electronic device 430 based on at least one of the obtained processing time information, information regarding the time at which the fourth information was received, information regarding the time at which the fifth information was transmitted, or information regarding the time at which the eighth information was received.

Upon receiving the seventh information from the third external electronic device 430, the electronic device 101 may acquire AOA information through multiple antennas and may identify the relative location of the third external electronic device 430 based on the acquired AOA information and the distance from the third external electronic device 430.

At the eighth time 715, the first external electronic device 102 may receive seventh information (for example, F41/F42/F43) from the third external electronic device 430, may read information only corresponding to the first external electronic device 102 (for example, F42), among the received eighth information, and may store the read information in the memory 130. At the eighth time 715, the first external electronic device 102 may measure the distance from the third external electronic device 430 based on at least one of the fourth information received at the fourth time 705, the sixth information transmitted at the sixth time 711, or the eighth information received at the eighth time 715. For example, the first external electronic device 102 may obtain information regarding the processing time of the third external electronic device 430 based on the eighth information, and may measure the distance from the third external electronic device 430 based on at least one of the obtained processing time information, information regarding the time at which the fourth information was received, information regarding the time at which the sixth information was transmitted, or information regarding the time at which the eighth information was received.

Upon receiving the eighth information from the third external electronic device 430, the first external electronic device 102 may acquire AOA information through multiple antennas and may identify the relative location of the third external electronic device 430 based on the acquired AOA information and the distance from the third external electronic device 430.

At the eighth time 715, the second external electronic device 104 may receive eighth information (for example, F41/F42/F43) from the third external electronic device 430, may read information only corresponding to the second external electronic device 104 (for example, F43), among the received eighth information, and may store the read information in the memory 130. At the eighth time 715, the second external electronic device 104 may measure the distance from the third external electronic device 430 based on at least one of the fourth information received at the fourth time 707, the seventh information transmitted at the seventh time 713, or the eighth information received at the eighth time 715. For example, the second external electronic device 104 may obtain information regarding the processing time of the third external electronic device 430 based on the eighth information, and may measure the distance from the third external electronic device 430 based on at least one of the obtained processing time information, information regarding the time at which the fourth information was received, information regarding the time at which the seventh information was transmitted, or information regarding the time at which the eighth information was received.

Upon receiving the eighth information from the third external electronic device 430, the second external electronic device 104 may acquire AOA information through multiple antennas and may identify the relative location of the third external electronic device 430 based on the acquired AOA information and the distance from the third external electronic device 430.

FIG. 7C illustrates exemplary information transmitted based on the DS-TWR scheme, according to an embodiment. FIG. 7D illustrates exemplary information transmitted based on the DS-TWR scheme, according to an embodiment. FIG. 7E illustrates exemplary information transmitted based on the DS-TWR scheme, according to an embodiment.

FIG. 7C illustrates packets including time information. As illustrated in FIG. 7C, various types of packet configurations may be implemented by using packets that may be provided by default.

Referring to FIG. 7C, when the electronic device 101 or the first external electronic device 102 follows the MAC frame format of 802.15.4, the source address and the source PAN ID may be implemented in the MHR. The following description, with respect to FIG. 7C, may be directed to specifying payload fields of packets. First information 740 transmitted by the electronic device 101 at the first time 701 in FIG. 7A may include at least one of a source address 741, a message type 743, time information 745, a first destination address 747, or a second destination address 749. The source address 741 may an identifier assigned to the electronic device 101 101 that transmitted the first information 740, and may be "1", for example. The message type 743 may refer to a message type to which the first information corresponds and, since a poll message, a response message, or a final message is exchanged according to the DS-TWR scheme, the message type 743 may be one of a poll message, a response message, or a final message.

The message type 743 of the first information 740 is initially sent by the electronic device 101 and thus may correspond to a poll message. The txTime 745 may indicate the time at which the electronic device 101 transmits the first information 740. The first destination address 747 is an identifier assigned to the first external electronic device 102 that receives the first information 740 and may be "2", for example. The second destination address 749 is an identifier assigned to the second external electronic device 104 that receives the first information 740 and may be "3", for example.

At the first time 701, the first external electronic device 102 may receive the first information 740 and may identify, based on the source address 741, that the first information 740 was transmitted from the electronic device 101, may identify that the message type 743 corresponds to a poll message, and may identify, based on the first destination address 747, that the first information 740 was sent to the first external electronic device 102. The first external electronic device 102 may store the time information 745 included in the first information 740, or information regarding the time at which the first information 740 was received, in the memory 130.

In addition, at the first time 701, the second external electronic device 104 may receive the first information 740 and may identify, based on the source address 741, that the first information 740 was transmitted from the electronic device 101, may identify that the message type 743 corresponds to a poll message, and may identify, based on the second destination address 749, that the first information 740 was sent to the second external electronic device 104. The second external electronic device 104 may store the time information 745 included in the first information 740, or information regarding the time at which the first information 740 was received, in the memory 130.

At the second time 703, the first external electronic device 102 may transmit second information 750. The second information 750 may include information 751 corresponding to a poll message and information 755 corresponding to a response message. The information 751 corresponding to a poll message may indicate that the second information 750 was sent by the first external electronic device 102 (for example, SOUR is "2"), and that the message type corresponds to a poll message (for example, TYPE is "poll"); may include information 753 regarding the time at which the first external electronic device 102 transmitted the second information 750; and may indicate that the second information 750 was transmitted to the electronic device 101 (for example, DEST is "1") or to the second external electronic device 104 (for example, DEST is "3"). The information 755 corresponding to a response message may indicate that the message type corresponds to a response message (for example, TYPE is "RESP"), and the device to receive the response message is the electronic device 101 (for example, DEST is "1").

At the second time 703, the electronic device 101 may receive the second information 750 and may store the time information 753 included in the second information 750, or information regarding the time at which the second information 750 was received, in the memory 130. At the second time 703, the second external electronic device 104 may receive the second information 750 and may store the time information 753 included in the second information 750, or information regarding the time at which the second information 750 was received, in the memory 130.

The fourth information 760 transmitted by the electronic device 101 at the fourth time 707 may include information 761 corresponding to a response message and information 762 corresponding to a final message. The information 761 corresponding to a response message may indicate that the fourth information 760 was sent by the electronic device 101 (for example, SOUR is "1"), that the message type corresponds to a response message (for example, TYPE is "RESP"), and that the destination address of the response message corresponds to the first external electronic device 102 (for example, DEST is "2") or the second external electronic device 104 (for example, DEST is "3"). The information 762 corresponding to a final message may include a message type 763, first time information 764, a first destination address 765, second time information 767, a second destination address 768, or third time information 769. The message type 763 may indicate that the message type corresponds to a final message (for example, TYPE is "FINAL").

The first time information 764 may include a time at which the electronic device 101 transmits the fourth information 760. The first destination address 765 may include an identifier (for example, "2") of the first external electronic device 102 which is supposed to receive the information 762 corresponding to a final message. The second time information 767 may include a time at which the electronic device 101 received the second information 740. The second destination address 768 may include an identifier (for example, "3") of the second external electronic device 104 which is supposed to receive the information 762 corresponding to a final message. The third time information 769 may include a time at which the electronic device 101 received the third information.

At the fourth time 707, the first external electronic device 102 may receive the fourth information 760 and may store the first time information 764 or the second time information 767 included in the fourth information 760, or information regarding the time at which the fourth information 760 was received, in the memory 130. The first external electronic device 102 may obtain information regarding the processing time of the electronic device 101 based on the first time information 764 or the second time information 767. The first external electronic device 102 may measure the distance from the electronic device 101 based on at least one of the obtained information regarding the processing time of the electronic device 101, information regarding the time at which the first information 740 was received, information regarding the time at which the second information 750 was transmitted, or information regarding the time at which the fourth information 760 was received.

At the fourth time 707, the second external electronic device 104 may receive the fourth information 760 and may store the first time information 764 or the second time information 767 included in the fourth information 760, or information regarding the time at which the fourth information 760 was received, in the memory 130. The second external electronic device 104 may obtain information regarding the processing time of the electronic device 101 based on the first time information 764 or the second time information 767. The second external electronic device 104 may measure the distance from the electronic device 101 based on at least one of the obtained information regarding the processing time of the electronic device 101, information regarding the time at which the first information 740 was received, information regarding the time at which the third information was transmitted, or information regarding the time at which the fourth information 760 was received.

FIG. 7D illustrates packets including time information in a final message, according to an embodiment.

Referring to FIG. 7D, the electronic device 101 and/or the first external electronic device 102 may not send time information when sending a poll message, and may transmit all pieces of time information included, when only sending a final message. In this case, first information 770 transmitted by the electronic device 101 at the first time 701 may include at least one of a source address (for example, SOUR "1"), a message type (for example, TYPE is "POLL"), a first destination address (for example, DEST "2"), or a second destination address (for example, DEST "3"). At the first time 701, the first external electronic device 102 may receive the first information 770 and may store information regarding the time at which the first information 770 was received, in the memory 130. At the first time 701, the second external electronic device 104 may receive the first information 770 and may store information regarding the time at which the first information 770 was received, in the memory 130.

At the second time 703, the first external electronic device 102 may transmit second information 775. The second information 775 may include information 777 corresponding to a poll message and information 778 corresponding to a response message. The information 777 corresponding to a poll message may indicate that the second information 775 was sent by the first external electronic device 102 (for example, SOUR is "2"), that the message type corresponds to a poll message (for example, TYPE is "poll"), and that the same was transmitted to the electronic device 101 (for example, DEST is "1") or to the second external electronic device 104 (for example, DEST is "3"). The information 778 corresponding to a response message may indicate that the message type corresponds to a response message (for example, TYPE is "RESP"), and the device to receive the response message is the electronic device 101 (for example, DEST is "1").

The fourth information 780 transmitted by the electronic device 101 at the fourth time 707 may include information 781 corresponding to a response message and information 782 corresponding to a final message. The information 781 corresponding to a response message may indicate that the fourth information 780 was sent by the electronic device 101 (for example, SOUR is "1"), that the message type corresponds to a response message (for example, TYPE is "RESP"), and that the destination address of the response message corresponds to the first external electronic device 102 (for example, DEST is "2") or the second external electronic device 104 (for example, DEST is "3"). The information 782 corresponding to a final message may include a message type 783, first time information 784, second time information 785, a first destination address 786, third time information 787, a second destination address 788, or fourth time information 789.

The message type 783 may indicate that the message type corresponds to a final message (for example, TYPE is "FINAL"). The first time information 784 may include a time at which the electronic device 101 transmitted the first information 770, and the second time information 785 may include a time at which the electronic device 101 transmitted the fourth information 780. The first destination address 786 may include an identifier (for example, "2") of the first external electronic device 102 which is supposed to receive the information 782 corresponding to a final message. The third time information 787 may include a time at which the electronic device 101 received the second information 775. The second destination address 788 may include an identifier (for example, "3") of the second external electronic device 104 which is supposed to receive the information 782 corresponding to a final message. The fourth time information 789 may include a time at which the electronic device 101 received the third information.

At the fourth time 707, the first external electronic device 102 may receive the fourth information 760 and may measure the distance from the electronic device 101 according to Equation (2) below:

$$\text{Distance} = ((\text{time at which second information was received} - \text{time at which first information was transmitted}) - (\text{time at which second information was transmitted} - \text{time at which first information was received}) + (\text{time at which fourth information was received} - \text{time at which second information was transmitted}) - (\text{time at which fourth information was transmitted} - \text{time at which second information was received})) / 4 * \text{speed of light} \quad \text{Equation (2)}$$

FIG. 7E illustrates packets that are broadcast, according to an embodiment.

Referring to FIG. 7E, prior to transmitting information according to the DS-TWR scheme, the electronic device 101 (for example, the master electronic device) may transmit time schedule information to a first external electronic device 102 and a second external electronic device 104 (for example, slave electronic devices). The time schedule information configures a device to transmit information at each time such that each electronic device can transmit information only at a time assigned thereto and cannot transmit information outside the time assigned thereto. In addition, since each electronic device transmits or receives information based on the time schedule information, the same can be aware of which electronic device (for example, source address) transmitted information at each time, which electronic device (for example, destination address) is to receive information, and what type of message is to be received. Therefore, each electronic device may have a broadcast-type packet configuration.

At the first time 701, the electronic device 101 may transmit first information 790. The electronic device 101 may transmit the first information 790 as a type of packet having no payload field. The first information 790 may include a source address (for example, SOUR "1"). Upon receiving the first information 790 at the first time 701, the first external electronic device 102 may store information regarding the time at which the first information 790 was received in the memory 130. Upon receiving the first information 790 at the first time 701, the second external electronic device 104 may store information regarding the time at which the first information 790 was received in the memory 130.

At the second time 703, the first external electronic device 102 may transmit second information 793. The second information 793 may include a source address (for example, SOUR "2"). Upon receiving the second information 793 at the second time 703, the electronic device 101 may store information regarding the time at which the second information 793 was received in the memory 130. Upon receiving the second information 793 at the second time 703, the second external electronic device 104 may store information regarding the time at which the second information 793 was received in the memory 130.

The fourth information 795 transmitted by the electronic device 101 at the fourth time 707 may include a source address (for example, SOUR "2"), first time information 784, second time information 785, a first destination address 786, third time information 787, a second destination address 788, or fourth time information 789. The first time information 784 may include a time at which the electronic device 101 transmitted the first information 770, and the second time information 785 may include a time at which the electronic device 101 transmitted the fourth information 780. The first destination address 786 may include an identifier (for example, "2") of the first external electronic device 102 which is supposed to receive the information 782 corresponding to a final message. The third time information 787 may include a time at which the electronic device 101 received the second information 775. The second destination address 788 may include an identifier (for example, "3") of the second external electronic device 104 which is supposed to receive the information 782 corresponding to a final message. The fourth time information 789 may include a time at which the electronic device 101 received the third information.

At the fourth time 707, the first external electronic device 102 may receive the fourth information 760 and may measure the distance from the electronic device 101 according to Equation (2). At the fourth time 707, the second external electronic device 104 may receive the fourth information 760 and may measure the distance from the electronic device 101 according to Equation (2).

The fifth information 720 transmitted by the first external electronic device 102 at the fifth time 709 may include a source address (for example, SOUR "2"), first time information 721, second time information 722, a first destination address 723, third time information 724, a second destination address 725, or fourth time information 726. The first time information 721 may include a time at which the first external electronic device 102 transmitted the second information 793, and the second time information 722 may include a time at which the first external electronic device 102 transmitted the fifth information 720. The first destination address 723 may include an identifier (for example, "1") of the electronic device 101 which is supposed to receive the information 720. The third time information 724 may include a time at which the first external electronic device 102 received the first information 790. The second destination address 725 may include an identifier (for example, "3") of the second external electronic device 104 which is supposed to receive the information 720. The fourth time information 726 may include a time at which the first external electronic device 102 received the third information.

At the fifth time 709, the electronic device 101 may receive the fifth information 720 and may store the first time information 721, the second time information 722, the third time information 724 included in the fifth information 720, or information regarding the time at which the fifth information 720 was received, in the memory 130. The electronic device 101 may obtain information regarding the processing time of the electronic device 101 based on at least one of the first time information 721, the second time information 722, or the third time information 724. The electronic device 101 may measure the distance from the first external electronic device 102 based on at least one of the obtained information regarding the processing time of the electronic device 101, information regarding the time at which the second information 793 was received, information regarding the time at which the fourth information 795 was transmitted, or information regarding the time at which the fifth information 720 was received.

At the fifth time 709, the second external electronic device 104 may receive the fifth information 720 and may store the first time information 764, the second time information 767, the third time information 726 included in the fifth information 720, or information regarding the time at which the fourth information 760 was received, in the memory 130. The second external electronic device 104 may obtain information regarding the processing time of the electronic device 101 based on at least one of the first time information 764, the second time information 767, or the third time information 726. The second external electronic device 104 may measure the distance from the first external electronic device 102 based on at least one of the obtained information regarding the processing time of the electronic device 101, information regarding the time at which the second information 793 was received, information regarding the time at which the third information was transmitted, or information regarding the time at which the fifth information 720 was received.

Figure 8:
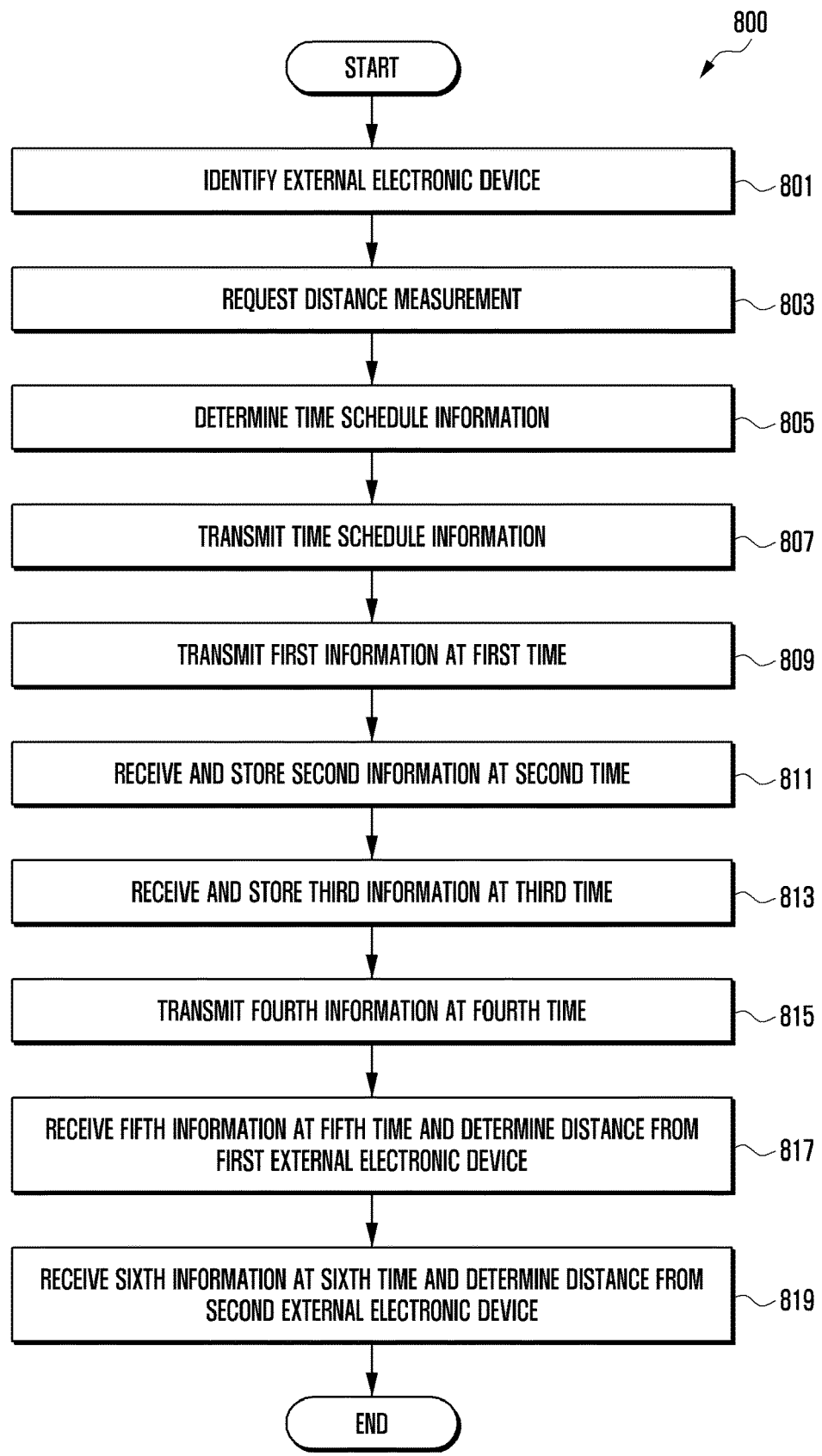
FIG. 8 is a flowchart illustrating a method for operating a master electronic device based on the DS-TWR scheme, according to an embodiment.

FIG. 8 is a flowchart 800 illustrating a method for operating a master electronic device based on the DS-TWR scheme, according to an embodiment.

FIG. 8 describes a method wherein an electronic device 101 operates as a master electronic device. FIG. 8 illustrates location measurement operations according to the DS-TWR scheme, which may be identical or similar to those in FIG. 5. When referring to FIG. 8, descriptions overlapping those in FIG. 5 may be shortened.

Referring to FIG. 8, in step 801, the processor 120 of the electronic device 101 identifies an external electronic device (for example, the first external electronic device 102, the second external electronic device 104, or the third external electronic device 430 in FIG. 7A or FIG. 7B) through a communication module 190. The processor 120 may identify external electronic devices by using a first type of communication (for example, UWB) or a second type of communication (for example, Bluetooth™ or Wi-Fi). Alternatively, the processor 120 may identify external electronic devices through a server 108 to which the electronic device 101 is currently connected. Additionally or alternatively, the processor 120 may identify external electronic devices if a designated condition is satisfied. Step 801 may be identical or similar to step 501 in FIG. 5.

In step 803, the processor 120 receives a distance (or a location) measurement request. For example, the processor 120 may transmit a message (or data) to the identified external electronic devices so as to identify whether or not they will participate in distance measurement, and may identify (or determine) that the distance measurement request has been made if a response message is received in response to the transmitted message. For example, the processor 120 may transmit the distance measurement participation identification message periodically or selectively (for example, at the user's request). Additionally or alternatively, the processor 120 may receive a request for measuring the distance from the external electronic devices from the user through an input device 150. In addition, the processor 120 may identify that there is a distance measurement request if an application (for example, game application) that uses the distance from external electronic devices is executed. Step 803 may be identical or similar to step 503 in FIG. 5.

In step 805, the processor 120 determines time schedule information. The processor 120 may determine the time schedule information based on a location measurement scheme or the number of external electronic devices that transmitted response messages in response to the distance measurement request. It may be assumed in the description of operations in FIG. 8 that the electronic device 101, the first external electronic device 102 and the second external electronic device 104 measure locations according to the DS-TWR scheme as in FIG. 7A. The processor 120 may determine a master electronic device (for example, electronic device 101) as the device to which information is to be transmitted first, and may determine the external electronic devices as devices to which information is to be transmitted at the remaining times.

For example, according to the DS-TWR scheme, it is only after a response message is transmitted in connection with a poll message, and a final message is received, that the distance from a different electronic device can be measured. Step 805 may be identical or similar to step 505 in FIG. 5.

In step 807, the processor 120 transmits the determined time schedule information to the external electronic devices. The processor 120 may transmit the determined time schedule information as a broadcast type communication, or may transmit the determined time schedule information to external electronic devices that responded to the distance measurement request. The processor 120 may transmit the determined time schedule information to the external electronic devices through the first type of communication or the second type of communication.

The processor 120 may transmit the determined time schedule information to the external electronic devices through the server 108. Step 807 may be identical or similar to step 507 in FIG. 5.

In step 809, the processor 120 transmits first information (or signal/data) at a first time (for example, SLOT 1 701 in FIG. 7A). The processor 120 may identify (or confirm) the time when information can be transmitted, based on the time schedule information, and may transmit the first information at the first time. The first information (for example, P12/P13 in FIG. 7A) may include the identifier of the electronic device 101 (for example, source address "1") or information regarding the time at which the electronic device 101 transmitted the first information. The first information may be transmitted as a broadcast type communication or transmitted while the destination address (for example, destination addresses "2" and "3") is configured therein. The first information may be transmitted to the first external electronic device 102 and the second external electronic device 104. The processor 120 may store information regarding the time at which the first information was transmitted in the memory 130. After receiving the first information, the first external electronic device 102 and the second external electronic device 104 may store information regarding the time at which the first information was received.

In step 811, the processor 120 receives second information (for example, (R21,P21)/P23 in FIG. 7A) at a second time (for example, SLOT 2 703 in FIG. 7A) and may store the second information in the memory 130. The processor 120 may read information only corresponding to the electronic device 101 (for example, (R21,P21)) among the received second information, and store the read information in the memory 130. The processor 120 may store information regarding the time at which the second information was received in the memory 130, or may read time information included in the second information and may store the same in the memory 130. Upon receiving the second information, the second external electronic device 104 may store information regarding the time at which the second information was received. The second information may include information regarding the time at which the first external electronic device 102 received the first information, or information regarding the time at which the first external electronic device 102 transmitted the second information.

In step 813, the processor 120 receives third information (for example, (R31,P31)/(R32,P32) in FIG. 7A) at a third time (for example, SLOT 3 705 in FIG. 7A), and may store the third information in the memory 130. The processor 120 may read information only corresponding to the electronic device 101 (for example, (R31,P31)) among the received third information, and store the read information in the memory 130. The processor 120 may store information regarding the time at which the third information was received in the memory 130, or may read time information included in the third information and may store the read information in the memory 130. For example, the third information may include at least one of information regarding the time at which the second external electronic device 104 received the first information, information regarding the time at which the second external electronic device 104 received the second information, or information regarding the time at which the second external electronic device 104 transmitted the third information.

In step 815, the processor 120 transmits fourth information (for example, (P12,R12)/(P13,R13) in FIG. 7A) at a fourth time (for example, SLOT 4 707 in FIG. 7A). The fourth information may include at least one of information regarding the time at which the electronic device 101 received the second information, information regarding the time at which the electronic device 101 received the third information, or information regarding the time at which the electronic device 101 transmitted the fourth information.

Upon receiving the fourth information at the fourth time 707, the first external electronic device 102 may read information only corresponding to the first external electronic device 102 (for example, (F12,R12)) among the received fourth information, may store the read information in the memory 130, and may store information regarding the time at which the fourth information was received. The first external electronic device 102 may measure the distance from the electronic device 101 based on at least one of the first information received at the first time 701, the second information transmitted at the second time 703, or the fourth information received at the fourth time 707. At the fourth time 707, the second external electronic device 104 may read information only corresponds to the second external electronic device 104 (for example, (F13,R13)) among the received fourth information, may store the read information in the memory 130, and may store information regarding the time at which the fourth information was received. The second external electronic device 104 may measure the distance from the electronic device 101 based on at least one of the first information received at the first time 701, the third information transmitted at the third time 705, or the fourth information received at the fourth time 707.

In step 817, the processor 120 receives fifth information (for example, F21/(F23,R23) in FIG. 7A) at a fifth time (for example, SLOT 5 709 in FIG. 7A), and determines (or measures) the distance from the first external electronic device 102. The processor 120 may read information only corresponding to the electronic device 101 (for example, F21) among the received fifth information, and may store the read information in the memory 130. The fifth information may include at least one of information regarding the time at which the first external electronic device 102 received the third information, information regarding the time at which the first external electronic device 102 received the fourth information, or information regarding the time at which the first external electronic device 102 transmitted the fifth information. The processor 120 may measure the distance from the first external electronic device 102 based on at least one of the second information received at the second time 703, the fourth information transmitted at the fourth time 707, or the fifth information received at the fifth time 709.

At the fifth time 709, the second external electronic device 104 may receive fifth information (for example, F21/(F23, R23)) from the first external electronic device 102, may read information only corresponding to the second external electronic device 104 (for example, (F23,R23)) among the received fifth information, and may store the read information in the memory 130. The second external electronic device 104 may measure the distance from the first external electronic device 102 based on at least one of the second information received at the second time 703, the third information transmitted at the third time 705, or the fifth information received at the fifth time 709.

In step 819, the processor 120 receives sixth information (for example, F1/F32 in FIG. 7A) at a sixth time (for example, SLOT 4 711 in FIG. 7A), and determines the distance from the second external electronic device 104. The sixth information may include at least one of information regarding the time at which the second external electronic device 104 received the fourth information, information regarding the time at which the second external electronic device 104 received the fifth information, or information regarding the time at which the second external electronic device 104 transmitted the sixth information. The processor 120 may read information only corresponding to the electronic device 101 (for example, F31), among the received sixth information, and may store the read information in the memory 130. The processor 120 may measure the distance from the second external electronic device 104 based on at least one of the third information received at the third time 705, the fourth information transmitted at the fourth time 707, or the sixth information received at the sixth time 711.

At the sixth time 711, the first external electronic device 102 may receive sixth information (for example, F31/F32) from the second external electronic device 104, may read information only corresponding to the first external electronic device 102 (for example, F32) among the received sixth information, and may store the read information in the memory 130. The first external electronic device 102 may measure the distance from the second external electronic device 104 based on at least one of the third information received at the third time 705, the fifth information transmitted at the fifth time 709, or the sixth information received at the sixth time 711.

Figure 9:
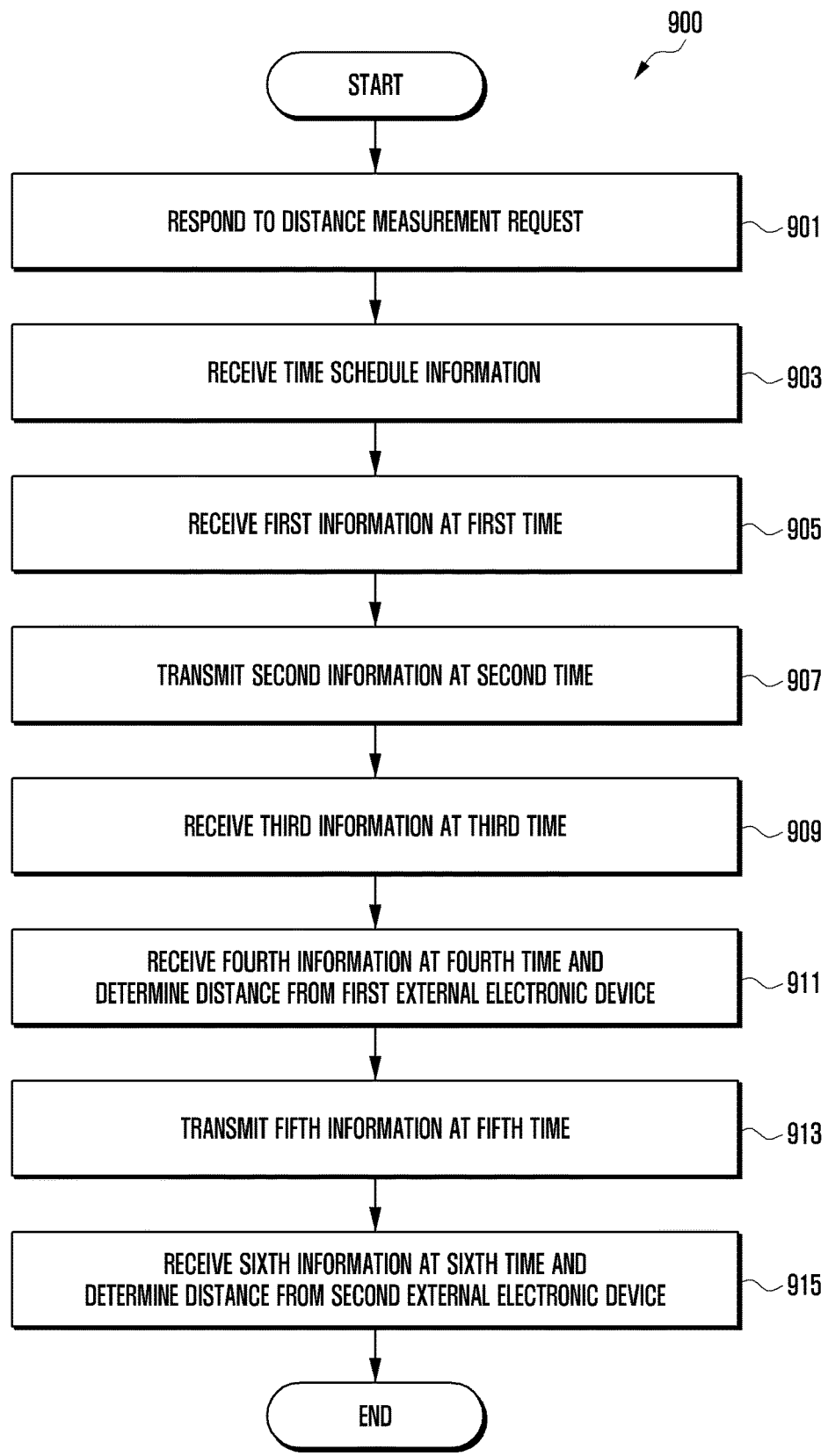
FIG. 9 is a flowchart illustrating a method for operating a slave electronic device based on the DS-TWR scheme, according to an embodiment.

FIG. 9 is a flowchart 900 illustrating a method for operating a slave electronic device based on the DS-TWR scheme, according to an embodiment.

FIG. 9 describes a method wherein the electronic device 101 operates as a slave electronic device. It may be assumed that when the electronic device 101 operates as a slave electronic device, the first external electronic device 102 operates as a master electronic device.

Referring to FIG. 9, in step 901, the processor 120 of the electronic device 101 responds to a distance measurement request by using UWB communication. For example, the processor 120 may receive a message (or data) for identifying whether or not to participate in distance measurement from the first external electronic device 102, and may transmit a response message in response to the message, thereby responding to the distance measurement participation. Additionally alternatively, the processor 120 may receive a request for measuring the distance from other external electronic devices from the user through an input device 150. Alternatively, the processor 120 may receive a distance measurement request from the first external electronic device 102 or the server 108 if an application (for example, game application) that uses the distance from external electronic devices is executed. Step 901 may be identical or similar to step 601 in FIG. 6.

In step 903, the processor 120 receives time schedule information from the first external electronic device 102. The time schedule information may include a time at which the electronic device 101 transmits information (or message) to the external electronic devices, or a time at which the electronic device 101 receives information from the external electronic devices. The processor 120 may receive time schedule information determined by the first external electronic device 102 or the server 108, and may store the time schedule information in the memory 130.

In step 905, the processor 120 receives first information (for example, P12/P13 in FIG. 7A) from the first external electronic device 102 at a first time (for example, SLOT 1 701 in FIG. 7A). The first information may include the identifier of the first external electronic device 102 or information regarding the time at which the first external electronic device 102 transmitted the first information. The first information may also be transmitted to second external electronic device 104. The processor 120 may read information only corresponding to the electronic device 101 (for example, P12), among the received first information, and may store the read information in the memory 130. The processor 120 may store information regarding the time at which the first information was received in the memory 130, or may read time information included in the first information and may store the read information in the memory 130.

In step 907, the processor 120 transmits second information (for example, (R21,P21)/P23 in FIG. 7A) at a second time (for example, SLOT 2 703 in FIG. 7A). The second information may include information regarding the time at which the electronic device 101 received the first information, or information regarding the time at which the electronic device 101 transmitted the second information. The processor 120 may store information regarding the time at which the second information was transmitted in the memory 130.

In step 909, the processor 120 receives third information (for example, (R31,P31)/(R32,P32) in FIG. 7A) from the second external electronic device 104 at a third time (for example, SLOT 3 705 in FIG. 7A). The processor 120 may read information only corresponding to the electronic device 101 (for example, (R31,P31)) among the received third information, and may store the read information in the memory 130. The processor 120 may store information regarding the time at which the third information was received in the memory 130, or may read time information included in the third information and may store the read information in the memory 130. For example, the third information may include at least one of information regarding the time at which the second external electronic device 104 received the first information, information regarding the time at which the second external electronic device 104 received the second information, or information regarding the time at which the second external electronic device 104 transmitted the third information.

In step 911, the processor 120 receives fourth information (for example, (F12,R12)/(F13,R13) in FIG. 7A) from the first external electronic device 102 at a fourth time (for example, SLOT 4 705 in FIG. 7A) and determines the distance from the first external electronic device 102. The fourth information may include at least one of information regarding the time at which the first external electronic device 102 received the second information, information regarding the time at which first external electronic device 102 received the second information, or information regarding the time at which first external electronic device 102 transmitted the fourth information. The processor 120 may read information only corresponding to the electronic device 101 (for example, (F12,R12)) among the received fourth information, may store the read information in the memory 130, and may store information regarding the time at which the fourth information was received.

The processor 120 may measure the distance from the first external electronic device 102 based on at least one of the first information received at the first time 701, the second information transmitted at the second time 703, or the fourth information received at the fourth time 707. For example, the processor 120 may obtain processing time information based on the fourth information, and may measure the distance from the first external electronic device 102 based on at least one of the obtained processing time information, information regarding the time at which the first information was received, information regarding the time at which the second information was transmitted, or information regarding the time at which the fourth information was received.

At the fourth time 407, the second external electronic device 104 may read information only corresponding to the second external electronic device 104 (for example, (F13, R13)) among the received fourth information, may store the read information in the memory 130, and may store information regarding the time at which the fourth information was received. The second external electronic device 104 may measure the distance from the first external electronic device 102 based on at least one of the first information received at the first time 701, the third information transmitted at the third time 705, or the fourth information received at the fourth time 707.

In step 913, the processor 120 transmits fifth information (for example, F21/(F23,R23) in FIG. 7A) at a fifth time (for example, SLOT 5 709 in FIG. 7A). The fifth information may include at least one of information regarding the time at which the electronic device 101 received the third information, information regarding the time at which the electronic device 101 received the fourth information, or information regarding the time at which the electronic device 101 transmitted the fifth information.

At the fifth time 709, the first external electronic device 102 may receive fifth information (for example, F21/(F23, R23)) from the electronic device 101, may read information only corresponding to the first external electronic device 102 (for example, F21), among the received fifth information, and may store the read information in the memory 130. The first external electronic device 102 may measure the distance from the electronic device 101 based on at least one of the second information received at the second time 703, the fourth information transmitted at the fourth time 707, or the fifth information received at the fifth time 709. At the fifth time 709, the second external electronic device 104 may receive fifth information (for example, F21/(F23,R23)) from the electronic device 101, may read information only corresponding to the second external electronic device 104 (for example, (F23,R23)) among the received fifth information, and may store the read information in the memory 130. The second external electronic device 104 may measure the distance from the electronic device 101 based on at least one of the second information received at the second time 703, the third information transmitted at the third time 705, or the fifth information received at the fifth time 709.

In step 915, the processor 120 receives sixth information (for example, F31/F32 in FIG. 7A) from the second external electronic device 104 at a sixth time (for example, SLOT 6 711 in FIG. 7A), and determines the distance from the second external electronic device 104. The sixth information may include at least one of information regarding the time at which the second external electronic device 104 received the fourth information, information regarding the time at which the second external electronic device 104 received the fifth information, or information regarding the time at which the second external electronic device 104 transmitted the sixth information. The processor 120 may receive sixth information (for example, F31/F32) from the second external electronic device 104, may read information only corresponds to the electronic device 101 (for example, F32) among the received sixth information, and may store the read information in the memory 130. The processor 120 may measure the distance from the second external electronic device 104 based on at least one of the third information received at the third time 705, the fifth information transmitted at the fifth time 709, or the sixth information received at the sixth time 711.

At the sixth time 711, the first external electronic device 102 may receive sixth information (for example, F31/F32) from the second external electronic device 104, may read information only corresponding to the first external electronic device 102 (for example, F31) among the received sixth information, and may store the read information in the memory 130. The first external electronic device 102 may measure the distance from the second external electronic device 104 based on at least one of the third information received at the third time 705, the fourth information transmitted at the fourth time 707, or the sixth information received at the sixth time 711.

Figure 10:
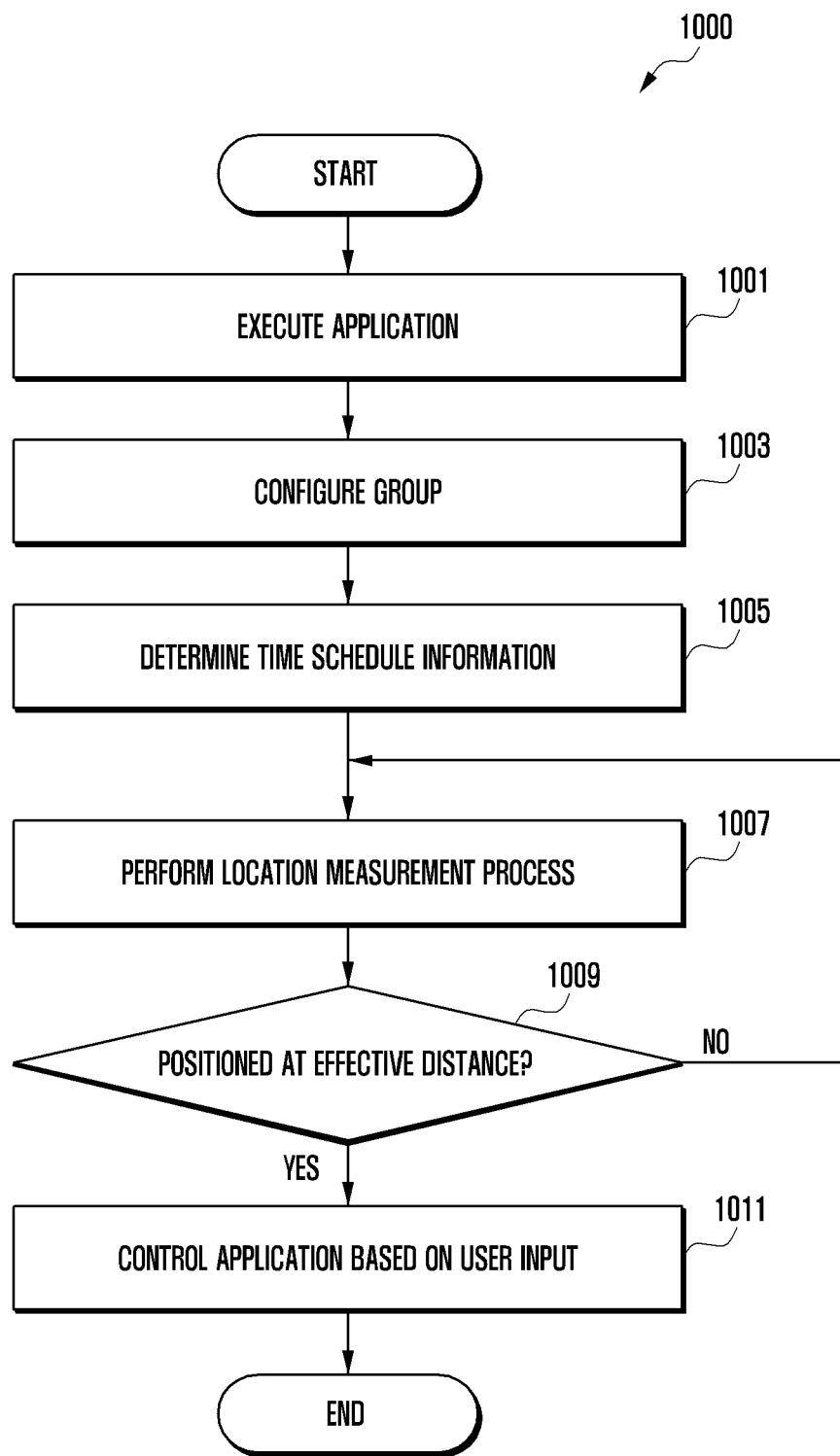
FIG. 10 is a flowchart illustrating a method for operating an electronic device based on the location of multiple electronic devices, according to an embodiment.

FIG. 10 is a flowchart 1000 illustrating a method for operating an electronic device based on the location of multiple electronic devices, according to an embodiment.

FIG. 10 describes a method wherein the electronic device 101 operates as a master electronic device.

Referring to FIG. 10, in step 1001, the processor 120 of the electronic device 101 executes an application. The processor 120 may receive an application execution request from the user through an input device 150. For example, the user may select an icon, which is to be executed, from application icons displayed on the home screen of the electronic device 101, or may select an application from a list of recently executed applications. The application may be an application (for example, game application) operating while being positioned at the location of multiple electronic devices.

In step 1003, the processor 120 configures a group (or team) based on a user input. The group configuration may be an operation of selecting users (for example, external electronic devices) to play the game together inside the game application. The user may produce a group inside the game application and may select other users to play the game together inside the produced group. Step 1003 may be identical or similar to step 503 in FIG. 5.

In step 1005, the processor 120 determines time schedule information. The processor 120 may identify the number of users included in the group configured in step 1003, and may determine the time schedule information based on the location measurement scheme or the number of identified users. The processor 120 may transmit the determine time schedule information to external electronic devices.

In step 1007, the processor 120 may perform a location measurement process. The location measurement process may include an operation of measuring the location of multiple electronic devices based on a location measurement scheme (for example, a SS-TWR scheme or a DS-TWR scheme). For example, the processor 120 may perform steps 509 to 515 in FIG. 5 according to the SS-TWR scheme, thereby performing the location measurement scheme. Additionally or alternatively, the processor 120 may perform steps 809 to 819 in FIG. 8 according to the DS-TWR scheme, thereby performing the location measurement scheme.

In step 1009, the processor 120 determines whether or not an external electronic device is positioned at an effective distance. If the external electronic device is positioned at the effective distance, the processor 120 performs step 1011; and if the external electronic device is not positioned at the effective distance, the processor 120 returns to step 1007.

In step 1011, the processor 120 controls the executed application based on a user input. For example, the processor 120 may distinguish an external electronic device positioned at the effective distance from an external electronic device not positioned at the effective distance, and may display the different positions of the external electronic devices. The processor 120 may shoot (e.g., measure) the external electronic device positioned at the effective distance based on the user's input (for example, shooting input). With regards to steps 1009 and 1011, different steps may be performed depending on the application to which the location measurement process is applied. The processor 120 may control the application based on the measured location of the external electronic devices.

A game application (for example, virtual reality (VR)) type first person shooting (FPS) game may be configured with two separate teams in steps 1001 and 1003. Respective teams may start the game at different locations, and respective teams may attack each other once the game is started in steps 1005 to 1011. Participants of respective teams may be determined in advance (for example, in the case of 5:5 team battle, a total of ten participants), and all participants may have time intervals assigned thereto in step 1005.

When respective teams start the game at different locations, users of respective teams may initially fail to recognize the locations of opponents (for example, external electronic devices) because the distance between them is impossible to measure (for example, the distance is too large to be measured by a given type of communication means). If an opponent comes within a measurable distance (or within a shooting range of a specific weapon), the electronic device 101 may recognize the opponent (for example, an external electronic device at a distance that can be specified) and display the recognized opponent through a display 190, or may provide an indication that shooting is possible. The electronic device 101 may transmit shooting information to the server 108 at an assigned time, or may use another time interval to deliver shooting information.

The location measurement process may be applied to self-driving cars such that each car can quickly identify the location of a counterpart car. Thus, autonomous driving may be possible because each car can quickly identify the location of a counterpart car, thereby quickly determining the location of the counterpart car.

The location measurement process may be applied to drones such that each drone can quickly identify where another drone is positioned during flight, thereby preventing a collision.

A method for operating an electronic device 101 may include the operations of identifying multiple external electronic devices by using at least one communication module 190 included in the electronic device; determining time schedule information based on a number of the multiple identified external electronic devices or based on a location measurement scheme; transmitting time schedule information to the multiple external electronic devices; transmitting first information to the multiple external electronic devices at a first time, based on the time schedule information, by using the at least one communication module; receiving second information from one of the multiple external electronic devices at a second time assigned to the multiple external electronic devices, by using the at least one communication module; and determining a distance of one of the multiple external electronic devices based on the first information or the second information.

The second information may include information regarding a time at which the first external electronic device received the first information after transmitting the second information or information regarding a time at which the first external electronic device transmitted the second information. The operation of determining a distance of one of the multiple external electronic devices may include the operations of obtaining information regarding a processing time of the first external electronic device based on the second information when the location measurement scheme is an SS-TWR scheme; and determining a distance from the first external electronic device based on at least one of the obtained information regarding a processing time, information regarding a time at which the first information was transmitted, or information regarding a time at which the second information was received.

The operation of determining the distance of one of the multiple external electronic devices may include the operations of receiving third information from a different one of the multiple external electronic devices at a third time when the location measurement scheme is a DS-TWR scheme; transmitting fourth information to the multiple external electronic devices at a fourth time assigned to the electronic device; receiving fifth information from one of the multiple external electronic devices at a fifth time; and determining the distance from one of the multiple external electronic devices based on at least one of the second information, the fourth information, or the fifth information.

When the locations of multiple electronic devices are measured through UWB communication, the time at which each electronic device transmits information for location measurement may be scheduled, and information may be transmitted at the scheduled time, thereby making it possible to quickly acquire the location of multiple electronic devices.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
   an ultra-wide band (UWB) communication module;
   a memory; and
   a processor operably connected to the UWB communication module and the memory, wherein the processor is configured to:
   receive, through the UWB communication module, a first message from a first external electronic device at a first time slot;
   store, in the memory, the first message and a receiving time of the first message;
   receive, through the UWB communication module, a second message from a second external electronic device at a second time slot;
   store, in the memory, the second message and a receiving time of the second message;
   identify a time schedule information for transmitting a third message to the first external electronic device and the second external electronic device, the time schedule information including a transmitting time of the third message;
   obtain first time information regarding a period of time between the receiving time of the first message and the transmitting time of the third message and second time information regarding a period of time between the receiving time of the second message and the transmitting time of the third message; and
   transmit, through the UWB communication module, the third message including the first time information and the second time information to the first external electronic device and the second external electronic device at a third time slot.

2. The electronic device of claim 1, wherein the time schedule information is received from at least one of the first external electronic device, the second external electronic or a server.

3. The electronic device of claim 2, wherein the time schedule information includes information regarding a time for each of multiple external electronic devices to transmit a message.

4. The electronic device of claim 2, wherein the time schedule information is determined based on a number of multiple external electronic devices or based on a location measurement scheme.

5. The electronic device of claim 1, wherein the processor is further configured to:
   receive, through the UWB communication module, a fourth message including third time information from the first external electronic device at a fourth time slot, the third time information regarding a period of time between a time when the first external electronic device receives the third message and a time at which the first external electronic device transmits the fourth message; and
   determine a distance from the first external electronic device based on the third time information.

6. The electronic device of claim 5, wherein the processor is further configured to:
   acquire angle of arrival (AOA) information through multiple antennas, and
   identify a relative location of the first external electronic device based on the acquired AOA information and the distance from the first external electronic device.

7. The electronic device of claim 1, wherein the processor is further configured to:
   receive, through the UWB communication module, a fourth message including third time information from the first external electronic device at a fourth time slot, the third time information regarding a period of time between a time when the first external electronic device receives the third message and a time at which the first external electronic device transmits the fourth message;
   determine a distance or a relative angle from the first external electronic device based on the third time information; and
   identify a relative location with regard to the first external electronic device.

8. The electronic device of claim 1, wherein the second message includes time information regarding a period of time between a time at which the second external electronic device receives the first message from the first external electronic device and a time at which the second external electronic device transmits the second message.

9. The electronic device of claim 1, wherein the processor is further configured to specify a destination address to receive the third message.

10. The electronic device of claim 1, wherein the processor is further configured to:
   read information corresponding to the electronic device by analyzing the first message, when the first message has not specified a destination address; and
   store, in the memory, the read information and the receiving time of the first message.

11. A method for operating an electronic device, the method comprising:
   receiving, through an ultra-wide band (UWB) communication module included in the electronic device, a first message from a first external electronic device at a first time slot;
   storing, in a memory included in the electronic device, the first message and a receiving time of the first message;
   receiving, through the UWB communication module, a second message from a second external electronic device at a second time slot;
   storing, in the memory, the second message and a receiving time of the second message;
   identifying a time schedule information for transmitting a third message to the first external electronic device and the second external electronic device, the time schedule information including a transmitting time of the third message;
   obtaining first time information regarding a period of time between the receiving time of the first message and the transmitting time of the third message and second time information regarding a period of time between the receiving time of the second message and the transmitting time of the third message; and
   transmitting, through the UWB communication module, the third message including the first time information and the second time information to the first external electronic device and the second external electronic device at a third time slot.

12. The method of claim 11, wherein the time schedule information is received from at least one of the first external electronic device, the second external electronic or a server.

13. The method of claim 12, wherein the time schedule information includes information regarding a time for each of multiple external electronic devices to transmit a message.

14. The method of claim 12, wherein the time schedule information is determined based on a number of multiple external electronic devices or based on a location measurement scheme.

15. The method of claim 11, further comprising:
   receiving, through the UWB communication module, a fourth message including third time information from the first external electronic device at a fourth time slot, the third time information regarding a period of time between a time when the first external electronic device receives the third message and a time at which the first external electronic device transmits the fourth message; and
   determining a distance from the first external electronic device based on the third time information.

16. The method of claim 15, further comprising:
   acquiring angle of arrival (AOA) information through multiple antennas, and
   identifying a relative location of the first external electronic device based on the acquired AOA information and the distance from the first external electronic device.

17. The method of claim 11, further comprising:
   receiving, through the UWB communication module, a fourth message including third time information from the first external electronic device at a fourth time slot, the third time information regarding a period of time between a time when the first external electronic device receives the third message and a time at which the first external electronic device transmits the fourth message;
   determining a distance or a relative angle from the first external electronic device based on the third time information; and
   identifying a relative location with regard to the first external electronic device.

18. The method of claim 11, wherein the second message includes time information regarding a period of time between a time at which the second external electronic device receives the first message from the first external electronic device and a time at which the second external electronic device transmits the second message.

19. The method of claim 11, further comprise specifying a destination address to receive the third message.

20. The method of claim 11, wherein storing of the first message comprises:
   reading information corresponding to the electronic device by analyzing the first message, when the first message has not specified a destination address; and
   storing, in the memory, the read information and the receiving time of the first message.

* * * * *